(12) United States Patent
Tashman

(10) Patent No.: US 6,697,034 B2
(45) Date of Patent: Feb. 24, 2004

(54) VOLUMETRIC, STAGE-TYPE THREE-DIMENSIONAL DISPLAY, CAPABLE OF PRODUCING COLOR IMAGES AND PERFORMING OMNI-VIEWPOINT SIMULATED HIDDEN LINE REMOVAL

(76) Inventor: Craig Stuart Tashman, 198 Smith Ridge Rd., South Salem, NY (US) 10590

(*) Notice: Subject to any disclaimer, the term of this patent is extended or adjusted under 35 U.S.C. 154(b) by 295 days.

(21) Appl. No.: 09/755,309

(22) Filed: Jan. 2, 2001

(65) Prior Publication Data

US 2002/0126119 A1 Sep. 12, 2002

Related U.S. Application Data

(60) Provisional application No. 60/213,979, filed on Jun. 24, 2000, and provisional application No. 60/173,730, filed on Dec. 30, 1999.

(51) Int. Cl.[7] .................................................. G09G 3/00
(52) U.S. Cl. ..................... 345/31; 345/420; 345/421; 345/424; 345/426
(58) Field of Search ....................... 345/426, 31, 419, 345/420, 421, 424

(56) References Cited

U.S. PATENT DOCUMENTS

| | | | |
|---|---|---|---|
| 3,154,636 A | 10/1964 | Schwertz | |
| 4,160,973 A | 7/1979 | Berlin, Jr. | |
| 4,689,604 A | 8/1987 | Sokol | |
| 4,922,336 A | 5/1990 | Morton | |
| 4,983,031 A | 1/1991 | Solomon | |
| 5,057,827 A | 10/1991 | Nobile et al. | |
| 5,082,350 A | 1/1992 | Garcia et al. | |
| 5,162,787 A | 11/1992 | Thompson et al. | |
| 5,170,156 A * | 12/1992 | DeMond et al. | 345/85 |
| 5,572,375 A | 11/1996 | Crabtree, IV | |
| 5,596,340 A | 1/1997 | Otomi | |
| 5,663,740 A * | 9/1997 | Brotz | 345/31 |
| 5,678,910 A | 10/1997 | Martin | |
| 5,703,606 A | 12/1997 | Blundell | |
| 5,745,197 A | 4/1998 | Leung et al. | |
| 5,748,157 A | 5/1998 | Eason | |
| 5,754,147 A | 5/1998 | Tsao et al. | |
| 5,764,317 A | 6/1998 | Sadovnik et al. | |
| 5,813,742 A | 9/1998 | Gold et al. | |
| 5,854,613 A | 12/1998 | Soltan et al. | |
| 5,929,572 A | 7/1999 | Whitesell | |
| 5,954,414 A | 9/1999 | Tsao | |
| 5,990,990 A | 11/1999 | Crabtree | |
| 6,052,100 A | 4/2000 | Soltan et al. | |
| 6,054,817 A | 4/2000 | Blundell | |
| 6,064,423 A | 5/2000 | Geng | |
| 6,100,862 A | 8/2000 | Sullivan | |
| 6,115,006 A | 9/2000 | Brotz | |
| 6,204,832 B1 * | 3/2001 | Melville et al. | 345/55 |
| 6,384,816 B1 * | 5/2002 | Tabata | 345/204 |
| 6,512,517 B1 * | 1/2003 | Knittel et al. | 345/424 |

* cited by examiner

*Primary Examiner*—Joseph Mancuso
*Assistant Examiner*—Adam Arnold
(74) *Attorney, Agent, or Firm*—Samuel Shipkovitz

(57) ABSTRACT

A volumetric, 3-D image is produced by moving a small number of 1-dimensional light arrays such that virtually all points of a desired volume have at least one light pass through them within the refresh time of the human eye. The motion of the lights consists of two simultaneous motion cycles that are substantially orthogonal to each other, with one being faster than the other. Proper control of the lights thus allows images to be produced within the volume.

Each light element may be composed of a collection of smaller, directional lights, each pointed in a different direction. In such case, the lights may be controlled in a manner that permits each viewer of the volumetric image to only see a variant of that image properly hidden-line removed for his or her particular viewpoint. The display can thus produce volumetric images appearing appropriately hidden-line removed from multiple viewpoints simultaneously.

17 Claims, 52 Drawing Sheets

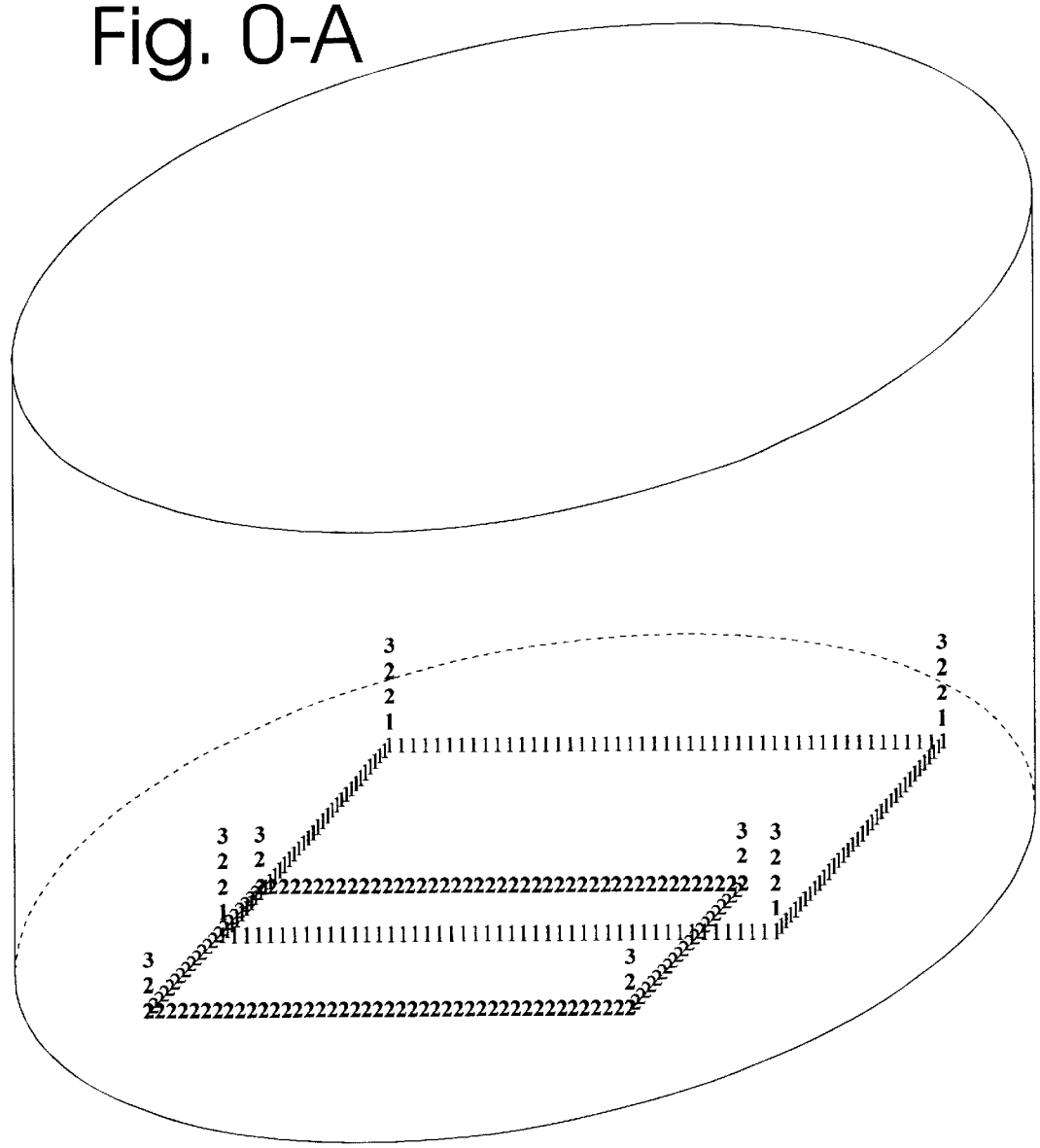
Fig. 0-A
Higher number values indicate more recently produced bursts of light.

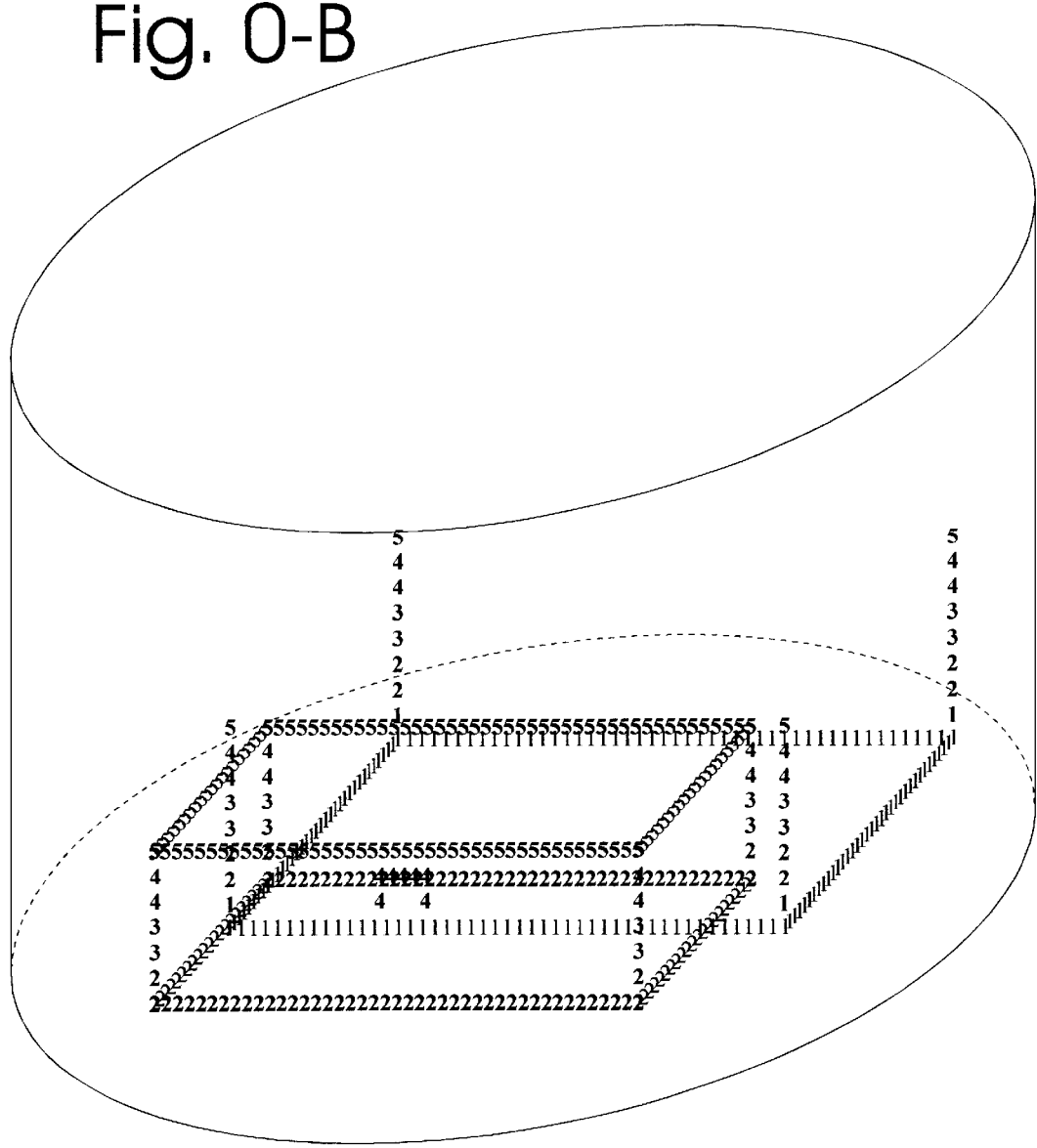
Higher number values indicate more recently produced bursts of light.

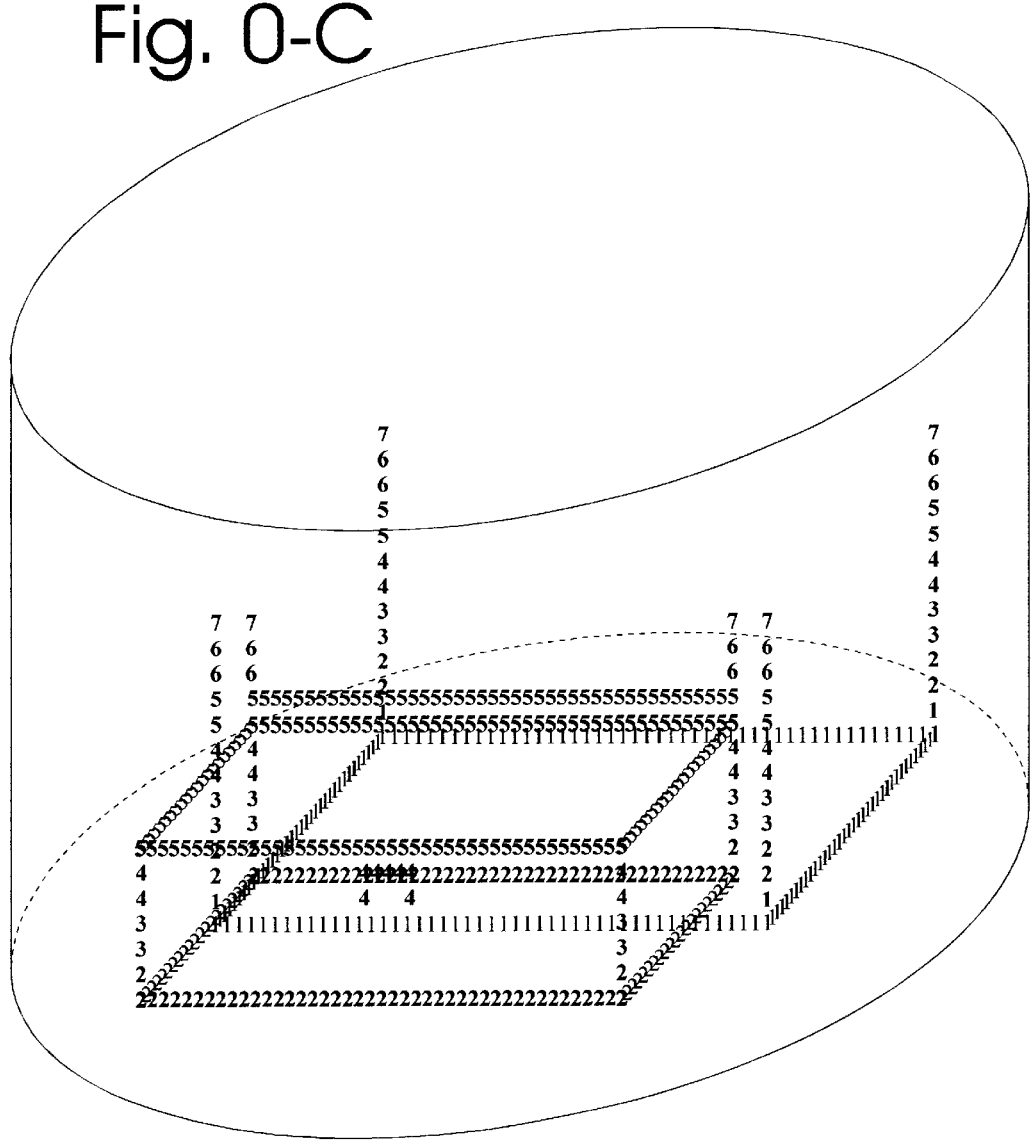
Fig. 0-C
Higher number values indicate more recently produced bursts of light.

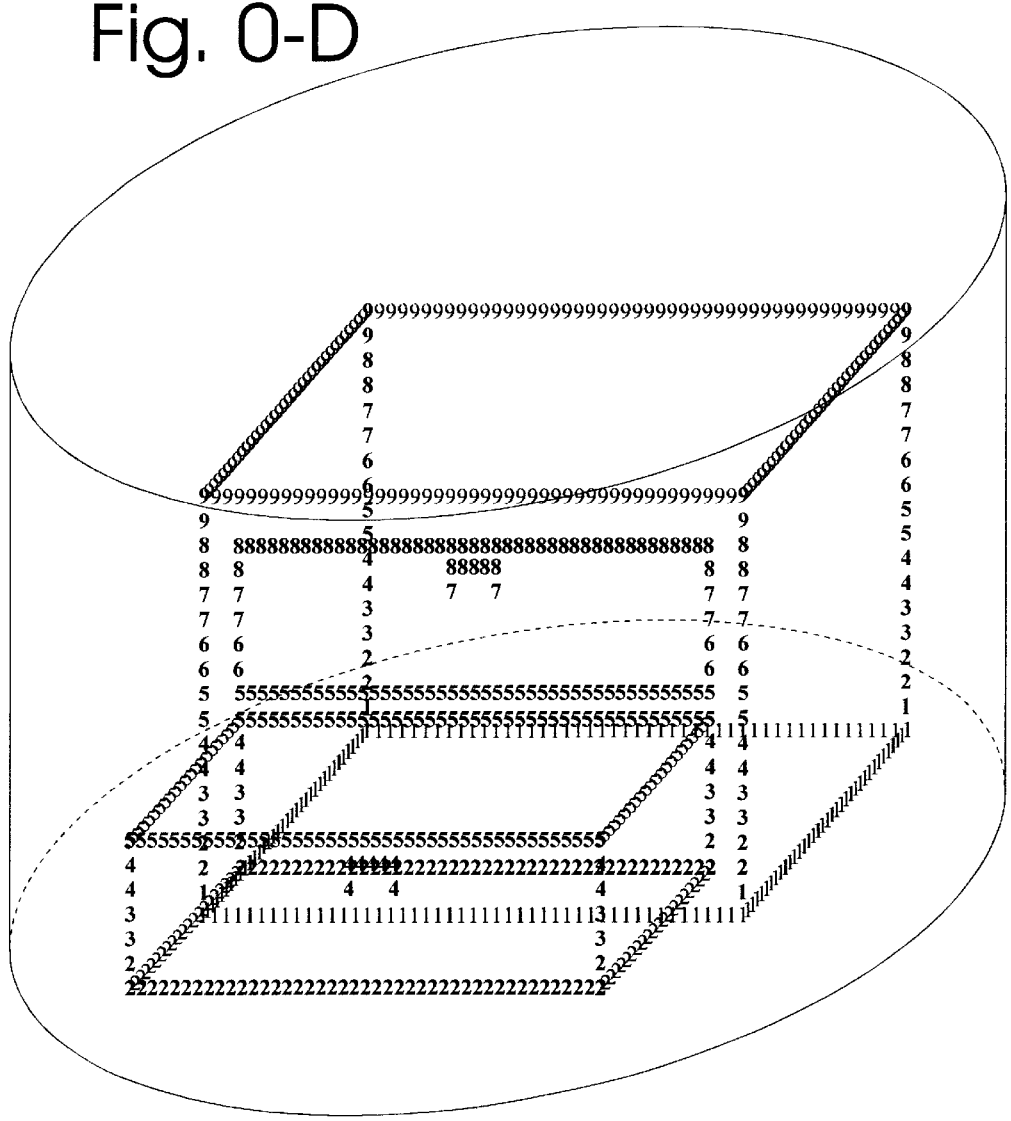
Higher number values indicate more recently produced bursts of light.

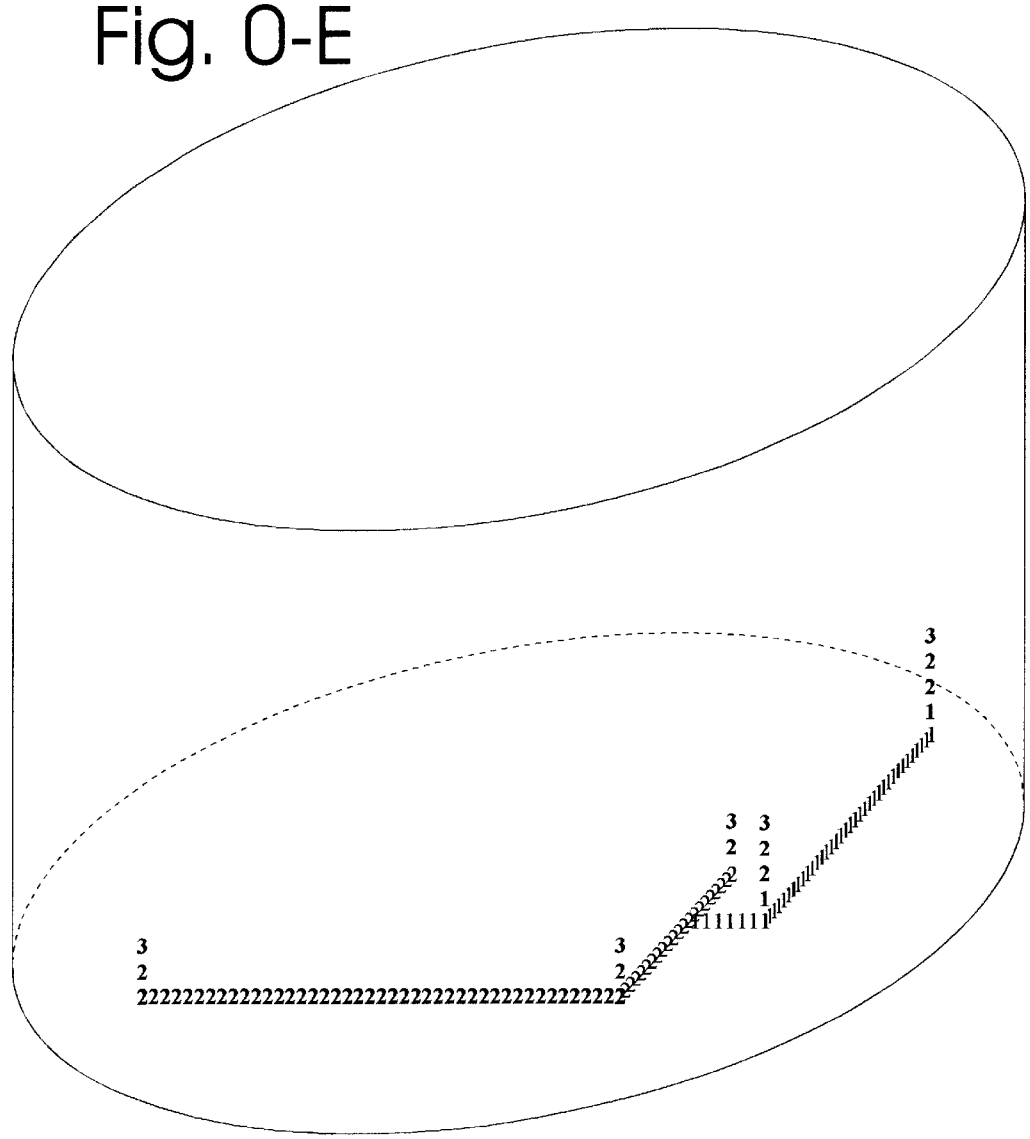
Higher number values indicate more recently produced bursts of light.

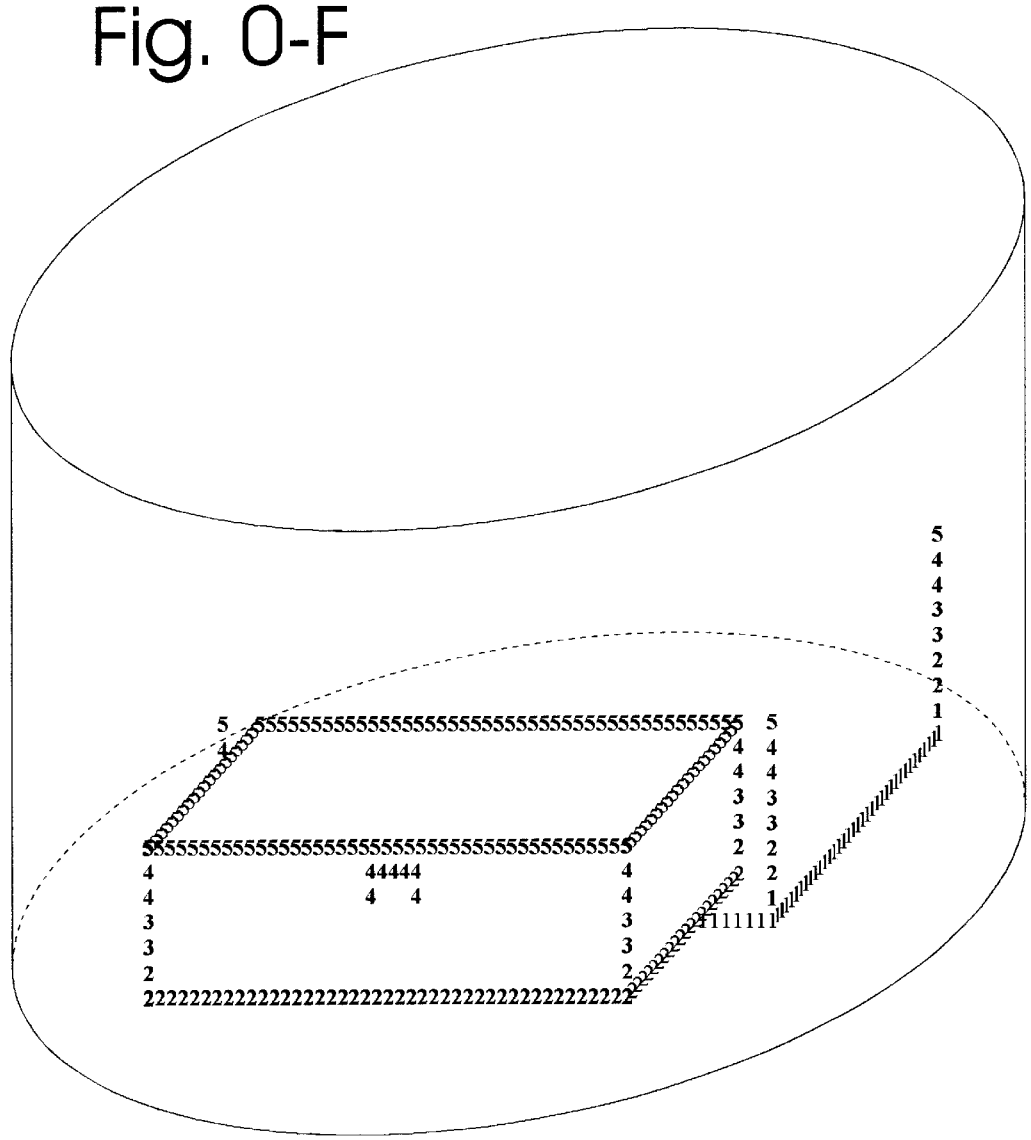
Higher number values indicate more recently produced bursts of light.

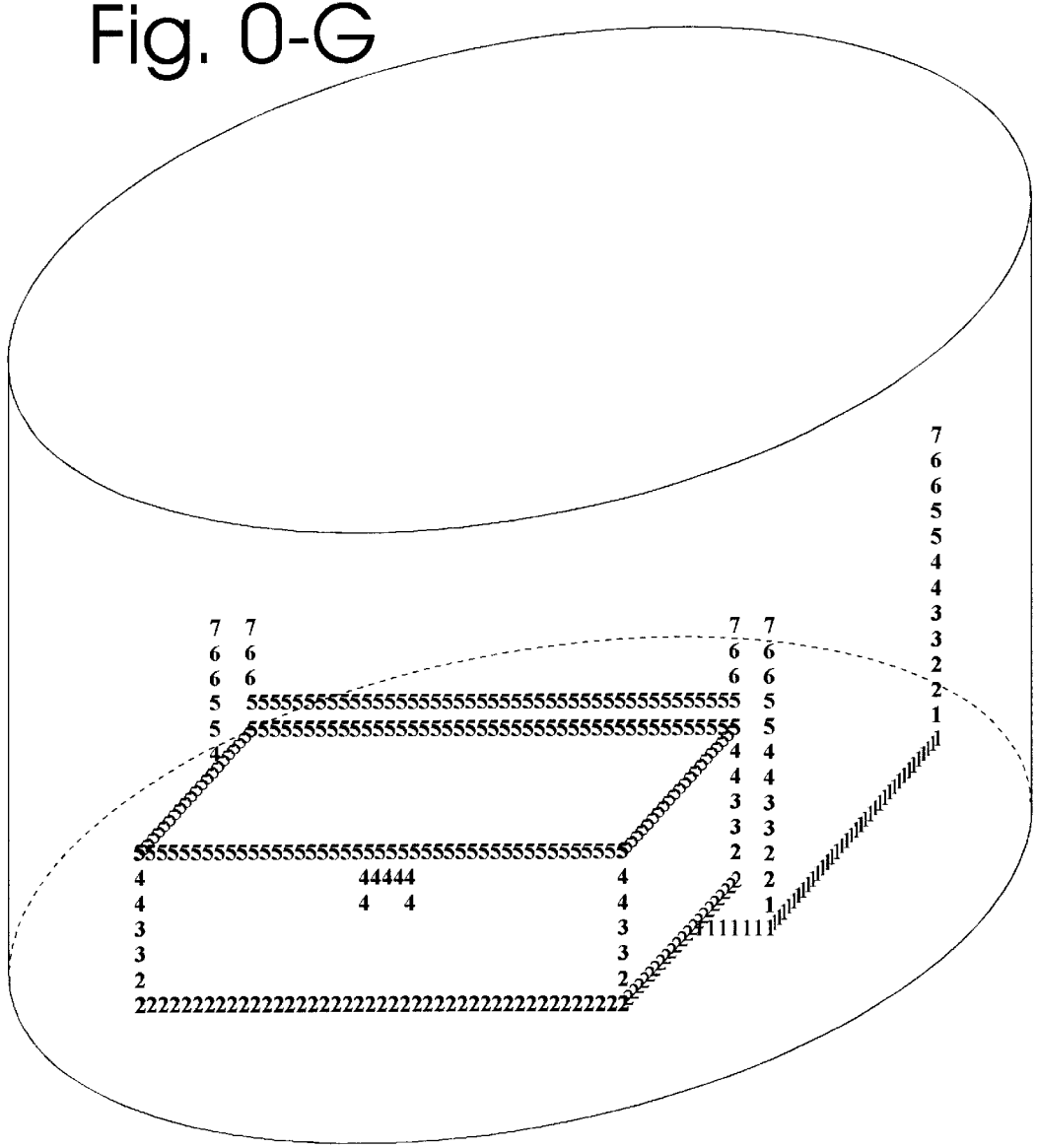
Higher number values indicate more recently produced bursts of light.

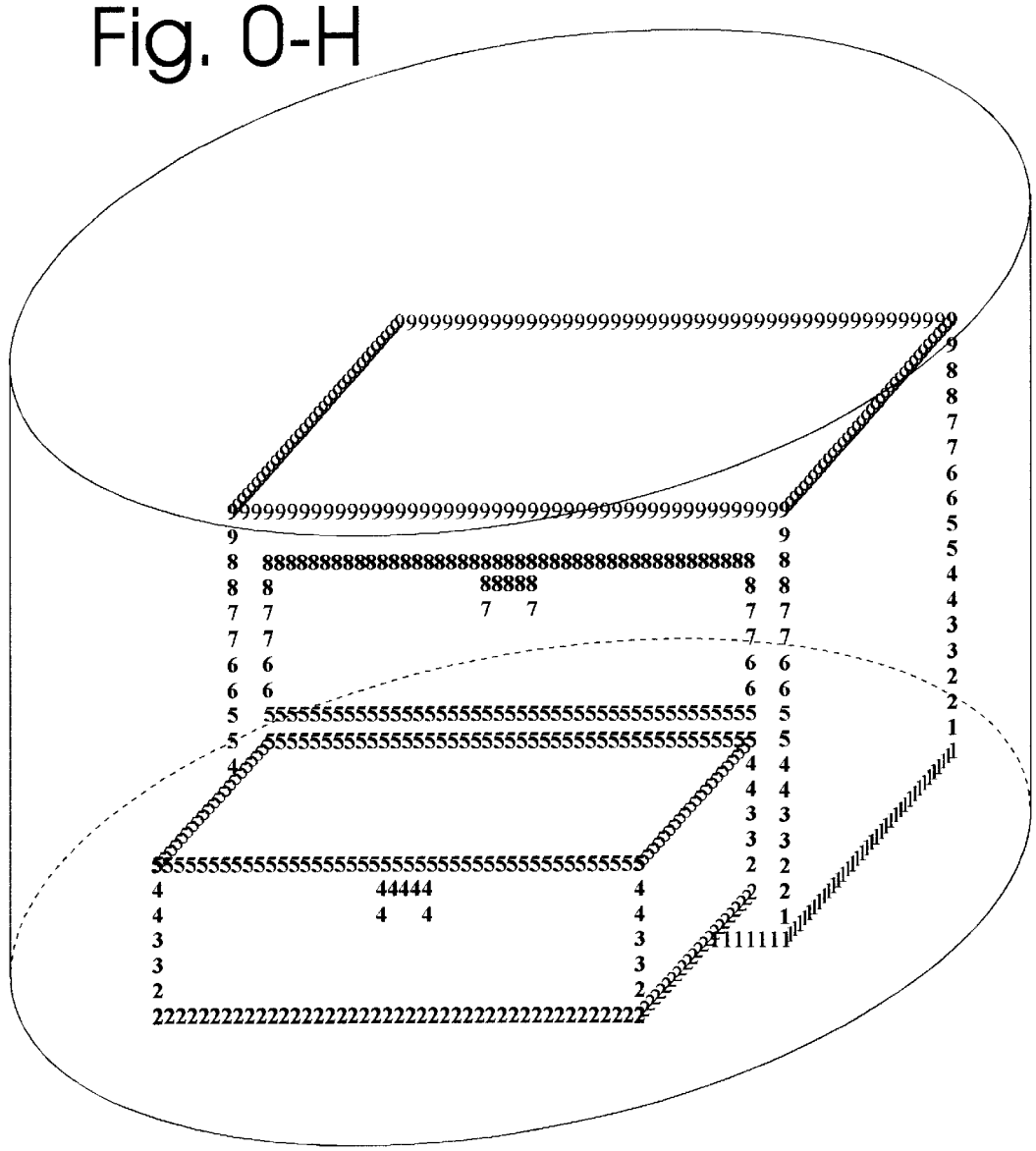
Fig. 0-H
Higher number values indicate more recently produced bursts of light.

Fig. 0-I
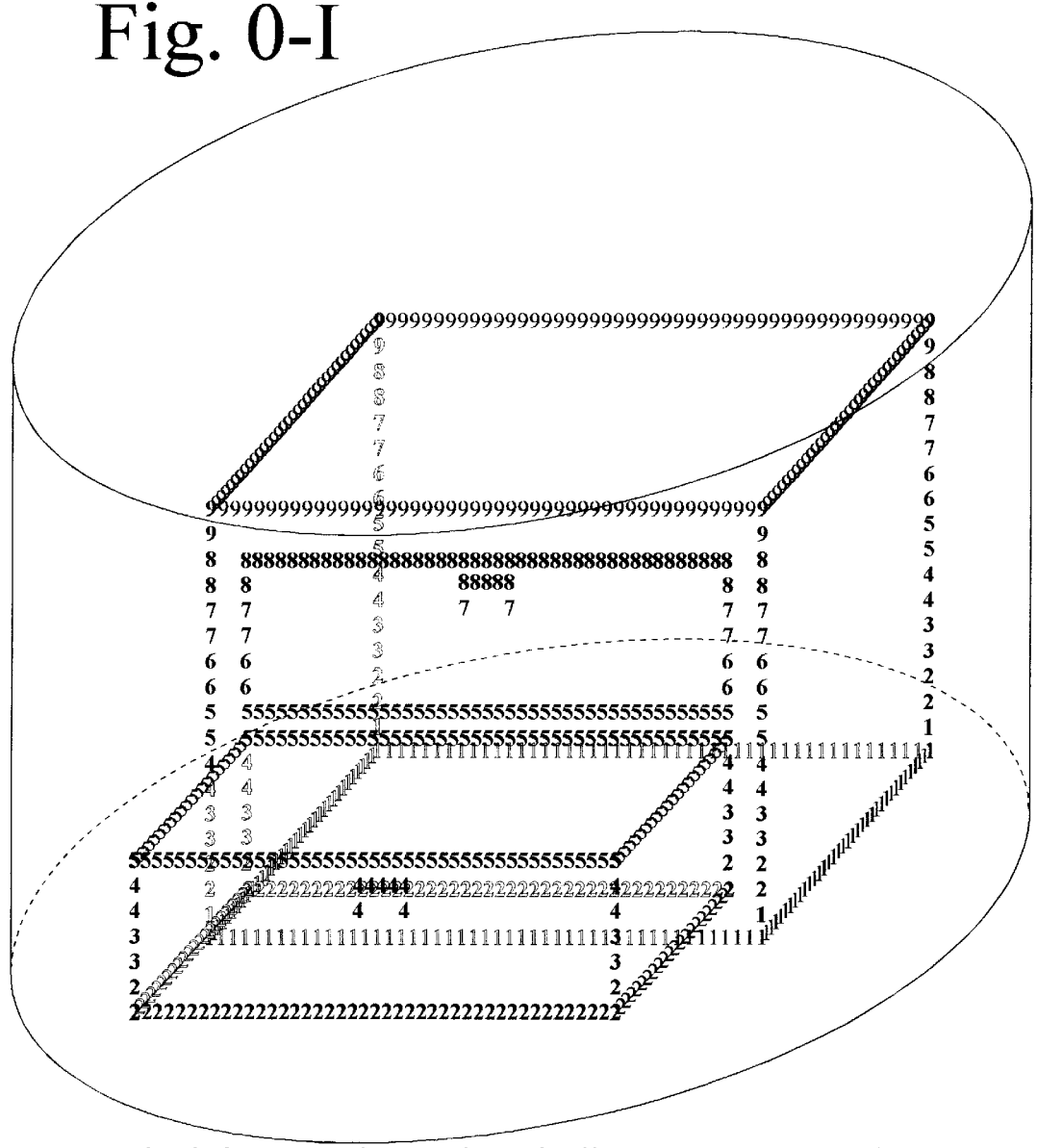
*Higher number values indicate more recently produced bursts of light.
*Black-outlined white-interior numbers indicate bursts of light that would not be directed toward a viewer at this viewpoint.

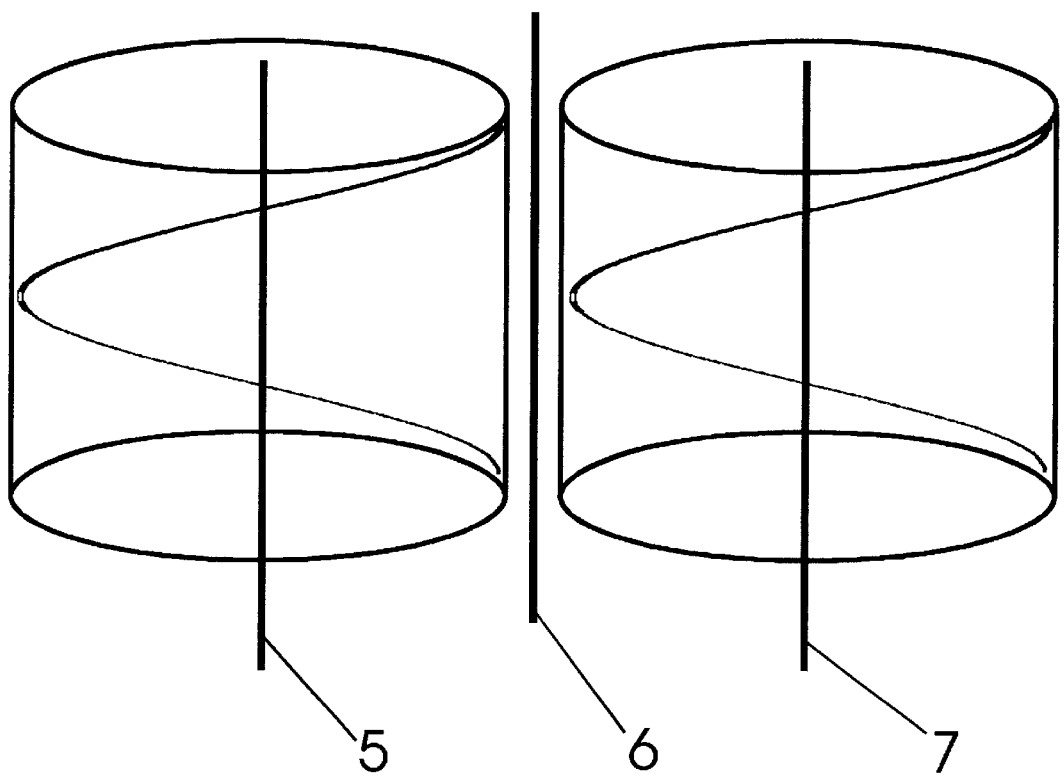
Fig.6-A

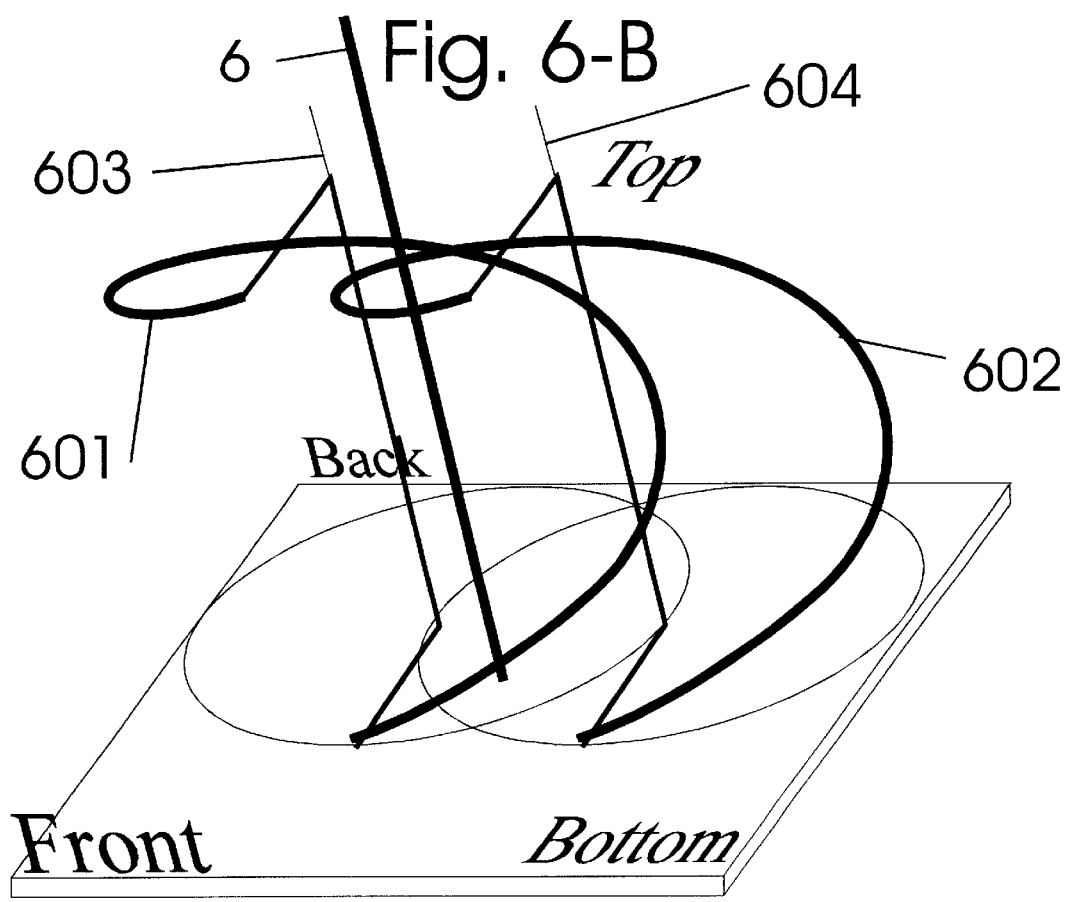
Fig. 6-B
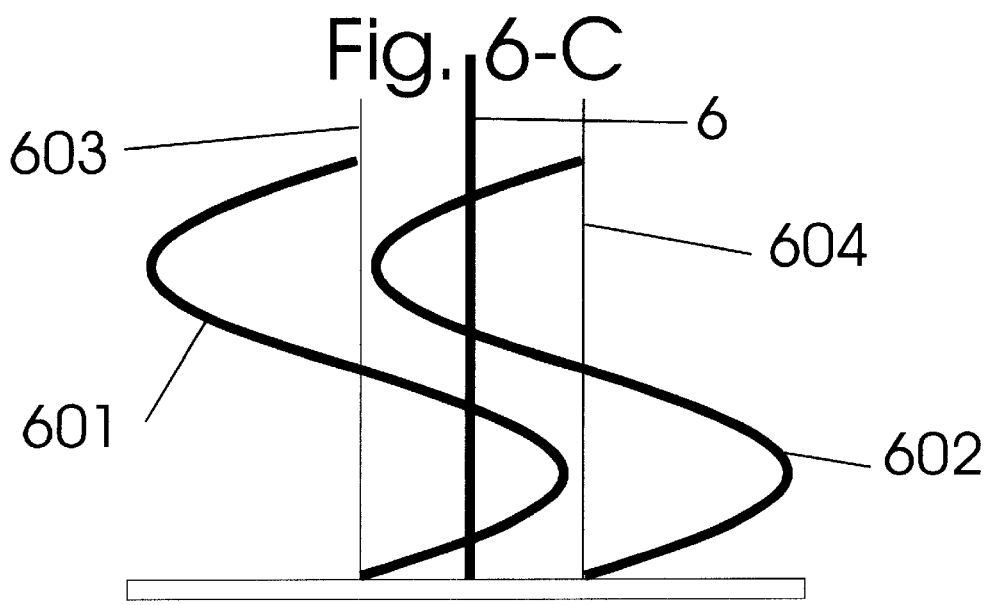
Fig. 6-C

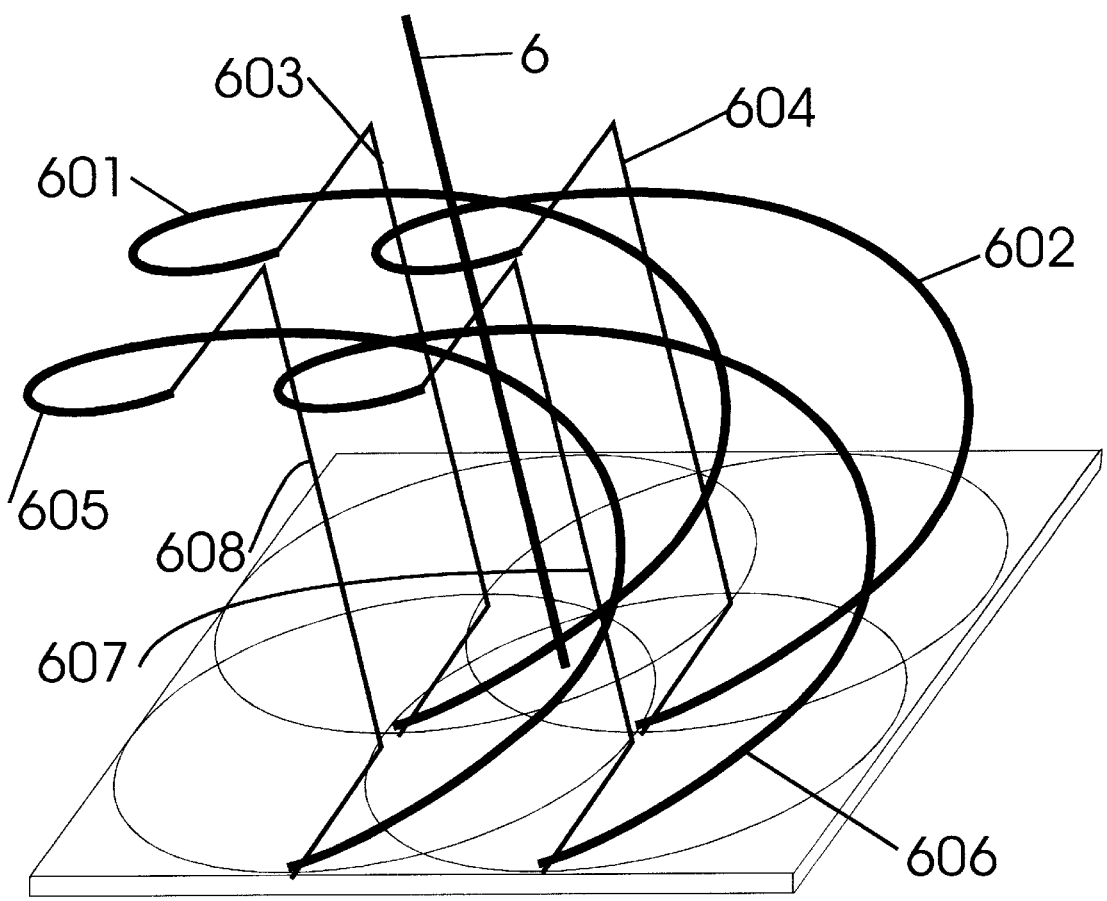
Fig. 6-D

Fig. 47-A
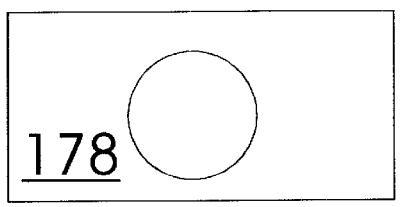
(Front view)
Fig. 47-B
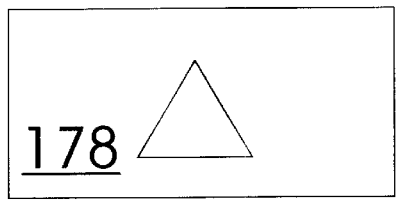
(Back view)
Fig. 48-A
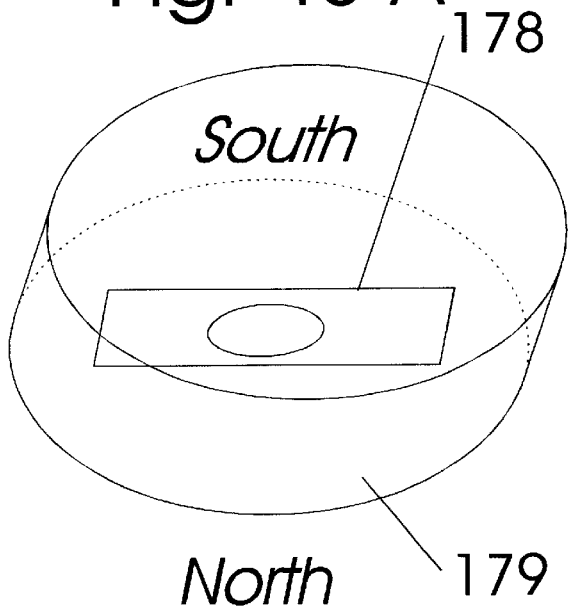
Fig. 48-B
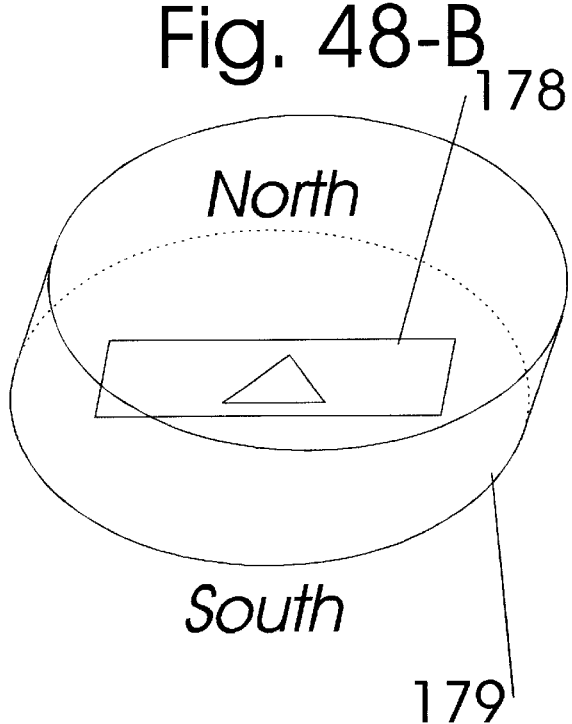

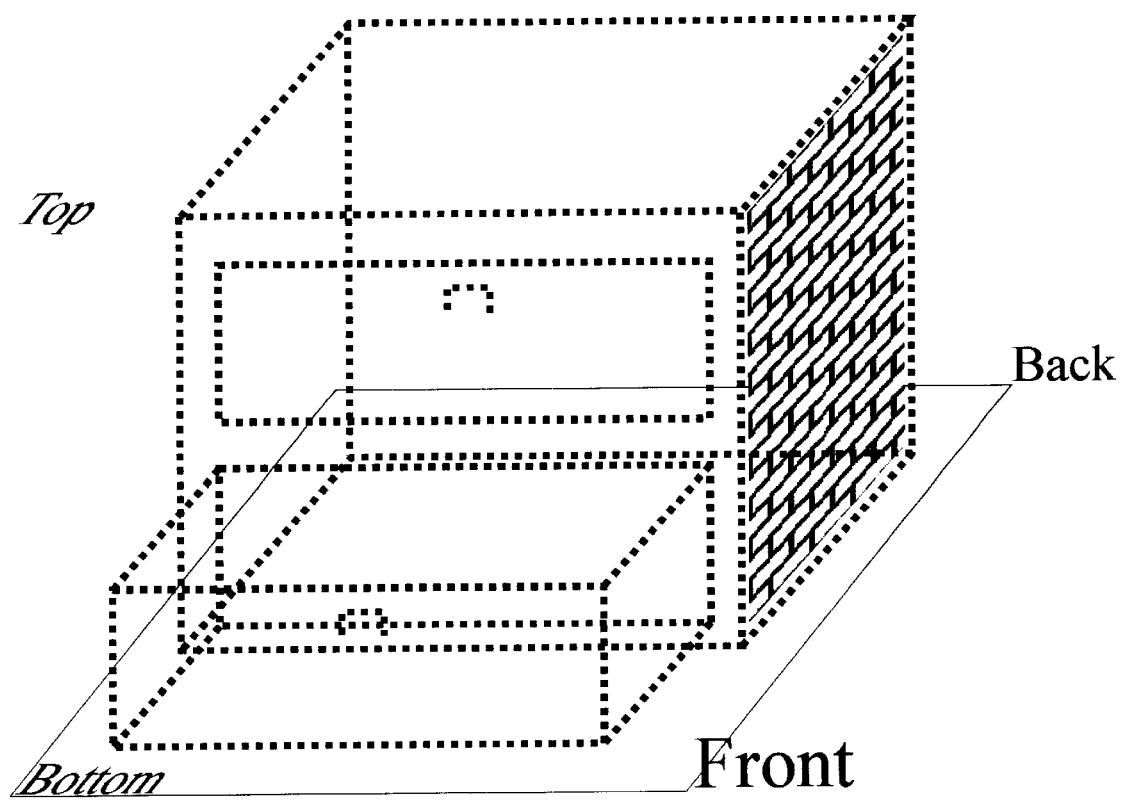
Fig. 52-A

Fig. 52-B
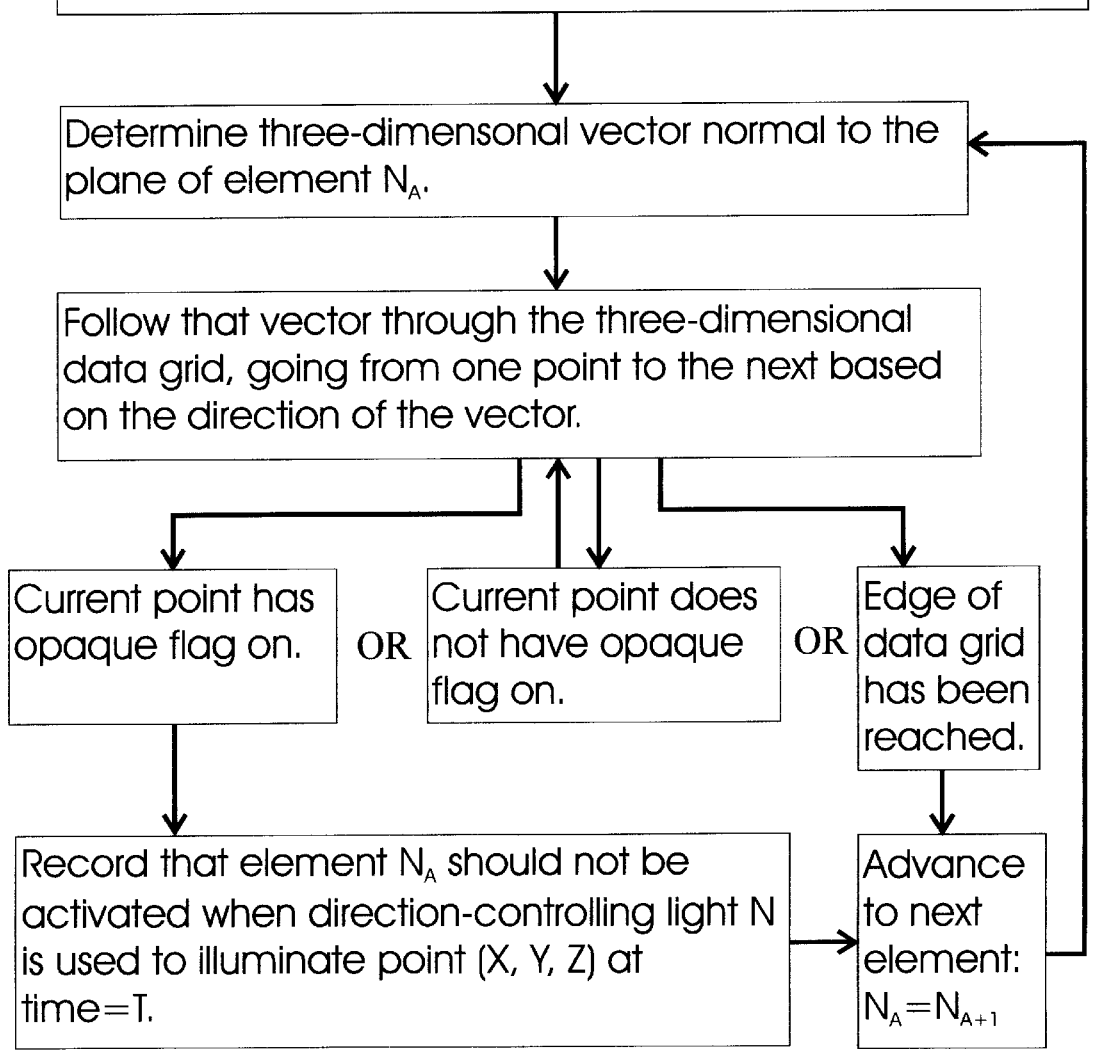

R=red colored light
G=green colored light
B=blue colored light

R=red colored light
G=green colored light
B=blue colored light

R=red colored light
G=green colored light
B=blue colored light

R=red colored light
G=green colored light
B=blue colored light

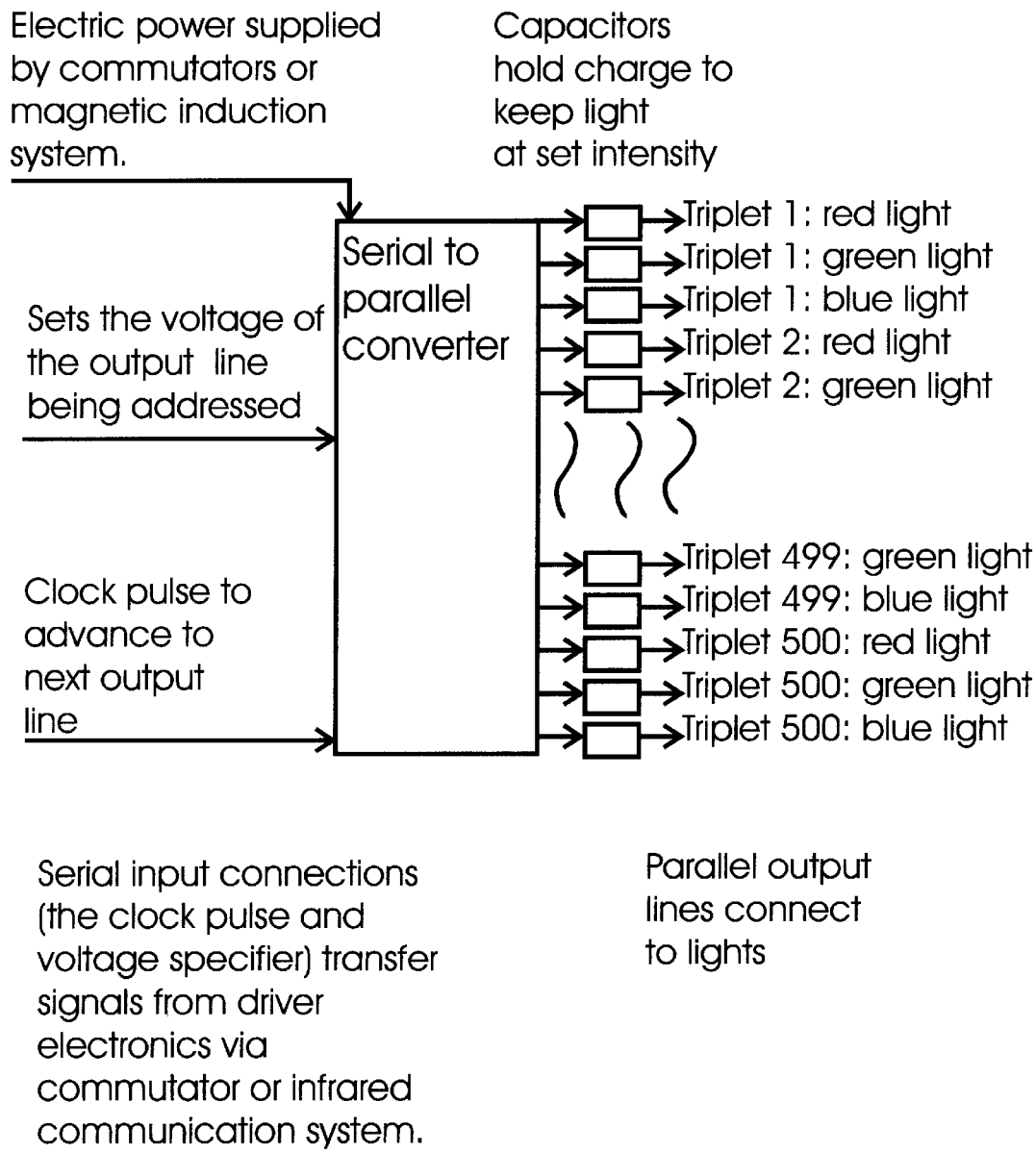

Separated cylinder slices.

R=red light
G=green light
B=blue light

VOLUMETRIC, STAGE-TYPE THREE-DIMENSIONAL DISPLAY, CAPABLE OF PRODUCING COLOR IMAGES AND PERFORMING OMNI-VIEWPOINT SIMULATED HIDDEN LINE REMOVAL

PRIORITY AND REFERENCE TO OTHER APPLICATIONS

This is a utility patent application based on provisional patent application No. 60/173,730 which was filed on Dec. 30, 1999, entitled "Low Cost Volumetric Three Dimensional Display." This utility patent application is also based on provisional patent application No. 60/213,979 which was filed on Jun. 24, 2000, entitled "Low cost volumetric three dimensional display."

BRIEF SUMMARY

Unlike some prior art, the instant invention does not comprise a static tensor of multitudinous lights but rather comprises dynamic movement of a relatively small number of lights for such a volume. This invention is a volumetric, stage-type three-dimensional image display device. It overcomes many problems associated with prior three-dimensional image display devices. The most notable of the problems that this device overcomes include the inability to produce opaque objects and the high cost generally associated with three-dimensional displays. These two problems are overcome while still maintaining other features that many three-dimensional displays do not have. These other features include the ability to produce images that can be viewed with a large degree of freedom of viewpoint and the fact that the viewer does not need to wear any sort of filters or displays over the eyes.

The device is a stage-type volumetric three-dimensional display. It produces images by having a relatively small number of small light producing devices move extremely rapidly and pass through the entire volume of a space that is cylindrical, or spherical (depending on the embodiment in question). By passing through the entire volume, the lights, when controlled properly, are able make any point in the space appear to glow, by emitting light only while occupying the area that is intended to glow. By having the light producing devices sweep through the entire display volume within the refresh time of the human eye, multiple points are made to appear to glow simultaneously. By properly controlling these glows, perceived entire three-dimensional images are formed within this space. The glows appear as an actual image because the lights are moving fast enough for the phenomenon of "persistence of vision" to cause all the separate glows (and associated period of glow for each light) to seem as if they are occurring simultaneously to the human eye. To facilitate understanding, consider an example in which the display is of a three-dimensional, wire-frame image of a two-drawer filing cabinet. Also, suppose that the light producing devices start at the bottom of the display volume (suppose a cylindrical volume) and they move to the top of the volume in such a way as to have at least one light pass through nearly every point in the display volume. Please recall that this is done within the refresh time of the human eye. FIG. 0-A shows the image of the filing cabinet at approximately 25% completion; that is, after the lights have passed through the bottom 25% of the display volume. The numbers in FIG. 0-A represent individual bursts of light, exaggerated in size to make the drawing more understandable; the value of the numbers represents how recently the burst of light was produced, so higher numbers represent more recently produced bursts of light. Recall that these bursts are produced by the lights as they pass through the volume. The cylinder shown represents the display volume; the hidden line of which is shown as dotted. FIG. 0-B shows the filing cabinet image at the point in time when the lights have thus far passed through the volume from the bottom of the display volume to 50% of the way up the display volume, effectively generating 50% of the filing cabinet image. FIGS. 0-C and 0-D show the same thing as FIG. 0-B, but at 75% and 100% completion, respectively.

This display (depending on the embodiment used) has the ability to produce images that appear as opaque. This is done by having the light from each light burst sent in only certain directions, such that a viewer coming from that direction should see that light burst. This is explained in detail shortly.

One central advantage of this method of producing three-dimensional images is due to the simplicity of the actual light generating system, which consists of no more than several strings of lights (if the ability to produce opaque images is being implemented, the lights need to be able to control the direction(s) in which they emit light for a reason that is explained shortly). The result of that is that the display has a manufacturing and, as a result, retail cost that is low enough for the display to have an inherent real-world advantage over other three-dimensional displays.

The second central advantage of this invention over other three-dimensional displays is that the images produced by this invention (if the feature is implemented) appear opaque (as if hidden line removal is performed for all viewpoints). Specifically, that means that only the face of the image that is closest to the viewer is visible to that viewer. For example, if a ball is being displayed without this ability, both the front and rear (relative to the viewer) faces of the ball are visible. This invention has the ability to allow the viewer to always just see the face of the image closest to the viewer, without respect to the angle from which the viewer is looking at the display. The closest face is always shown. Because this feature is accomplished without the need for the display to electronically track the location of the head of the viewer, multiple viewers, all at different viewpoints, can look at the image at once, and each viewer only sees the face closest to him or her. To understand how this is done, suppose that the same image of a filing cabinet with two drawers is to be displayed again, but now, such that it appears opaque. As with the earlier example, the light producing devices move from the bottom of the display volume to the top in such a way as to pass through nearly all of the volume in the process. As with the earlier example, the exact means by which this is done does not matter yet, suffice it to say that nearly every point in the volume is passed through by at least one light—and this is done in less than the refresh time of the human eye. In this example situation, unlike in the earlier example, the individual light producing devices are able to send light in only selective directions; that is, a light producing device may be controlled in real time so as to send light only up, or only left, or only up, right, and left, etc. Now, when the bursts of light that produce the image of the filing cabinet are generated, the light emitted to form each of the points that compose the image may be sent in only some directions, as opposed to all directions. Actually, the directions in which the lights are instructed to send light are very precisely controlled, and the direction(s) in which any particular light emitting device is instructed to send light when producing a certain point of light is determined as follows: any point that composes the filing cabinet image (if the cabinet is intended to be opaque) ought to not be visible from certain viewpoints; specifically, those viewpoints from which, some other part of the filing cabinet is obscuring the point in question. Since it is now known the viewpoints from which the point should not be visible, the viewpoints from which the point should be visible are, simply, all of the remaining viewpoints. The directions that correspond to these remaining viewpoints are the directions in which light is sent when this point in question is produced. This is shown in FIGS. 0-E through 0-H; which show the image of the filing cabinet being generated at 25%, 50%, 75%, and 100%, respectively. In FIGS. 0-E through 0-H, unlike in FIGS. 0-A through 0-D, when a light emitting device produces a point that composes the filing cabinet, the light is sent only in the previously described directions. Thus, the points seen in FIG. 0-H are only those that should be seen from the point of view used in FIG. 0-H; if a different viewpoint were used in FIG. 0-H, different points would appear to be active, points that would be correct for that viewpoint. All the same points in the display volume in which light was emitted without the opacity function still have light emitted with the opacity function except that with the opacity function, light is only being sent in selective directions. This is shown in FIG. 0-I, in which numbers that are filled black represent points from which light is directed toward a viewer viewing the display volume from the viewpoint used in FIG. 0-I. The numbers that are white with a black outline represent points from which light is sent in other directions, and thus is not visible from the point of view used in FIG. 0-I. What this does is it causes the points that are visible from any particular view point to be those points that—if the filing cabinet were real—would be unobstructed by other parts of the filing cabinet from that point of view. Since the locations in the display volume from which light appears to be emanating can be made to appear to be different depending on view-point, viewers at various locations with respect to the display volume can all be shown a different three-dimensional image. Specifically, the image that each viewer is shown is the one composed of the points of light needed to make the object that is being shown appear to be opaque from that viewer's point of view. Put another way, each viewer sees only the face of the image closest to him or her, but not the face that is rear with respect to that viewer. The result is the illusion of opacity, and the more precisely the directions to which the light producing devices emit light can be controlled, the better the effect of opacity. The way in which the controlling computer determines how to control the lights so as to produce opaque images is a complex, lengthy process, and is explained in the detailed description.

This display consists of several key systems:

The light string or strings; each of which consists of several hundred small lights. Each light (if the opacity feature is being implemented) is able to control the directions that it sends light. This (depending on the embodiment used) requires the direction-controlling light to consist of several smaller lights. If the opacity feature is not being implemented, then the lights send light in all (or as many as possible) directions at once, except the bottom.

The mechanical system that moves the light string or strings. This system is used to move the light string(s) in the proper pattern to produce the needed two levels of dimensional extrusion; that is, going from a 1-dimensional light string to a three dimensional image. This consists of no less than two distinct movements—for example, one movement might be an up-down oscillation, and the second might be a front-back oscillation. What this accomplishes is to essentially "extrude" the one-dimensional light string into a two dimensional surface, which is then extruded to a three-dimensional volume. A complete motion cycle—that is, having nearly every point in the display volume have at least one light pass through it—is completed within the refresh time of the human eye.

Encoding software is needed to take an original three dimensional image stored on a computer and convert it to a collection of sequential streams of information that are sent to a set of decoding electronics in the display which then send appropriate derivative streams of data to the physical lighting elements.

Decoding electronics are used to convert the encoded image coming from the computer into activation and deactivation sequences for the individual lights on the string(s). The decoding electronics are actually attached to the light string(s) and convert the low band-width, high speed data streams that come from the computer into actual instructions for each light.

All of these parts function together to take a three dimensional image stored in a computer and display it inside of a display volume, the shape of which varies with embodiment.

The lights themselves, to be able to control the direction that they send light, are composed (depending on embodiment) of a plurality of smaller lights, each of which has a very narrow viewing angle. Each of these smaller sub-elements are able to activate and deactivate extremely rapidly. In one embodiment, these sub-elements are very small light emitting diode chips. However, in alternate embodiments, any item that is very small and produces a reasonably bright light, that is also easily visible even while the light is rapidly moving, that also has a very short activation and deactivation time, is sufficient to be used instead.

DESCRIPTION OF PRIOR ART

The instant invention involves stage-type three-dimensional displays that employ moving light producing devices. There is not a very large amount of known prior art in this field. One example, though, is contained in U.S. Pat. No. 5,663,740. In that patent, a three dimensional display is discussed in which there is a moving, multi-dimensional matrix of lights. Specifically, a two-dimensional matrix of lights is attached to a moving support structure. The matrix is moved back and fourth rapidly enough to be a blur to a human eye—and thus be able to make any collection of points in a three dimensional volume appear to emit light simultaneously. There is also another embodiment of interest in said patent in which a spiral shaped screen covered with lights (essentially a twisted, two-dimensional matrix of lights) rotates about its central axis faster than the human eye can detect. This, again, allows for any point or points in a cylindrical volume to appear to emit light simultaneously to the human eye.

Initially, these embodiments may seem close to the instant invention. However, there are extremely serious differences. First of all, said prior art requires a two-dimensional matrix of lights in its embodiments. This means that for a modest pixel resolution in the matrix of 640 by 480 pixels, a total of 307,200 light emitting elements are needed. This contributes substantially to the cost of the display. The instant invention requires only from one to several one-dimensional strings of light producing devices. If each string has one thousand light producing devices, and there are ten strings (a liberal number), then a total of only 10,000 light producing elements are needed. The cost savings is extremely substantial.

To accomplish the needed result with so far fewer light producing elements, the instant invention uses at least dual sets of cooperating motion to pass through a substantial amount of the desired volume. For example, a string of lights may move back and fourth (opposing the view) repeatedly (faster than the refresh time of the human eye), while moving left and right much faster still. Thus, nearly the same volume may be covered as in the '740 patent, but with far fewer light producing elements required. One might contend that this added mechanical complexity makes moot the advantages of needing fewer light producing elements. This is believed not to be the case. First of all, the added mechanics do not have to be particularly complex; and its added cost is substantially less than the cost of the magnitudes-greater number of light producing elements required for the '740 disclosure.

In addition, the instant invention includes the capacity to produce opaque images, an ability the prior art reference does not include. One might contend that the similarities between the two inventions would make the opacity system as employable in the prior art patent as it is in the instant invention. This is not the case.

Before explaining exactly why this is true, it might be best to begin with a brief explanation of how opaque images are formed in the instant invention. First of all, one must consider how a non-opaque image is formed by this invention (or by the '740 patent). To form an image, a series of lights is moved in some such way as to have nearly every point in a volume passed through by at least one light producing device within the refresh time of the human eye. Images are produced by emitting numerous bursts of light that, when seen together, appear to form three-dimensional images. The light producing devices that produce the bursts of light are preferably omni-directional, so that a viewer from as wide a range of view points as possible is able to see the points of light that are produced-and thus the resulting image. How could these images, though, be made to appear to have opaque portions?. The answer is to eliminate the omni-directional lights. In the real world, when viewing a physical, opaque object, two viewers standing at different viewpoints with respect to the object being viewed see two different images. One person sees an image of the object from one point of view; and the other person sees an image of the object from a second point of view. Suppose that the exterior of the object (the part that is potentially visible) is thought of as a collection of points; even though one can see only part of the outside of the object at any one time, again, suppose that the entire exterior is composed of points. If this real, physical object is thought of in this manner, it is obvious that all the points are always there, but one viewer only sees some of them—since the rest are obscured by the ones that the viewer does see. Thus, any viewer looking at the object only sees some of these points. Although the preceding was just a modified way to think of opacity in the physical world, it shows a good way to generate the effect of opacity with the instant invention. Ideally, the points of light that compose the three-dimensional images would be able to block one-another, like matter, and thus a viewer would only see the points of light (which compose the image) that are closer to him or her—thus producing opacity. However, we can not do this, but we can attempt to artificially accomplish the same effect, by using light producing devices that dynamically control the directions in which they emit light; that is, a light producing device may be controlled so as to emit light in many directions, just up, just left, etc. Now, whenever a burst of light is produced for an image, the light of the burst is sent only in the directions of viewpoints from which this burst of light should be seen. In other words, if a burst of light is produced that makes up part of the left side of an object, the light of that burst will only be sent left, since a viewer on the right should not be able to see the left side of the object! If this process is followed for every point of the image that is produced, the image will appear to be opaque.

This begs the question of how light producing devices can be made that can be controlled in real time as to what direction(s) they send light. The answer is to make each light producing device a combination of several smaller light producing devices. An example of this is shown in FIG. 51. In FIG. 51, the small squares (one of which is 181) are tiny light producing devices, such as LED chips. These tiny light producing devices (one of which is 181) are laid on a sphere 182; such that the plane of each tiny light producing device (one of which is 181) is perpendicular to the normal of the sphere 182 at the point at which the tiny light producing (one of which is 181) device is located. This causes each tiny light producing device (one of which is 181) to each face and emit light in a different direction. If these light producing devices (one of which is 181) are controlled individually, that which they form is essentially a light producing device that can be dynamically controlled as to which direction(s) it sends light.

This is where the instant invention has a substantial advantage over the prior art. The instant invention, to produce opacity, only requires several thousand (to be liberal with the estimate) direction-controllable light producing devices. If there are 10 strings in use, and each string has 1000 direction-controllable light producing devices, and each direction-controllable light producing device is composed of 10 tiny lights, a total of 100,000 tiny light producing devices are needed. If the opacity concept were to be implemented in the prior art, it would require an enormous amount of light producing devices. Suppose the prior art is being implemented with a matrix of 640 by 480 direction-controlling light producing devices, again with 10 tiny light producing devices per direction-controlling light producing device. Then a total of 3,072,000 tiny light producing devices are needed! It quickly becomes very impractical for the opacity concept to be implemented in the prior art.

In addition, there is another difficulty in implementing the opacity concept in the prior art. This problem, again, rests with the very nature of a two-dimensional matrix. In a matrix, suppose a particular direction-controlling light producing device is sending light in a direction such that the rest of the matrix blocks the light. This would cause a point to potentially become invisible—if that one burst of light is the only time it is supposed to be seen. The matrix itself—even if the matrix is spiral shaped as in one embodiment of the '740 patent—tends to block out other parts of the matrix. It is true that a string does this as well, but to a much lesser extent, because a string can only obscure part of itself in one dimension, a matrix can do so in two! This is one of the main problems with a matrix, and it becomes much less of a problem with one or even several properly positioned one-dimensional strings of light producing devices.

In addition, moving a matrix such as disclosed in the '740 patent through a volume at a great speed will encounter a great deal of air resistance. To alleviate this, the matrix may be enclosed in a vacuum, but this adds new complexity, and can greatly increase the difficulty in repairing the device should it need repairs. These problems are not inherent to a display that uses a system of one-dimensional string(s) of lights as in the instant invention instead of a matrix as in the '740 patent, because a string will encounter much less air resistance due to its linearity.

There are numerous other patents in existence that are sufficiently similar to the '740 patent that they need no individual explanation regarding the distinction between them and the instant invention. Examples of such patents include U.S. Pat. No. 3,154,636 by Shwertz; U.S. Pat. No. 6,115,006 by Brotz; and U.S. Pat. No. 5,748,157 by Eason. The work by Eason includes a lot of work with 2-dimensional image production, and one three-dimensional image production device. This three-dimensional image producing device (shown in FIG. 14 of said patent), however, is still differentiated from the instant invention due to the reasons given for the '740 patent. Further patents that are differentiated from the instant invention for the same reasons discussed earlier include U.S. Pat. No. 5,596,340 by Otomi; U.S. Pat. No. 5,057,827 by Nobile et. al which presents several methods of displaying essentially two-dimensional, curved images in addition to a method for displaying three-dimensional images in FIG. 5 of said patent. Although different in shape from the matrices of other art, this patent still contains a matrix of light producing devices, and one axis of rotation, and so is differentiated from the instant invention for essentially the same reasons given earlier for the '740 patent. Further similar art includes U.S. Pat. No. 4,160,973 by Berlin, Jr. Again, the common idea among these pieces of prior art is that they employ a moving two-dimensional matrix of points of light to produce three-dimensional images. This is the chief distinction between these examples of prior art and the instant invention, which uses from one to several moving one-dimensional strings of lights to produce a three-dimensional image. Other prior art that tends to use a projection based image production techniques include U.S. Pat. No. 6,064,423 by Geng; U.S. Pat. No. 6,054,817 by Blundell; U.S. Pat. No. 6,052,100 by Soltan et al.; U.S. Pat. No. 5,954,414 by Tsao; U.S. Pat. No. 5,854,613 by Soltan et al.; U.S. Pat. No. 5,754,147 by Tsao et al.; U.S. Pat. No. 5,162,787 by Thompson et al.; and U.S. Pat. No. 4,983,031 by Solomon. Since some or all of these employ projection in at least one embodiment, the projection alone differentiates these from the instant invention—which does not use projected images, as it is of the stage type.

BRIEF DESCRIPTION OF DRAWINGS

FIGS. 0-A through 0-D show an isometric view (part way between a front, top, and right viewpoint) of a three-dimensional wire-frame image of a file cabinet as produced by the three-dimensional display at 25%, 50%, 75% and 100% completion of the image respectively. The numbers in the image represent bursts of light, with higher numbers representing more recently produced bursts of light.

FIGS. 0-E through 0-H show an isometric view (part way between a front, top, and right viewpoint) of a three-dimensional wire-frame image of a file cabinet shown opaque as produced by the three-dimensional display at 25%, 50%, 75%, and 100% completion of the image respectively. The numbers represent bursts of light, with higher numbers representing more recently produced bursts of light.

FIG. 0-I shows an isometric view (part way between a front, top and right viewpoint) of the same object shown in FIG. 0-H, except here, the numbers that represent bursts of light that would not be seen because they are directed towards other directions, are drawn with a white interior and a black outline for each numeral.

FIG. 6-A shows the same thing from the same viewpoint as FIG. 5 but the axes that describe rotation are shown too (those axes being elements 5, 6, 7).

FIG. 6-B shows the arrangement of two of the four spiral light strings for an alternate embodiment in which four strings are used, from an isometric view.

FIG. 6-C shows the same embodiment as FIG. 6-B, but from a front view.

FIG. 6-D shows the same alternate embodiment from FIG. 6-B, except that now, all four spiral light string support structures are shown. This image is from an isometric view.

FIG. 26 also shows a detailed view indicating the basic method by which such an embodiment may function, and a basic idea of what components may be used.

FIG. 27 also shows a detailed view indicating the basic method by which this device functions and a basic idea of what components are used.

FIG. 28 also shows, close up, the linear commutator among other things.

FIG. 29 also shows a detailed view indicating the basic method by which this device functions and a basic idea of what components are used.

FIG. 34 also includes a close up view of the linear commutator used in the embodiment in FIG. 29.

FIG. 36 also shows, close up, the infrared receiver, and the induction-based electricity transfer mechanism used in the embodiment shown in FIG. 35.

FIG. 37 also shows a detailed view indicating the basic method by which this device functions and a basic idea of what components are used.

FIG. 42 also shows a detailed view indicating the basic method by which this device may function and a basic idea of what components may be used.

FIG. 43 also includes a close up view of the linear commutator used in the embodiment shown in FIG. 42, as well as other things.

FIG. 44 also shows a detailed view indicating the basic method by which this device may function and a basic idea of what components may be used.

FIG. 45 also includes, among other things, the linear commutator for the embodiment shown in FIG. 44.

FIGS. 47-A and 47-B show a front and rear view, respectively, of an object that consists of two photographs glued together—back to back. The front face of which has a picture of a circle on it, and the rear face has a picture of a triangle on it.

FIG. 48-A shows the object referred to in FIGS. 47-A and 47-B within a cylindrical volume (that represents a display volume) from the point of view of one who is standing taller than the display volume, north of the display volume, and slightly to the left of the display volume.

FIG. 48-B shows the same scene as FIG. 48-A but from the point of view of one who is standing taller than the display, south of the display and slightly left of the display.

FIG. 52-A shows the contents of the data grid when it contains a file-cabinet image composed of points with activity flags turned on, and a square area composed of points with opacity flags turned on.

FIG. 52-B shows a block diagram showing a way through which the computer can determine if a particular tiny, direction-specific lighting element on a direction-controlling light should be activated or not.

FIG. 62 shows a block diagram of a way in which the lights in a color embodiment are addressed.

EXPLANATION OF NUMBERED ITEMS

FIG. 3

Figure 1:
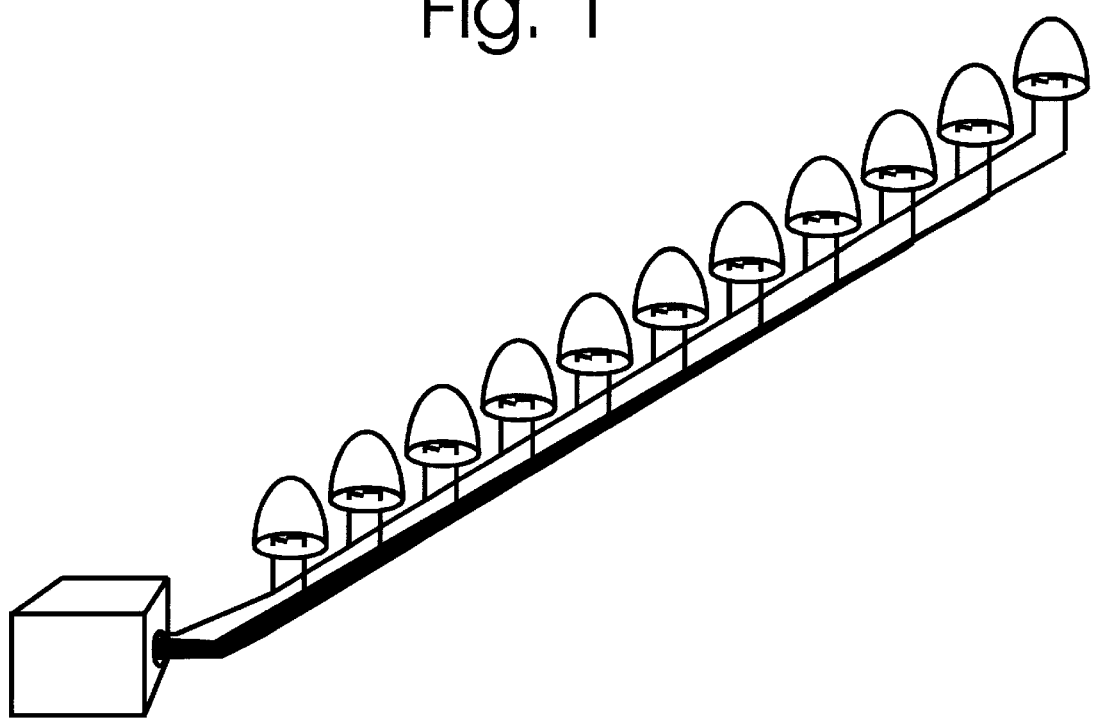
FIG. 1 is a front view of several light emitting diodes that form a "light string" and the wiring through which they connect to the electronics that control them, known as "decoding electronics".

1. Light string. 2. The second light string. 3. The first cylindrical support structure. 4. The second cylindrical support structure.

FIG. 6-A

5. The vertical axis running through the center of the first cylinder. 6. The vertical axis that runs between the two cylinders and light strings. 7. The vertical axis running through the center of the second cylinder.

FIG. 6-B

601. The first spiral support structure that supports a spiral of lights. 602. The second spiral support structure for supporting a spiral of lights. 603. The central rotational axis for the first spiral. 604. The central rotational axis for the second spiral.

FIG. 6-D

605. The third spiral support structure for supporting a spiral of lights. 606. The fourth spiral support structure for supporting a spiral of lights. 607. The central rotational axis for the third spiral. 608. The central rotational axis for the fourth spiral.

FIG. 7

8. The central gear for the planetary gear system. 9. The partly hollow shaft that runs through the center of the central gear, and is able to rotate in it. 10. A horizontal support shaft. 11. Gear box. 12. Gear box. 13. Partly hollow vertical shaft. 14. Partly hollow vertical shaft. 14. Partly hollow vertical shaft. 15. Gear. 16. Another gear. 17. Motor. 18. Array of metal, ring shaped contacts that form one half of a commutator. 19. Another array of metal ring shaped contacts that form one half of a commutator. 20. Non-conductive shaft extension. 21. Another non-conductive shaft extension. 22. The brush side of a commutator. 23. Another brush side of a commutator. 24. A third array of metal ring shaped contacts that form one half of a commutator. 25. A third brush side of a commutator. 26. A hole. 27. A set of decoding electronics. 28. Another set of decoding electronics. 30. A wire. 31. The driver electronics. 32. A cable containing many wires. 33. A vertical support rod. 34. Another vertical support rod. 35. A horizontal stabilizer bar. 36. A vertical connecting rod.

FIG. 9

37. A transparent stabilization platform. 38. Long bolts. 39. A small rotational bearing.

FIG. 23

40. Brushes for rotational commutator system. 41. Contact rings for rotational commutator. 42. A set of decoding electronics. 43. Another set of decoding electronics. 45. Direct drive motor. 46. Another direct drive motor. 47. Circular array of infrared transmitters. 48. Another circular array of infrared transmitters. 49. infrared receiver. 50. Another infrared receiver. 52. Permanent magnet. 53. Another permanent magnet. 54. Metal cylinders with wires coiled around each one. 55. Another set of metal cylinders with wires coiled around each one.

FIG. 24

51. Holes in the cylinder through which wires pass.

FIG. 26

64. Support structure made of Plexiglas. 65. String of lights embedded in a support structure. 66. Electric motor. 67. A belt. 68. Another electric motor. 69. A rotating platform. 70. Decoding electronics. 71. A rotational commutator system. 72. Driver electronics. 73. Support arm. 74. Another support arm. 75. Array of brushes for a rotational commutator. 76. Array of rings for a rotational commutator. 77. Another belt. 78. A representation of a spherical volume.

FIG. 27

79. A half of a light string. 80. The second half of a light string. 81. An object (referred to as a nut) that is complementary to a threaded rod in the same way that a nut is complementary to a bolt. 82. A threaded rod. 83. A non-threaded rod. 84. A rotational bearing. 85. Another rotational bearing. 86. An extension to link a rotational bearing with the non-threaded rod. 87. A second extension to link a rotational bearing with the non-threaded rod. 88. An extension to connect the item referred to as the nut to the non-threaded rod by means of a rotational bearing embedded in the extension. 90. An electric motor. 91. A belt. 94. An array of ring contacts for a rotational commutator. 95. An array of brushes for a rotational commutator. 96. Driver electronics. 97. A representation of a cylindrical volume.

FIG. 28

89. A rotational bearing. 92. A set of decoding electronics. 93. Several metal contact strips for a linear commutator. 195. An array of brushes for a linear commutator.

FIG. 29

98. A light string. 99. A linear bearing. 100. A non-threaded rod. 101. A rotating platform. 102. A support arm. 103. Another support arm. 104. An object (referred to as a nut) that complements a threaded rod in the same way a nut complements a bolt. 105. A threaded rod. 106. A rotational bearing. 107. Another rotational bearing. 108. An electric motor. 109. A belt. 110. Another electric motor. 111. Another belt. 112. An array of brushes for a rotational commutator. 113. An array of contact rings for a rotational commutator. 117. Several wires. 118. Driver electronics. 135. A representation of a cylindrical volume.

FIG. 34

114. An array of brushes for a linear commutator. 115. An array of metal contact strips for a linear commutator. 116. A set of decoding electronics.

FIG. 35

119. A series of electromagnets. 120. A permanent magnet sleeve. 121. The bar on which the series of electromagnets lie. 122. A controller for an electromagnet rod. 123. An infrared receiver. 128. A magnetic, non threaded rod. 132. An array of brushes for a rotational commutator. 133. An array of contact rings for a rotational commutator. 134. Driver electronics. 135. A representation of a cylindrical volume.

FIG. 36

124. An infrared receiver. 125. A set of decoding electronics. 126. A tightly coiled wire. 130. A magnetic field line indicating the direction of a magnetic field. 131. An arrow indicating direction of motion of the light string along the rod.

FIG. 37

136. A light string. 137. A representation of a cubic volume. 138. A series of electromagnets attached to a rod. 139. A permanent magnet sleeve. 140. A second series of electromagnets attached to a rod. 141. A permanent magnet sleeve. 142. A third series of electromagnets attached to a rod. 143. A permanent magnet sleeve. 144. A linear bearing. 145. A non-threaded rod. 146. A cable containing multiple wires. 147. Driver electronics. 148. Another cable containing multiple wires.

FIG. 42

149. The two parts of a string of lights. 150. A series of electromagnets attached to a rod. 151. A permanent magnet sleeve. 152. The two parts of a light string support structure—possibly made of Plexiglas. 153. A rotating support platform. 154. An array of contact rings used in a rotational commutator. 155. An array of brushes used in a rotational commutator system. 156. A gear with a large hole in the middle.

157. A non-threaded rod. 158. A second non-threaded rod. 159. An array of metal contact strips. 160. An array of wires. 161. A linear bearing. 162. A second linear bearing. 163. A panel made of a light, strong, material. 165. Several wires. 166. Driver electronics. 168. An electric motor. 169. A gear. 170. A representation of a cylindrical volume.

FIG. 43

164. An array of brushes used in a linear commutator. 167. A set of decoding electronics.

FIG. 44

171. A series of electromagnets attached to a rod. 172. Two parts of a light string. 173. A permanent magnet. 174. A connecting bar. 175. An array of brushes used in a rotational commutator. 176. An array of contact rings used in a linear commutator. 177. An electromagnet rod controller.

FIG. 47-A

178. An object consisting of two photographs (one of a triangle, and one of a circle) glued together back to back.

FIG. 48-A

179. A representation of a cylindrical volume.

FIG. 50

180. A light emitting device that can control the direction in which it emits light.

FIG. 51

181. A light emitting diode chip. 182. A small sphere.

FIG. 58

187. A red, tiny, direction-specific lighting element. 188. A green, tiny, direction-specific lighting element. 189. A blue, tiny, direction-specific lighting element.

DETAILED DESCRIPTION

Figure 2:
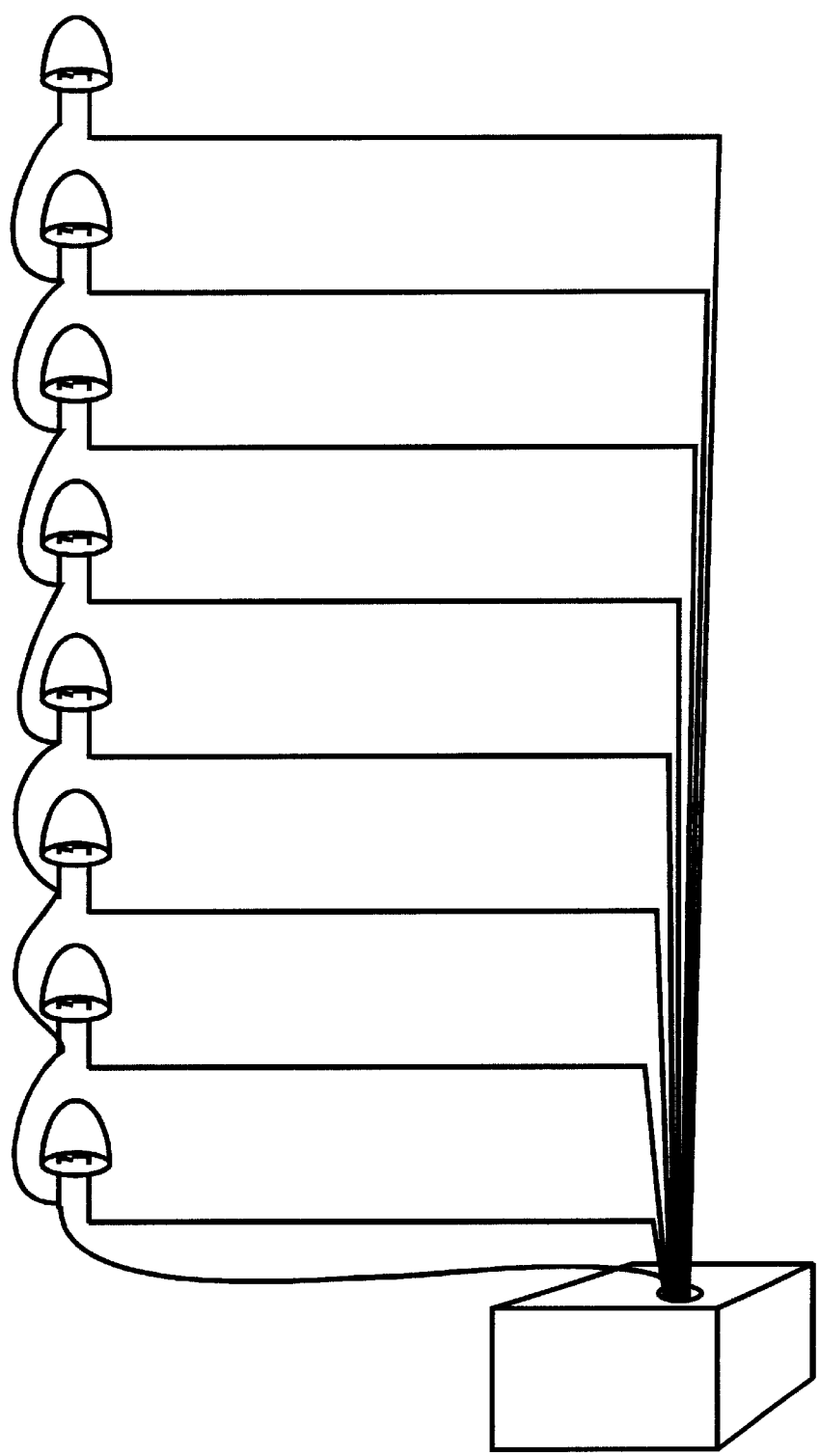
FIG. 2 is a front view of several light emitting diodes that form a string, much in the same way a in FIG. 1, except that the wires going from the LEDs first go a distance away from the LEDs, perpendicular to the string of LEDs, and then change direction and continue into the controlling electronics (the "decoding electronics").

Before discussing the actual embodiments of the display, an integral item to the display should be discussed first, so there will be no misunderstanding about it later. This item is called a light string. It is a collection of as many as several hundred or more very small lights. Two examples of this are shown in FIGS. 1 and 2, each of which shows far less than hundreds of lights so that FIGS. 1 and 2 are more understandable. The lights form a string, by each successive light being adjacent to the light before it. These lights are addressable individually, and thus each one's positive terminal is connected to the electronics that control the lights, the negative terminals are all connected to the common ground. These electronics are, in this document, be known as the decoding electronics for reasons that will become clear later. Depending on the embodiment of the display in which the light string is used, the wires from the lights may form a bundle as the wires go to the end of the string, as shown in FIG. 1; or the wires may go perpendicular to the string to some central axis, at which point they change direction and all head in the same direction, and form a bundle, as shown in FIG. 2. Since it is unnecessary to have each light drawn in each figure in the drawings, where hundreds of lights may be signified, a light string is represented by a line, except when the figure is a close-up, then the lights are drawn individually.

Embodiment 1-A: In this embodiment, there are two adjacent, vertically spiraling strings of lights, each of which rotates around the vertical (Z) axis that runs between them, while simultaneously rotating about the vertical (Z) axis that runs through the center of each of the spirals. Thus, each spiral rotates about its own respective central, vertical axis, while simultaneously rotating about the vertical axis that runs between the two spirals. One of the two rotations is done much faster then the other.

The following is the first embodiment of the three-dimensional display. In all of the following embodiments, the ability to produce opaque images and the ability to produce color (or even non-monochromatic) images are not included. Since it would greatly add to the complexity of the description of each embodiment if these features are included, they are left out now, and explained in terms of all of the embodiments after all of the embodiments have been discussed. In this embodiment, the shape of the physical volume in which the images are generated is a cylinder. Also in this embodiment, there are 2 light strings, each of which has 500 lights on it.

Figure 3:
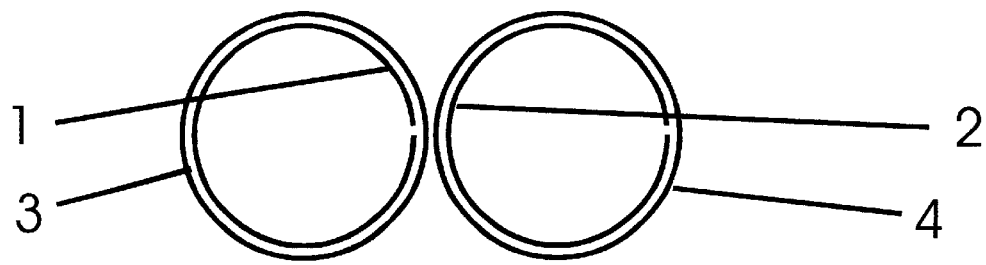
FIG. 3 is a top view of two cylindrical support structures with a light string running along the interior wall of each one.
Figure 4:
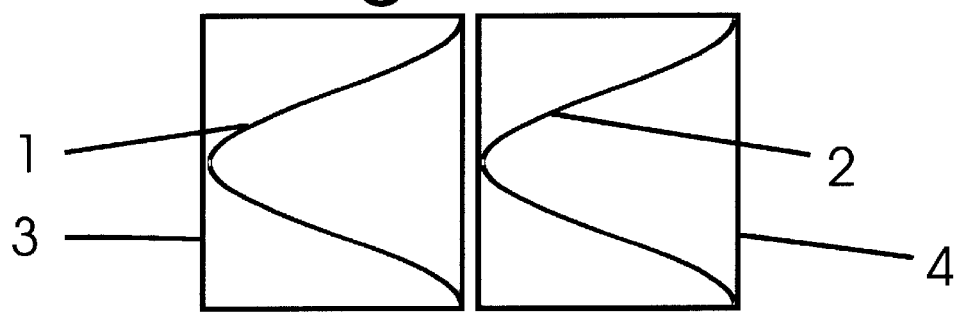
FIG. 4 shows the same items as FIG. 3, but from a front view.
Figure 5:
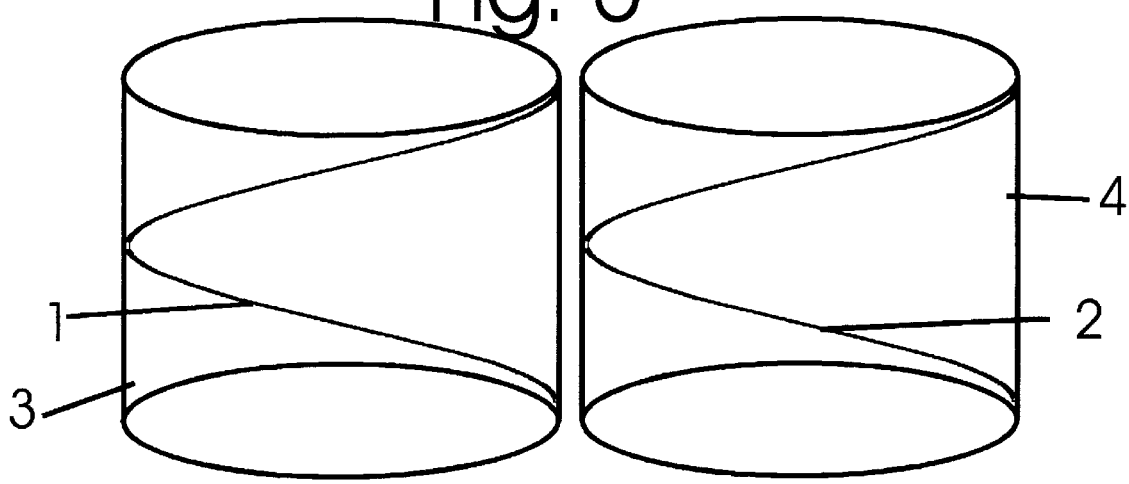
FIG. 5 shows the same items as FIGS. 3 and 4, but from a viewpoint partway between front and top.

To sweep through the above mentioned volume, which in this embodiment is cylindrical, two light strings (1 and 2), move very rapidly through the entire said volume. The dimensions of said volume, in this embodiment, are 30 centimeters in diameter, and 20 centimeters in height. Each of the two strings (1 and 2) of lights is composed of, in this embodiment, 500 lights. Each light has a diameter of approximately 1 millimeter and a height of approximately half of a millimeter. Each light is required to have the largest viewing angle possible, preferably 180 degrees or more, and each light may be a light emitting diode chip. As this embodiment is intended to produce only monochromatic images, the lights are all the same color—such as yellow, although it does not significantly matter. The strings of lights (1 and 2) are formed from the individual lights that compose them by placing each string of lights (1 and 2) along the inside wall of a transparent cylinder (3 and 4), as shown in FIGS. 3 through 5. Specifically, along the walls of each of the two cylinders (3 and 4), 500 lights each are placed. Each cylinder wall is composed of a strong, thin, transparent substance, such as acrylic. The dimensions of each of these cylinders (3 and 4) are 15 centimeters in diameter, and 20 centimeters in height. The bottom of these cylinders (3 and 4) need not be transparent, and may be composed of a stronger substance, such as titanium, but no thicker than a millimeter or two. The tops of these cylinders (3 and 4) must be transparent, and thus may be composed of some type of plastic or acrylic. The lights are placed along the inside of the walls of their respective cylinders (3 and 4) so as to form a spiral. Each of these spirals (1 and 2) is 360 degrees in this embodiment, with the first light being placed at the bottom of the wall of that cylinder, and the last light being placed at the top. Both cylinders (3 and 4) are oriented vertically; that is, their respective height dimensions are vertical, and their circular bases are horizontal/ground; and the cylinders (3 and 4) are located immediately next to one-another. This lighting configuration is employed in the embodiments dealt with in FIGS. 3 through 25.

Figure 7A:
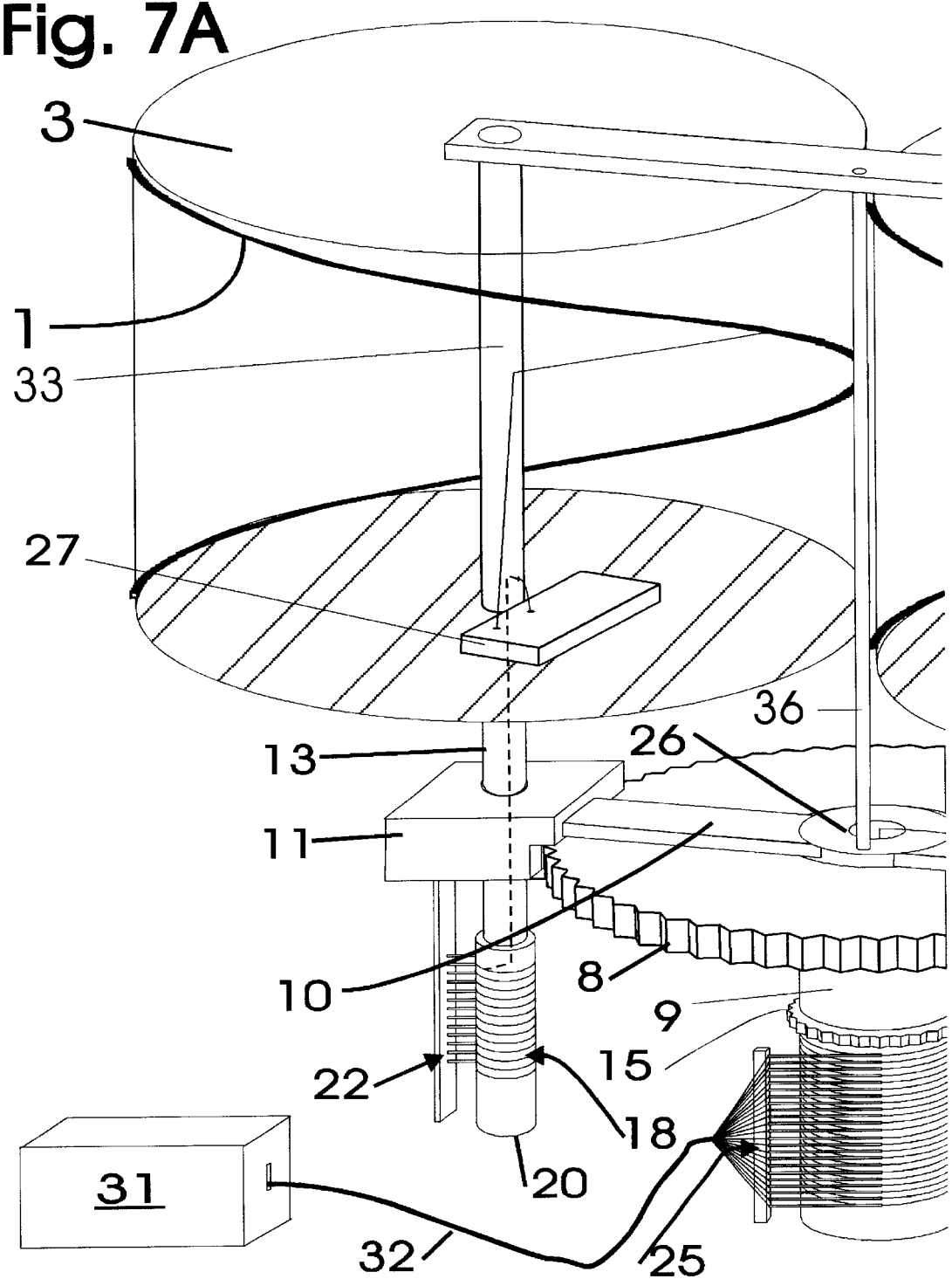
FIGS. 7A–7B show an embodiment of the three dimensional display employing 2 rotating cylinders, each having at least one string of lights, with the two cylinders also rotating about a common axis. This is shown from a viewpoint between front and top. In this view, nearly all components of the embodiment are shown. This embodiment includes cylindrical support structures for the light strings, the light strings, the power and data transmission systems, and the mechanical system for moving the cylinders.
Figure 7B:
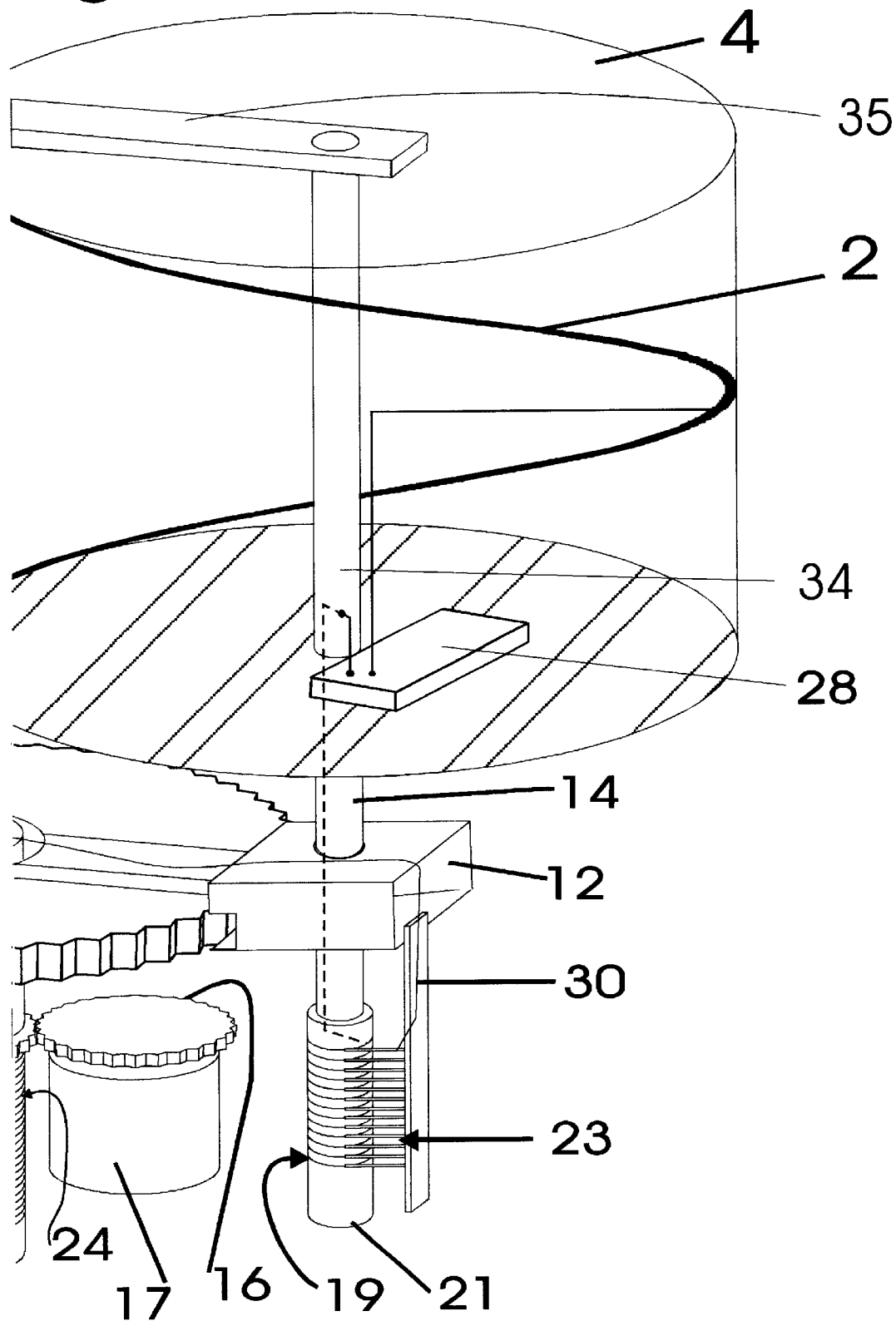

These two cylinders (3 and 4), with light strings (1 and 2) attached, are caused to rotate very rapidly (on the order of tens of thousands of rotations per minute) and as a result, more centripetal force may (depending on the exact rotational speed selected) be needed to support the lights than can be provided by the acrylic wall of each of the cylinders (3 and 4). Thus, as shown in FIG. 7, there is a metal rod (33 and 34) running from the bottom to the top of each of the cylinders (3 and 4); and each light on each cylinder (3 and 4) is connected to these metal rods (33 and 34) by means of a thin material with a very high break strength. An example of such a material is Dupont's Kevlar, in filament form. Please note that these connectors are not shown in any of the figures.

Figure 8:
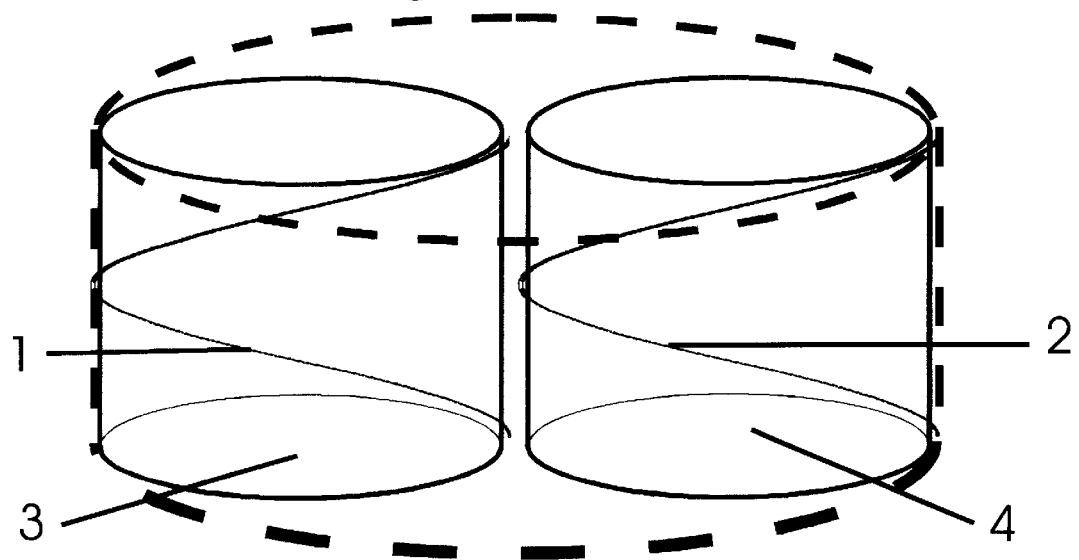
FIG. 8 shows the two cylindrical support structures with the light strings attached of the embodiment shown in FIG. 7. The dotted cylinder shows the display volume relative to those cylinders.

These cylindrical assemblies (3 and 4) are caused to rotate in a fashion such that nearly every point of space in the above described volume, the dotted cylinder shown in FIG. 8, is passed through by at least one light within the time of a complete cycle through the motion pattern which will be described presently. Simply, this motion pattern is produced by having the cylinders (3 and 4) rotate about their respective vertical central axes (5 and 7 as shown in FIG. 6-A), while simultaneously having them rotate around the vertical axis 6 that runs between them. The cylinders (3 and 4) rotate about one of these axes (5 and 7, respectively, or 6) significantly faster (in terms of rotations per minute) than the other. In this embodiment, the cylinders (3 and 4) rotate around their respective vertical central axes (5 and 7) much faster (about 40 times faster) than about the vertical axis 6 that runs between them. Also, one of the cylinders (3 or 4) starts out rotated with a rotational angle about its central axis (5 or 7, respectively) of Pi divided by 40 radians compared to the other cylinder.

To get a better understanding of the goal that all of this accomplishes, please consider the following hypothetical situation: A small writing implement, such as a pencil, is attached to each of the top lights on the two cylinders (3 and 4); that is, one pencil is on the top light of the first cylinder 3 and one pencil on the top light of the second cylinder 4. Consider the pencils to be mounted in such a way that their tips are facing upwards, that is, the pencils are upside down. As the cylinders (3 and 4) are moved in the above described pattern (that is, each cylinder (3 and 4) is rotating about its own central vertical axis (5 and 7, respectively) while simultaneously rotating about the vertical axis 6 that runs between both cylinders (3 and 4), but the latter being done much more slowly), suppose that a piece of writing material (such as a stiff piece of paper) were placed just above the pencils, such that the pencils would write on the paper as the cylinders, to which they were indirectly connected, turned. After each of the cylinders (3 and 4) have made one complete (360 degree) rotation about the middle axis 6 that runs between the two cylinders (3 and 4), and thus made about 40 rotations about each one's respective central axis (5 and 7), a pattern will have been drawn on the piece of paper. More precisely, two patterns will have been drawn, one by one pencil, and one by the other pencil. If this thought-experiment were actually done, the pattern produced by one of the pencils would appear as shown in FIGS. 10 through 13 which shows the pattern that that pencil would produce at 25% of completion, 50%, 75%, and 100% respectively. The pattern produced by the second pencil is shown in FIGS. 14 through 17. If both patterns were overlaid, to produce one image, it could be seen as shown in FIGS. 18 through 21.

Figure 21:
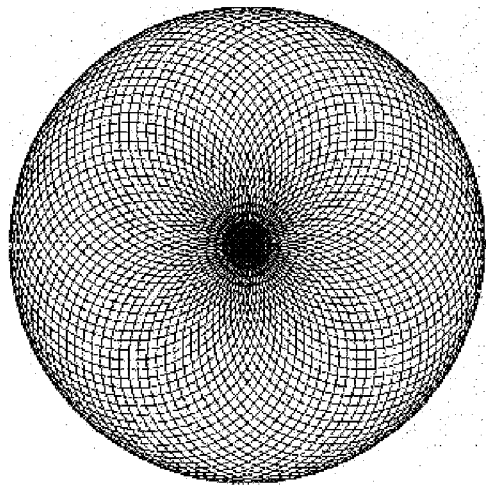
Figure 22:
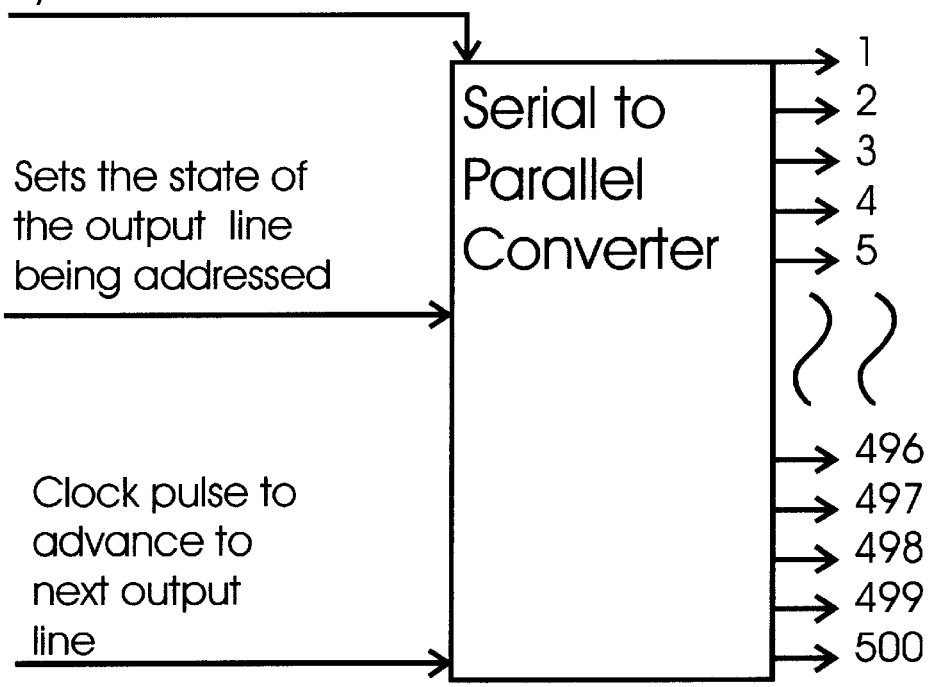
FIG. 22 shows a block diagram of how the several hundred lights that compose a light string can be controlled by just several input signals. This task is largely what the decoding electronics perform.

As one can observe in FIG. 21, which represents both patterns laid on top of one another at 100% completion, the perimeter of the pattern is nearly a circle, and most of the area of that circle is filled in by the pattern. Recall that the pattern represents the path through which two lights (both of which at the same constant height) pass. Recall also that, although the lights that produced the pattern shown in FIG. 21 are highest on their respective cylinders (3 and 4), there are 499 other pairs of lights, each successive pair being at a slightly lower height, concluding with the pair that is at the bottom of the cylinders (3 and 4). The result of this is that there are 500 stacked layers of circles (one for each pair of lights), the areas of which are mostly filled by lights passing through them in the pattern described previously—thus nearly producing a cylindrical volume (represented by the dotted cylinder in FIG. 8. This means that as the cylinders (3 and 4) (with lights attached) make one complete rotation around the vertical axis that runs between them 6 (and thus make 40 rotations around their respective axes (5 and 7)), most of the points in a cylindrical volume (the dotted cylinder in FIG. 8) are passed through by at least one light. Thus, by having each such cycle be performed within the refresh time of the human eye (at most ⅟10 seconds), nearly any point in the cylindrical volume (the dotted cylinder in FIG. 8) can be made to appear to glow by having the proper light give out a burst of light when it is passing through the area that is intended to glow. By carefully coordinating these glows, images are formed from collections of light bursts. The images that are formed are translucent and monochromatic. That is, any point in the image is either emitting light or not emitting light. Embodiments that produce images consisting of multiple colors are discussed later.

Figure 9:
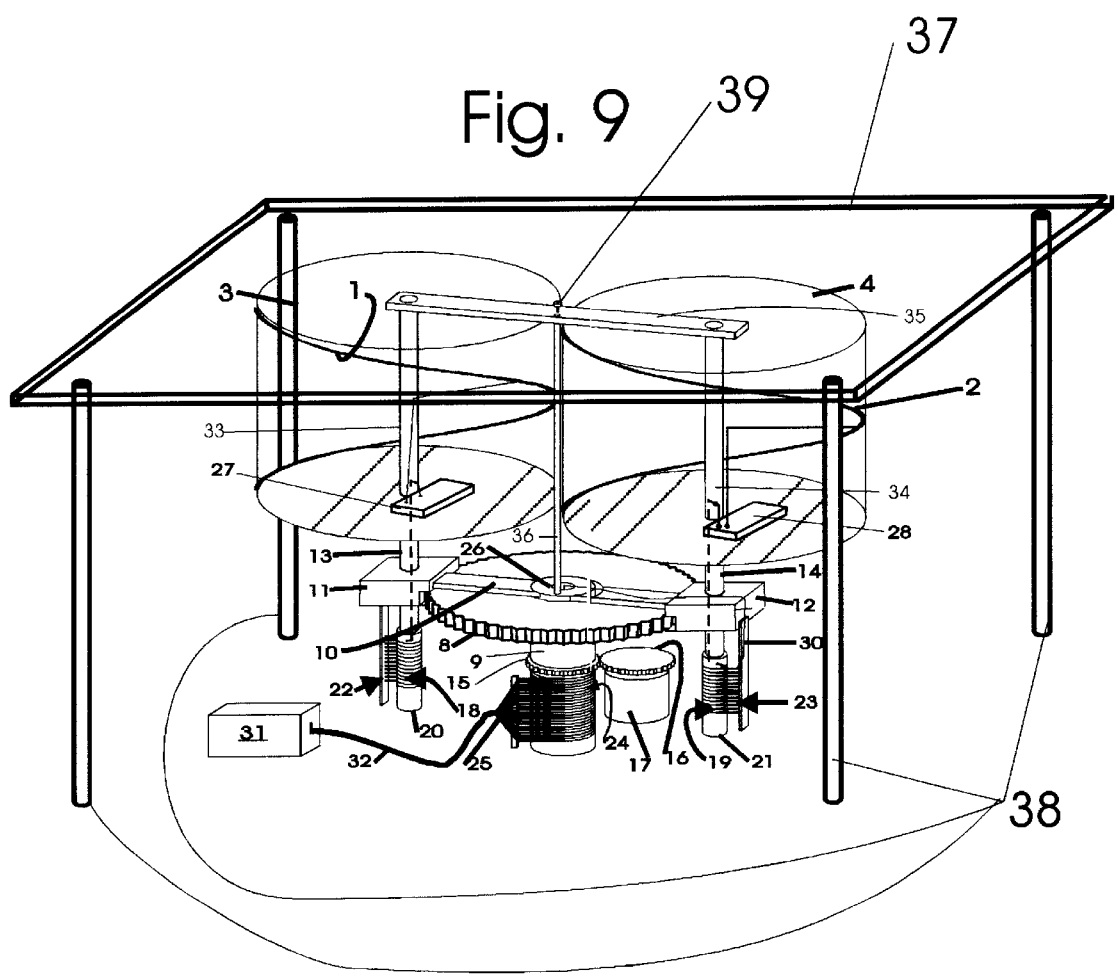
FIG. 9 shows the same embodiment as FIG. 7, except with a stabilization panel above the display, to which the upper support bar of the display is connected by means of a rotational bearing.
Figure 10:
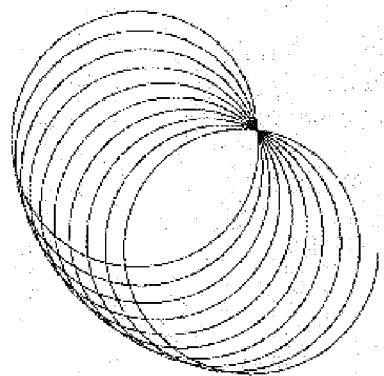
FIGS. 10–13 show the pattern of space passed through by one light from one light string of one cylinder used in the embodiment of FIG. 7; after 25%, 50%, 75%, and 100% completion of a rotational cycle respectively.
Figure 11:
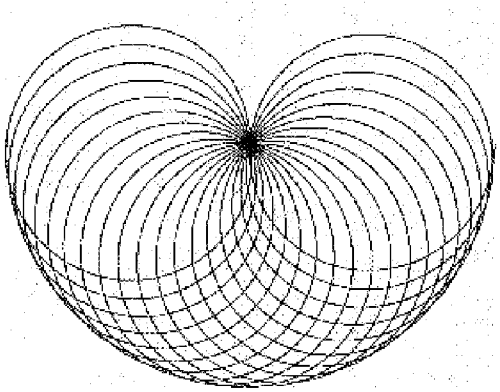
Figure 12:
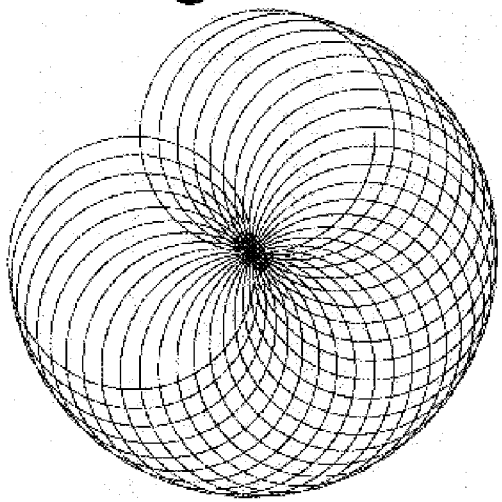
Figure 13:
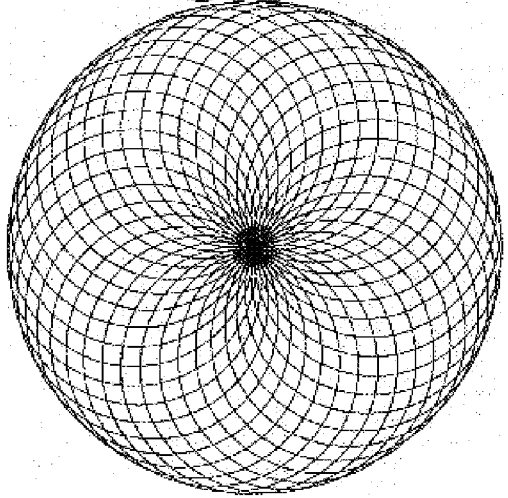
Figure 14:
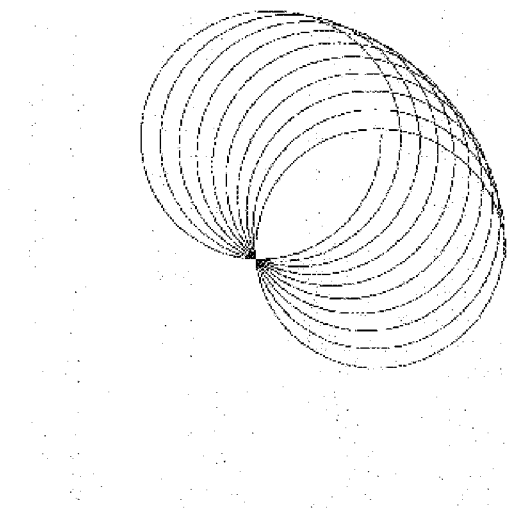
FIGS. 14–17 show the same concept as FIGS. 10–13, except that FIGS. 14–17 show the pattern produced by a light at the same height but on the opposite cylinder of the light that produced the pattern in FIGS. 10–13.
Figure 15:
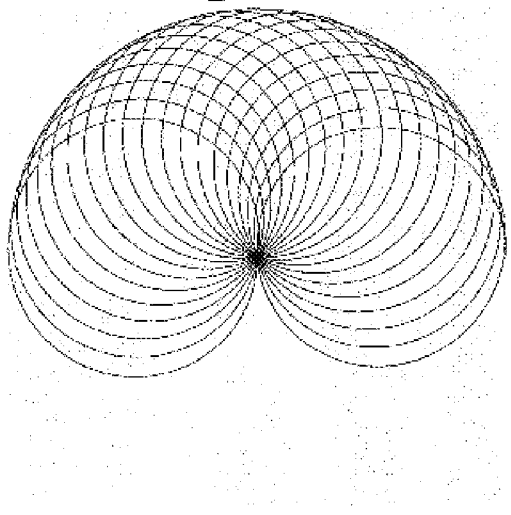
Figure 16:
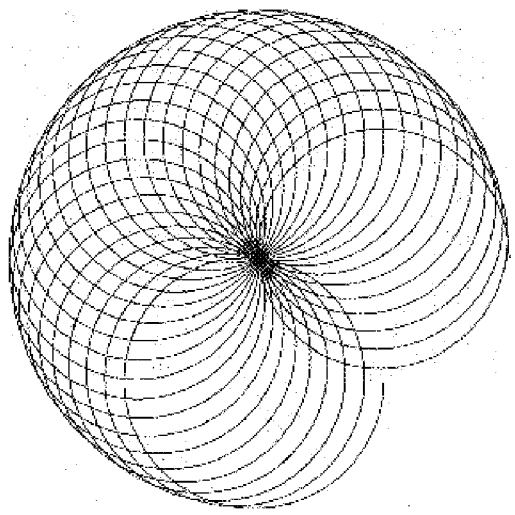
Figure 17:
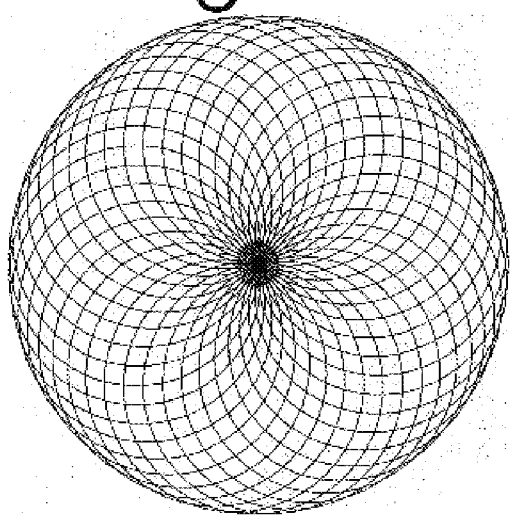
Figure 18:
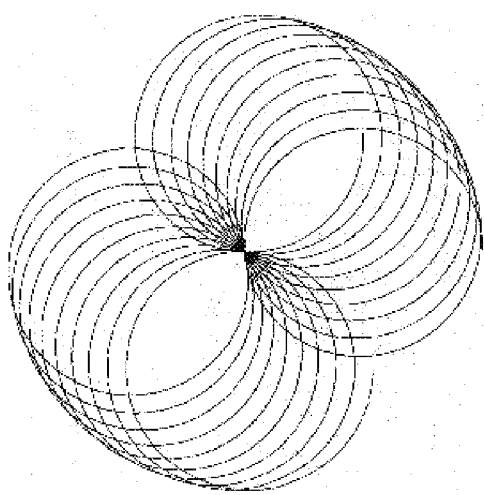
FIGS. 18–21 show (for the embodiment of FIG. 7) the patterns produced in FIGS. 10–13 and the patterns produced in FIGS. 14–17 overlaid on top of one-another. This is significant because there really are two radially moving and simultaneously rotating cylinders, and for every height, there are two lights (one on each cylinder).
Figure 19:
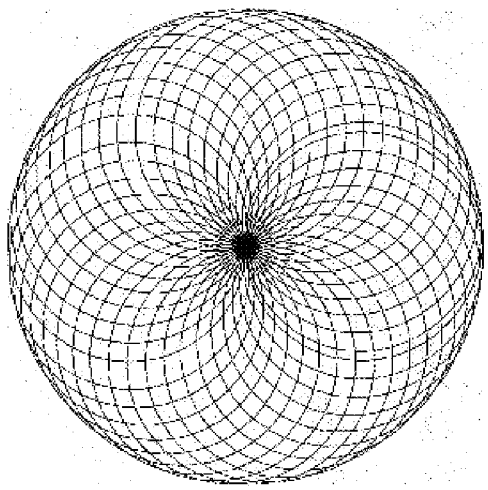
Figure 20:
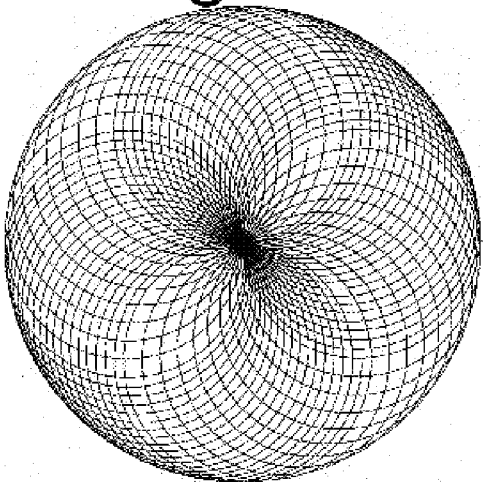

While there are many possible ways to actually implement this first embodiment, the following is one possibility. In this implementation, shown in FIG. 7, a planetary gear system is used. The central gear 8 is fixed in place and has a shaft 9 coming through a hole in the central gear's 8 middle; the shaft 9 is kept in place by bearings, and thus is able to rotate freely and independently of the gear 8. Attached to this shaft 9 is a bar 10 that extends in both directions almost to the end of the central gear 8. Attached to both ends of this bar 10 are gear boxes (11 and 12). One "end" of the gearing system in these gear boxes (11 and 12) meshes with the central gear 8. The other "end" of each gearing system meshes with a gear (which is not shown since it is inside the gear box) on each vertical shaft (13 and 14) extending from the top and bottom of each of the gear boxes (11 and 12). The gear boxes (11 and 12) are geared so that they cause the shafts (13 and 14) to spin a certain number of times faster than the gear boxes (11 and 12) are rotating around the central gear 8. In this particular implementation, it is assumed to be 40 times. Attached to the top ends of the shafts (13 and 14) are the two cylinders (3 and 4) with the strings of lights (1 and 2 respectively) attached. Again, in this particular implementation, each string (1 and 2) is composed of 500 lights. Attached the central shaft 9, is a gear 15 that meshes with a gear 16 on the shaft of a motor 17. As discussed earlier, the lights on each cylinder (3 and 4) are anchored to metal rods (33 and 34) running vertically through the center of each of the cylinders by means of a material with a very high break strength (such as Dupont's Kevlar, in filament form). The cylindrical support structure are thus mainly used to keep the lights in the proper positions, but not to keep them from flying through the wall of the cylinder (please recall that the lights are on the inside wall of the cylinders (3 and 4)). Due to the extremely high rate of rotation, additional structures might be needed to hold the tops of the cylinders (3 and 4) completely in line with the bottom, thus preventing "wobble" of the cylinders (3 and 4) as they rotate. The structure, in this case, begins with a second horizontal bar 35—similar to 10 except less wide and preferably (although not necessarily) transparent. This second bar 35 is placed slightly above the two cylinders (3 and 4) and oriented the same way as the first bar 10. This second bar is connected to the first bar 10 by means of a thin, very rigid, vertical rod 36 going from the first bar 10, up past the cylinders (3 and 4), and to the second bar 35. The second bar 35 attaches to the respective middles of the tops of the cylinders (3 and 4) by means of a bearing system. Thus, allowing the cylinders (3 and 4) to rotate but not allowing their tops to "wobble." As a further method, shown in FIG. 9, to prevent "wobble" of the cylinders, a clear, strong panel 37 (made of a material such as Plexiglas) is placed slightly above the second bar 35 and anchored to the ground with long bolts 38, as shown in FIG. 9. This panel 37 is square and has a length that is at least twice the diameter of one of the cylinders (3 and 4). It 37 is anchored by its corners so that the cylinders (3 and 4) do not hit the anchor bolts 38 as the cylinders (3 and 4) move. Embedded inside this clear panel 37 (at approximately the middle) is a very small rotational bearing 39, and the second bar 35 has a very small rod extending vertically from it, and into the bearing 39. Thus, as the second rod 35 rotates, its center is kept from wobbling by the bearing 39—which turn prevents some of the potential wobble of the cylinders (3 and 4).

The result of this is that the motor 17 rotates the shaft 9 which rotates the bar 10, which rotates the gear boxes (11 and 12) around the central gear 8. The motor 17 is, in this particular implementation, rotating the gear boxes (11 and 12) at a rate of about 900 RPM. The gear boxes (11 and 12), in turn, cause the shafts (13 and 14) and thus cylinders (3 and 4), to rotate extremely rapidly, which in this implementation is about 36,000 RPM. The result of all this rotation is that the cylinders (3 and 4), with the lights (1 and 2) attached, rotate around their respective central axes (5 and 7) while simultaneously rotating around the common middle axis 6. And they make one full middle axis 6 rotation too quickly for the human eye to determine that motion is occurring.

As the light strings (1 and 2) (since they are attached to the cylinders (3 and 4)) rotate, they need electricity and information to cause them to activate and deactivate in the correct sequences needed to produce images. One way that this is achieved is by employing a series of commutators. Specifically, three commutators are needed. One commutator transfers electricity from the stationary power and information supplying electronics to the main rotating shaft 9; this will be known as the primary commutator—it is composed of a set of brushes 25 that contact metal rings 24 that are attached to the shaft 9. The information that is transferred is activation sequences for the lights on the first cylinder, and activation sequences for the lights on the second cylinder. The first of the remaining two commutators (composed of brushes 22 and contact rings 18) takes the information intended for the lights on the first cylinder from the primary commutator (composed of 25 and 24), and transfers it to the first cylinder 3 while it is rotating. The last remaining commutator (composed of a set of brushes 23 and contact rings 19) takes the information intended for the lights on the second cylinder 4 from the primary commutator (composed of 25 and 24) and transfers it to the second cylinder 4 while it is rotating.

A specific format in which to transfer the information is needed, and there are several format choices available. The simplest format is done by having 1001 contacts on the primary commutator (composed of 25 and 24): 500 contain the states of the 500 lights on the first cylinder 3, 500 contain the states of the lights on the second cylinder 4, and 1 is the ground. Each of the other two commutators (composed of 22 and 18 and; 23 and 19) have 501 contacts: 500 for the states of the lights on the cylinder (3 or 4) that that commutator (composed of 22 or 18 and; 23 and 19) is connected to, and 1 wire for the ground. While this technically gets the information to its destination, it is extremely impractical. Thus, the information should be encoded in some manner that allows it to be sent over fewer wires at once. In fact, all the information that a cylinder's lights (1 or 2) need can be sent over two wires (with a third for ground). The first wire, in this case, is used to specify the state of a light (that being on or off) and the second wire acts as a clock pulse. In other words, electronics (27 or 28) (which will be referred to as "decoding electronics") in a cylinder (3 or 4) start out setting the state of the first light on that cylinder (3 or 4) by checking the state of the first of the two aforementioned wires. When the second wire fires a pulse, the electronics (27 or 28) set the state of the second light to the state of the first wire. When the second wire fires a pulse again, the electronics (27 or 28) set the state of the third light to the state of the first wire. This continues until the 500$^{th}$ light, at which time the electronics (27 or 28) loop back to light 1 again. Thus, the data can be sent in a serial manner to control the lights (1 and 2) (as described in FIG. 22), as opposed to the first method in which the data are sent in an extremely parallel format. The previous method sends data to the lights one-at-a-time; which may be more serial than necessary. A "middle-ground" can be used, in which, for example, the state of 10 lights is set at a time. This entails 13 wires for each cylinder (3 and 4): 10 to set the state of each set of 10 lights, 1 to tell the electronics (27 and 28) in each of the cylinders (3 and 4) to advance to the next set of 10 lights and set their state, 1 for positive current supply to the decoding electronics (27 and 28), and 1 for ground. If that method is used, the primary commutator (composed of 24 and 25) needs 23 wires: 10 to describe sets of 10 lights on the first cylinder 3, 10 to do the same thing for the second cylinder 4, 1 to tell the decoding electronics (27 and 28) on each of the cylinders (3 and 4) to advance to the next set of 10 lights, one for positive current supply, and 1 for ground. The result of this is that the primary commutator (composed of 24 and 25) has 23 connections, and each of the other 2 commutators (composed of 22 and 18, and 19 and 23, respectively) has 13 connections. That is what is actually shown in FIG. 7. The issue still must be addressed as to what electronics (27 and 28), exactly, are inside the cylinders (3 and 4) to do this decoding of the serial signals. The exact circuits may be built a number of ways, one of which is to use serial to parallel converter ICs available from SuperTex. These integrated circuits can be purchased in very small packaging, and so may be especially suitable for this application, where size and weight are best kept to a minimum.

To physically implement this, a wire leads from each light (if the polarity matters, as with LEDs, it is the positive terminal of the light, otherwise, it does not matter) on each cylinder (3 and 4) directly to the center rod (33 and 34), where the wire travels along the outer edge of the rod (33 and 34) to the bottom of the rod (33 and 34), where it connects to the decoding electronics (27 and 28), which in this embodiment are located on the bottom of the cylinders (3 and 4). This is done for each light in each light string (1 and 2). In FIG. 7, although there really are 500 wires (and 1 for ground) in each cylinder, only one of these wires is actually shown for each cylinder (3 and 4), so that the drawing can be more easily understood. The wires that send the electricity and information to the decoding electronics go from the series of metal rings (18 and 19) around tubular extensions (20 and 21) on the shafts (13 and 14), through hollows in the shafts (13 and 14), and then exit the shafts (13 and 14) and connect with the decoding electronics (27 and 28). Only one of those wires is shown in FIG. 7 for each of the cylinders (3 and 4) so as to simplify the drawing. Please note that the wire is shown dotted where it is obscured, and solid elsewhere. Normally, there are 13 wires for each cylinder (3 and 4) connecting the 13 contact rings to the decoding electronics (27 and 28). The result of this system is that information and electricity can be sent to the moving cylinders (3 and 4), and can be used to control the lights that make up the light strings (1 and 2).

There are some disadvantages to commutator systems, though, that might make them less than desirable to use in this device. For one thing, commutators are not known to work well at the speeds at which the cylinders rotate (36,000 RPM) as they might "skip", as a result of the brushes slightly bouncing off of the contact rings. That can cause brief, but problematic, interruptions in power and information. A second problem with commutators is that they inherently have a significant amount of friction—which is especially problematic in high speed applications such as this. To avoid these problems, it is useful to have another option by which to send information and electricity.

Figure 23:
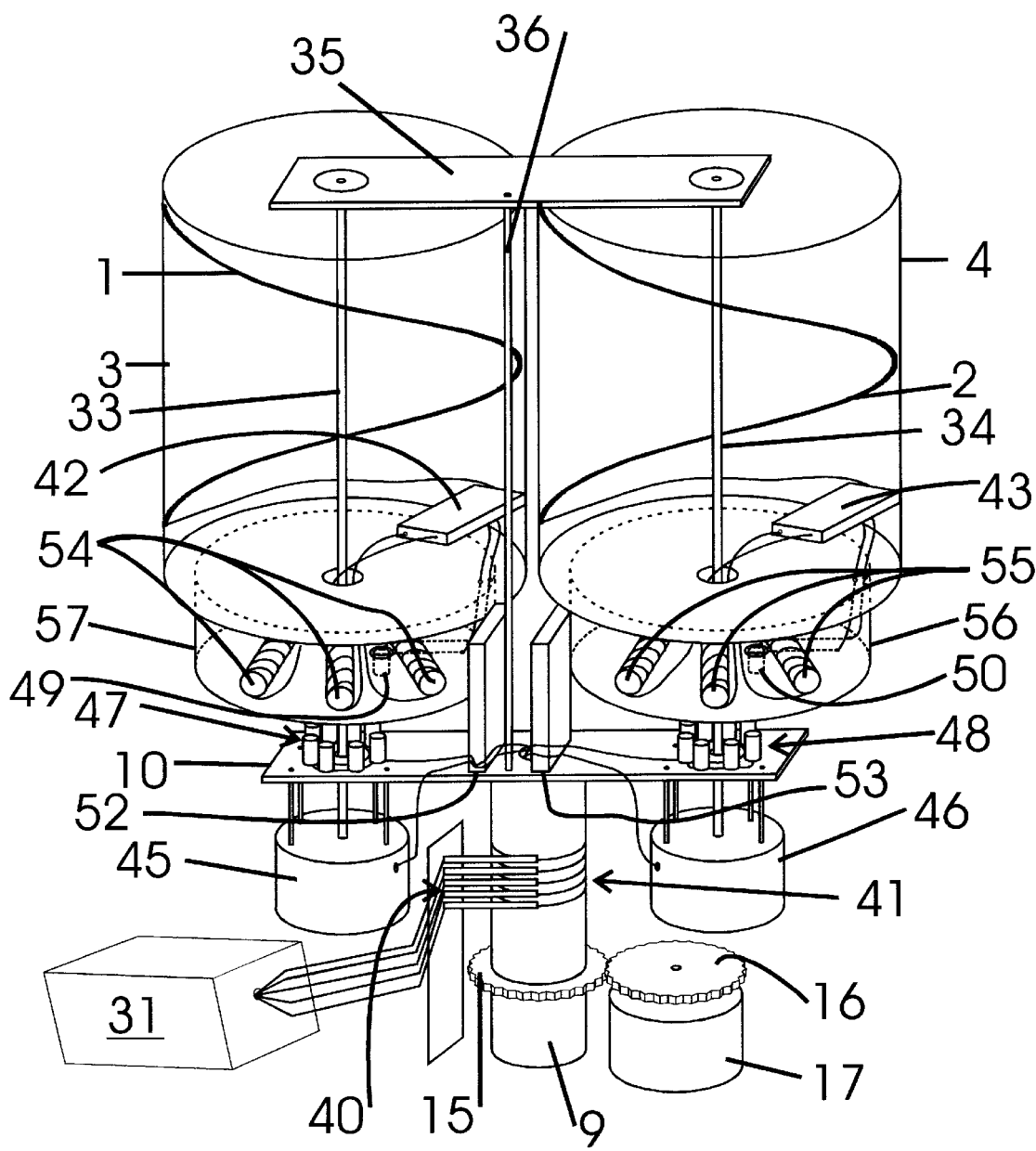
FIG. 23 shows the same embodiment shown in FIG. 7, except that gears used to transfer torque have been replaced by direct drive motors; electricity is (in two thirds of the locations) transferred by induction instead of commutators; and information is transferred (again, in two out of three locations) by infrared communication; among other differences.
Figure 24:
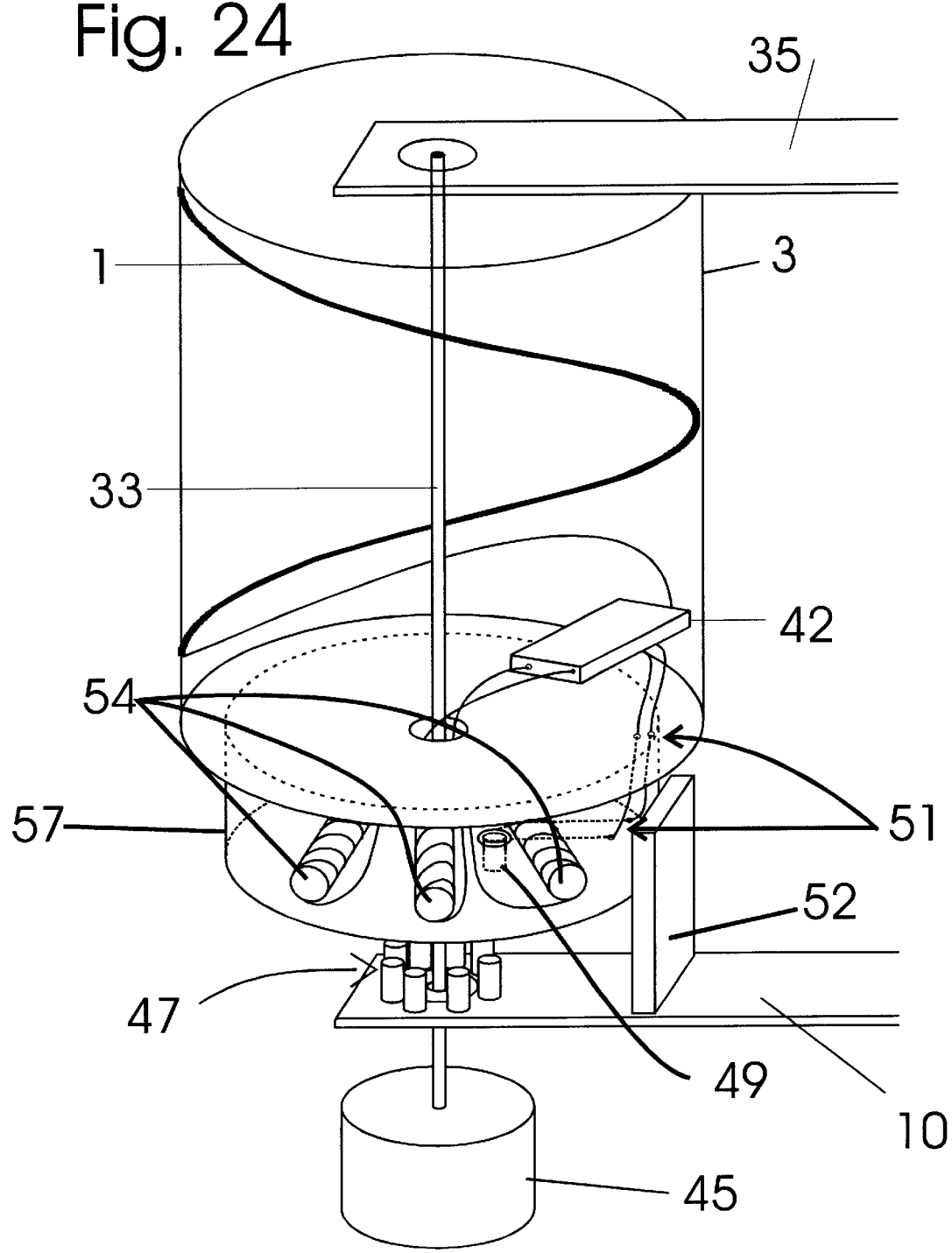
FIG. 24 shows a close-up view of one cylinder, and its contents, from the embodiment shown in FIG. 23, along with some of the surrounding equipment.

The following embodiment is shown in FIG. 23, and FIG. 24, the latter of which is zoomed in on one cylinder 3 from FIG. 23. In the following alternate embodiment, as an alternative to a physical commutator system, infrared signals are used to send information to the decoding electronics (42 and 43) in the cylinders (3 and 4) from the primary commutator (composed of an array of brushes 40 and an array of ring-contacts 41). Electric power is sent from the primary commutator (composed of 40 and 41) to the cylinders (3 and 4) by means of a simple induction system that works based on the rotation of the cylinders (3 and 4)—thus, the very rotation of the cylinders (3 and 4) is used to generate and transfer electricity to the electronics (42 and 43) inside of them. This can be feasible due to the extremely high rate of rotation used by the cylinders (3 and 4) about their respective central axes (5 and 7). Also, in this embodiment, the cylinders (3 and 4) are rotated about their respective central axes by being directly driven by their own respective motors (45 and 46), instead of the planetary gear system used in the previous embodiment To clarify, in this embodiment, there still are two cylinders (3 and 4), with light strings (1 and 2), and the primary commutator (now, as opposed to in the previous embodiment, composed of 40 and 41) is still used. The cylinders (3 and 4) are attached to support bars (10 and 35) and the support bars (10 and 35) are rotated by a motor 17. Information is transferred to the support bars via the primary commutator (composed of 40 and 41) (it is only from the support bars to the cylinders in which the infrared data transfer system is employed). Again, this embodiment does not need a central gear (8, from FIG. 7) or gear boxes (11 and 12 from FIG. 7), since each cylinder (3 and 4) is rotated by its own direct drive motor (45 and 46) which is connected to the lower support bar 10.

The exact means by which the infrared communication system works, shown in FIG. 23, is that there are 2 small arrays (47 and 48) of infrared light emitting diodes arranged so as to form a circle. One is located beneath each of the two cylinders (3 and 4). The infrared LEDs (47 and 48) are facing up, thus aiming the light they produce at the bottom of the cylinders (3 and 4). FIG. 24 shows one of the two cylinders (3 and 4) and the systems near it, close up. Since the bottom of the cylinders (3 and 4) are opaque, there are two small infrared detectors (49 and 50), under each of the cylinders (3 and 4), and fixed to the bottoms. The detectors (49 and 50) are located over the circumference of the circles of infrared LEDs (47 and 48) and they are facing down, so that they detect infrared light bursts produced by the infrared LEDs (47 and 48). Thus, as the cylinders rotate, the detectors (49 and 50) are always be over the circle of infrared LEDs (47 and 48). The wires coming from the detectors (49 and 50) lead to the decoding electronics (42 and 43), which are on the inside of the cylinders (3 and 4) (as opposed to the detectors (49 and 50), which are fixed to the outside bottoms of the cylinders (3 and 4)). The wires run along the bottoms of the cylinders (3 and 4) until they go past the induction apparatus (54 and 56; and 55 and 57) (which is initially in the way) at which time they enter into the cylinders (3 and 4) through small holes (51, as shown in FIG. 24 only) in the bottom of each of the cylinders (3 and 4). The infrared LEDs (47 and 48) for any one circle of infrared LEDs (47 and 48) are all connected to one-another, so they are all sending out the same signal at the same time—thus, as the cylinders (3 and 4) rotate, the detectors (49 and 50) receive the same information without respect to the position of the cylinder to which they are attached. Information is sent to the infrared LEDs (47 and 48) by means of the primary (and in this embodiment, the only) commutator (composed of 40 and 41). Each circle of infrared LEDs (47 and 48) has one connection (the positive terminal) connecting to a connection on the primary commutator (composed of 40 and 41). Both of the circles of lights (47 and 48) and both motors (45 and 46) share a common ground which is another connection on the commutator (composed of 40 and 41). For meaningful information (that is, information that can control the states of all the lights that compose the light strings (1 and 2) on the cylinders (3 and 4)) to be sent with this one infrared detector (49 and 50)/transmitter (47 and 48) system for each cylinder (3 and 4), the information must be encoded in a way that requires only 1 data wire per cylinder (3 and 4)—since only one pulse of information can be sent at a time to each cylinder (3 and 4). Such an encoding format is a variation of the 2-wire encoding format that was described earlier. The only differences are that instead of a commutator sending the data, an infrared transmitter/detector system sends it; and instead of a separate wire to send the clock pulse, a simple timing crystal system is located inside the cylinders (3 and 4) and is used to send the clock pulse to the decoding electronics (42 and 43) at the proper intervals. This means that all the data needed to control the states of the lights on a light string (1 or 2) on a particular cylinder (3 or 4) are sent serially to the electronics (42 or 43) in the cylinder (3 or 4) by means of an infrared transmitter (47 or 48)/detector (49 or 50).

The method by which the induction system functions is relatively simple. There are several metal rods (54 and 55) that rotate along with their respective cylinders (3 and 4), inside of small extensions (56 and 57) to those cylinders (3 and 4). Please note that the extensions (56 and 57) on the cylinders (3 and 4) have a somewhat smaller radius than the cylinders (3 and 4) themselves. On each of those metal rods (54 and 55), wires are tightly coiled—inside of these wires an alternating current eventually becomes present. Fixed to the support bar 10 are two magnets (52 and 53), and when the rods with wires coiled around them (54 and 55) pass by the magnets (52 and 53), a current is induced. This alternating current is rectified by the decoding electronics. Please note that while only three rods (54 and 55) are shown for each cylinder (3 or 4), more may be used; and while only one magnet (52 or 53) is shown for each cylinder (3 or 4), a whole ring of magnets may be used for each cylinder (3 or 4) instead.

As shown, only two gears (15 and 16) are used in this embodiment in an effort to reduce friction. High speed (preferably brushless) motors (45 and 46) are bolted to the lower support rod 10, below each of the cylinders (3 and 4). The shafts from these motors are directly connected to the bottoms of the cylinders (3 and 4). These motors (45 and 46) get electric power from the primary commutator (composed of 40 and 41) (please recall that a primary commutator is still being used in this embodiment). Also, these motors (45 and 46) may be replaced with stepping motors, so that their speed can be precisely controlled. Please note that stepping motors are not shown in the drawings. Stepping motors may require more connections than the motors shown, and if they are used, the primary commutator (composed of 40 and 41) would need more connections too.

The final result of the past two embodiments (shown in FIGS. 7 and 23) is that the lights (1 and 2) on the two cylinders (3 and 4) are swept through almost the entire volume of a cylindrical space (the dotted cylinder in FIG. 8) with approximately twice the diameter of one of the individual cylinders (3 or 4). This is shown in FIG. 8, which shows an approximation of the size of the larger cylindrical volume (the dotted cylinder in FIG. 8) compared to the cylinders (3 and 4). As the lights (1 and 2) go through their dual set of rotations (in that they are rotating around two axes (5 and 7 respectively, and 6) simultaneously), they pass through most of the space in the cylindrical volume (the dotted cylinder in FIG. 8), but miss some of it as well, this is further addressed in the next paragraph.

To compensate for the "empty" areas, or parts of the cylindrical display volume (the dotted cylinder in FIG. 8) that the lights that compose the light strings (1 and 2) miss, the lights themselves may be made physically wider so that they do cover all the area. The downside to this is that wider lights produce lower resolutions for images. The primary way to increase the amount of space covered without having to lose resolution is to increase the rate at which the cylinders (3 and 4) rotate about their respective central axes (5 and 7) compared to the rate at which they rotate around the vertical axis 6 that runs between them. This essentially increases the density of curved lines in the pattern of space covered by the lights, similar (though not quite identical) to the difference between FIG. 17 and FIG. 21. The downside to this approach is that it requires dramatically more energy to get the cylinders (3 and 4) to rotate at higher speeds. If gears and commutators are used, this approach puts more stress on the gears, commutators and motor as well as that it may require the lights to be brighter. The exact optimal values for rotational speed ratios of the cylinders (3 and 4) about their own respective central axes (5 and 7) verses the rotation rate about the common middle axis 6; and width of the lights that compose the light strings (1 and 2) are to be decided based on the exact application. While the above discussed how to improve image quality in the width and depth directions, to change the image quality in the height direction, one need only increase the number of lights that make up the light strings (1 and 2). This also partially increases image quality in the other directions as well.

The following paragraph contains various alternate embodiments for this display that are similar to the preceding embodiments. Some are just minor alterations, which require minimal further details. For more significantly different embodiments, greater details on producing the device are given. Please note that the previous embodiments used two cylinders (3 and 4) and two light strings (1 and 2), the following may or may not do so, as will be explained.

In one alternate embodiment, the lights do not form a spiral along the wall of the cylinders (3 and 4). Any organization such that there is a light at nearly any height along the wall of each of the cylinders (3 and 4) works. In an alternate embodiment, the lights form spirals along the walls of the cylinders (3 and 4), but the lights do not form complete spirals. In other words, the highest light on each of the walls of each of the two cylinders (3 and 4) is only 180, or 270 or almost any other number of degrees around the wall of that cylinder (3 or 4). In another embodiment, there are multiple spirals of lights on each cylinder (3 and 4). In other words, there is more than one light at any particular height on the wall of each cylinder (3 and 4). Although this embodiment is not the most preferable, it may be necessary in some situations, and is another valid embodiment. In an alternate embodiment, there is only one cylinder—and thus only one string of lights (if the lights form a string), as opposed to the two described in the previous section. In yet another embodiment, cylindrical support structures may be used that are not transparent, since it may be necessary for them to be opaque or translucent as a result of circuitry inside the cylinder(s) (3 and 4). However, since the lights are located on the inside wall of the cylinders (3 and 4), the cylinders (3 and 4) are transparent in least those areas in front of lights so that the lights can be seen. In yet another embodiment, if 2 cylinders are used, they are not identical; that is, one cylinder has the lights organized differently on it than on the other cylinder, or the cylinders differ in other ways.

Embodiment 1-B: In this embodiment, there are 4 spirals (601, 602, 605, and 606) of lights, similar to those in the previous embodiment, but with no cylindrical support structures. Each of the four spirals (601, 602, 605, and 606) rotates about its respective central, vertical (Y) axis (603, 604, 607, and 608), while simultaneously rotating around the common, vertical (Y) (6), middle axis. The four spirals (601, 602, 605, are 606) are arranged such that there is a spiral at each 90 degree interval around the common middle axis (6). The rotations about the respective middle axes (603, 604, 607, and 608) are performed more quickly than the rotation about the common central axis (6).

In this embodiment, 4 strings of lights are used, each of which may contain 500 lights. This embodiment, too, is monochromatic and the display volume is cylindrical. The spiral light strings, having no cylindrical support structures, are supported by spiral shaped transparent support structures (601, 602, 605, or 606), such as spirals of Plexiglas.

This embodiment, the basic arrangement of which is shown in FIG. 6-D, is very similar to the previous one, except that this embodiment is able to employ four spirals (601, 602, 605, and 606) of lights at the same time, the central axes (603, 604, 607, and 608 respectively) of which are all equidistant from the common middle axis 6. The previous embodiment could only support a maximum of two spirals (1 and 2)—due to the fact that the spirals were supported by cylindrical support structures (3 and 4). That means that more than two spirals can not all be located such that their respective perimeters are all barely touching the common central axis 6—in the former embodiment—since more than two cylinders would get in each-other's way. In this embodiment, however, not needing cylindrical support structures, the spirals (601, 602, 605, and 606) are arranged so as to have a spiral (601, 602, 605, or 606) at each 90 degree interval around the common central axis 6. Due to the linear nature of spirals, it is possible to have two spirals arranged such that the central axis of each one is barely touching the perimeter of the other. Accordingly, it is possible to have four spirals arranged in the earlier described way, located so close to one-another as to allow each one's respective perimeter to almost touch the common central axis. This allows more space to be passed through by the lights without needing higher speeds, compared to what is covered in the previous embodiment.

This arrangement is shown in FIGS. 6-B through 6-D. FIG. 6-B shows two (601 and 602) of the four spirals (601, 602, 605, and 606), and their respective central axes (603 and 604). Only two (601 and 602) are shown to make the arrangement more understandable. Although potentially difficult to discern visually, the two spirals (601 and 602) shown in FIG. 6-B are not in contact. To show more convincingly that they do not contact, FIG. 6-C shows the same thing as FIG. 6-B, but from a front view, instead of an isometric one. In FIG. 6-D, in which all four spirals (601, 602, 605, and 606) are shown, the fact that the spirals do not touch can be even harder to discern from the picture—but it is still the case. And as long as all the spirals (601, 602, 605, and 606) are rotated at the same speed and in the same direction around their respective central axes (603, 604, 607, and 608), then they will continue not to touch one-another. FIGS. 6-A through 6-D also show the common central axis 6. The circles shown in FIGS. 6-B through 6-D do not represent actual objects, but just represent the perimeter of the spirals (601, 602, 605, and 606). The lines connecting each spiral (601, 602, 605, and 606) to its central axis (603, 604, 607, and 608) represent the connections that will link each spiral (601, 602, 605, and 606) to a rotating shaft following the central axis (603, 604, 607, and 608) of that spiral, analogous to the metal rods (33 and 34) from the previous embodiment.

It is very important, however, that the four spirals (601, 602, 605, and 606) spin around their respective central axes (603, 604, 607, and 608) at the same speed, and in the same direction, to prevent them from hitting one-another during rotation.

Embodiment 2: In this embodiment, a string of lights that spirals outward instead of up—and thus lies in a vertical plane, rotates around the vertical (Z) axis that runs though its center, while simultaneously rotating about the axis perpendicular to the plane in which the spiral rests. One of the two rotations is done much faster then the other.

In the following alternate embodiment, only one (monochromatic) light string is used. That light string is shaped differently than the light strings discussed in the previous embodiments, and the rotation pattern of this light string is also substantially different than that of the previous embodiments. Also, since the light string is shaped substantially differently, the support structure for that light string is also shaped very differently. The display volume is spherical.

Figure 26:
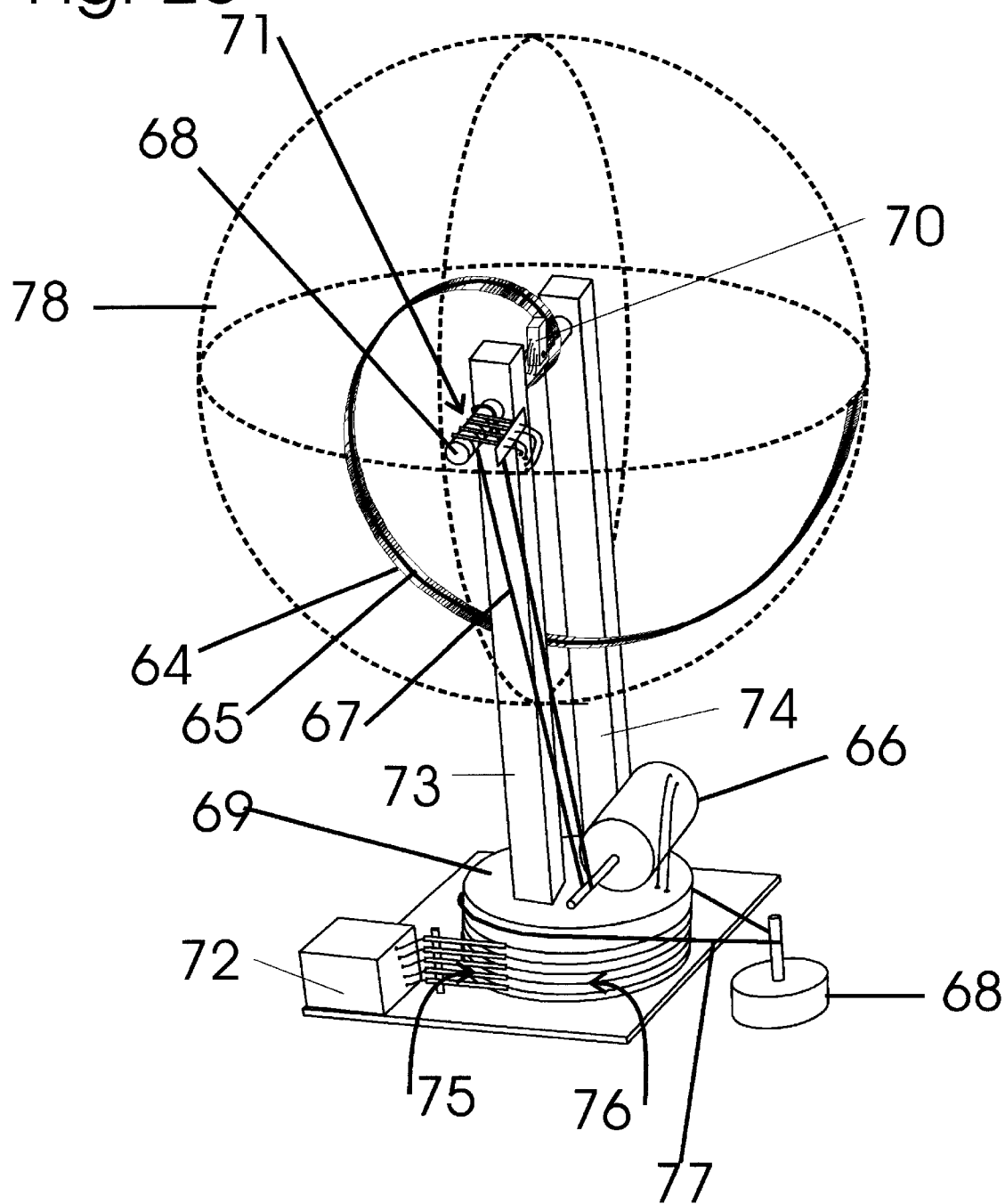
FIG. 26 shows an alternate embodiment in which a light string that spirals out (as opposed to up) rotates about an axis substantially perpendicular to the light string, and an axis substantially parallel to it—both of which pass substantially through the light string's center.

In an alternate embodiment, shown in FIG. 26, there are no cylinders, but rather a string of lights 65 that, instead of spiraling up, spirals out. This spiral of lights 65, which substantially rests in a plane, is part of a spiral shaped support structure 64. This structure 64 may be composed of Plexiglas, and the lights 65 that compose the spiral are embedded inside of it 64. This support structure 64 with the light string 65 embedded has, for example, a radius of about 1 foot from the center to the outermost point, and the string of lights 65 is still be composed of 500 lights. This support structure 64, with the lights 65 attached, rotates about an axis, that both is perpendicular to the plane in which spiral support structure 64 rests, and also runs through the spiral support structure's 64 center. This rotation is performed by a motor 66. The motor 66 rotates a belt 67 which in turn rotates a shaft 68, which in turn rotates the spiral support structure 64, to which the lights 65 are attached. The shaft 68 is on bearings so it can rotate freely with minimal friction.

Simultaneously, the spiral support structure 64 (with lights 65 attached) rotates around a vertical axis that runs through the spiral support structure's 64 center. This rotation is performed by a separate motor 68. This motor 68 rotates a rotating platform 69, to which the rest of the system is attached. This platform 69 is on bearings so it can rotate easily and freely. The rotation around the axis that is perpendicular to the plane in which the spiral support structure 64 rests is performed a certain number of times faster than the rotation around the axis parallel to the plane in which the spiral support structure 64 rests. That is, the first motor 66 rotates fast enough to cause the spiral support structure 64 to rotate about the axis perpendicular to the plane in which it 64 lies a certain number of times faster, such as 200 times, than the axis that runs parallel to it, around which it is rotated by the second motor 68 by means of a belt 77. The reverse works too, the rates of rotation about the two axes may be swapped for one-another. But about whichever axis the spiral support structure 64 (and thus the lights 65) rotate more slowly, it still is rotating fast enough to make a complete rotation within the refresh time of the human eye (no longer than $\frac{1}{10}$ seconds). For this to happen, the first motor 66 has to rotate substantially faster than the second motor 68, or vice versa—depending on which axis the spiral support structure 64 is intended to be rotating about more rapidly. To supply information and electric power to the lights 65 and decoding electronics 70 (since this embodiment, too, needs decoding electronics) which are also located on the support structure 64, a pair of commutators may be used. The first commutator (composed of 75 and 76) keeps the stationary power and information supply systems 72—the driver electronics—in contact with the wiring in the vertical support arms (73 and 74) that hold the spiral support structure 65 in place as it rotates. The second commutator 71 connects the wiring in the vertical support arms (73 and 74) with the decoding electronics 70 and lights 65 on the spiral support structure 64. As shown in FIG. 26, the wiring from the second commutator 71 goes from the commutator 71 into one of the vertical arms 73. Although not shown, the wiring then runs directly through the arm 73 and into the rotating platform 69, where it connects to the first commutator (composed of 75 and 76). Also, wiring from the first motor 66 connects to that commutator (composed of 75 and 76). The wires from the first commutator (composed of 75 and 76) go to the information and data supply electronics 72. The format of information that is used by this set of decoding electronics 70, based on the commutators (75 and 76; and 71) shown, is the same format described earlier as extremely serial; that is, it requires only two connections to send the information necessary to control the lights on the light string 65. Thus, the second commutator 71 needs 4 connections: 1 for data, 1 for clock pulse, 1 for ground, and 1 for positive current supply for the decoding electronics 70. The first commutator (composed of 75 and 76) needs 5 connections: 4 for the previously described purposes, and 1 for positive current to supply to the first motor 66.

In this embodiment, as in the previous ones, the spiral of lights 65 need not be 360 degrees; and the pattern of lights 65 need not even be a spiral. Any generally flat (that is, it lies in a plane) pattern of lights, such that there is a light at nearly every different radius from the center of the structure that supports this spiral of lights, works—some do have benefits over others depending on the application. It is preferable for there to be few, if not just one, light at any radius, so as to reduce the cost and mass of the system. To stabilize the spiral support structure 64, it may be desirable for a rod to run from the outer end of the support structure 64 to the shaft 68, to keep the spiral support structure 64 from changing shape as it moves. Although all of the motors (66 and 68) in this embodiment are shown needing only one connection of their own (the second connection, the ground, is shared), it may be preferable to use stepper motors instead of the motors (66 and 68) shown, which allows for more precise control of their speed. Instead of the commutator 71 system shown, an infrared transmitter/detector system may be used to take the place of the second commutator 71 as a means of information transfer, and a magnetic induction system may be used to take the place of the second commutator 71 as a means of electricity transfer. The exact method by which to do this is obvious from the earlier embodiment, shown in FIG. 23 in which this was done.

The result of this is that the string of lights 65 (if the lights form a string) rotates about two axes: one perpendicular to, and passing through the center of, the plane in which the string 65 lies; and another parallel to, and running through the middle of, the plane in which the string lies 65. As a result of that motion, most of the volume of a spherical space 78, as shown in FIG. 26, is passed through by at least one light within the rotation cycle of the light string 65. The rotation cycle being one rotation about the axis, about which the light string 65 is rotating more slowly—and thus many rotations about the axis, about which the light string 65 is rotating more quickly. Since one rotation cycle is completed within the refresh time of the human eye, virtually any collection of points in the spherical volume 78 can be made to appear to be emitting light, and thus three dimensional images are able to be produced.

Embodiment 3: In this embodiment, a string of lights that extends out horizontally (along the X axis) moves back and fourth along the depth (Y) axis, while rotating around the depth (Y) axis that runs through its center. One of the two motions is performed much more rapidly than the other.

In the following embodiment, there is one string of lights, but it is particularly long since it is composed of two shorter light strings attached to opposite sides of a connector. The support structure here is very similar to the one used in the previous embodiment. That is, the lights are embedded inside of, or connected to, some clear rod that is the shape that the light string is intended to be. This embodiment also has about 500 lights in the entire light string. The display volume is cylindrical.

Figure 27:
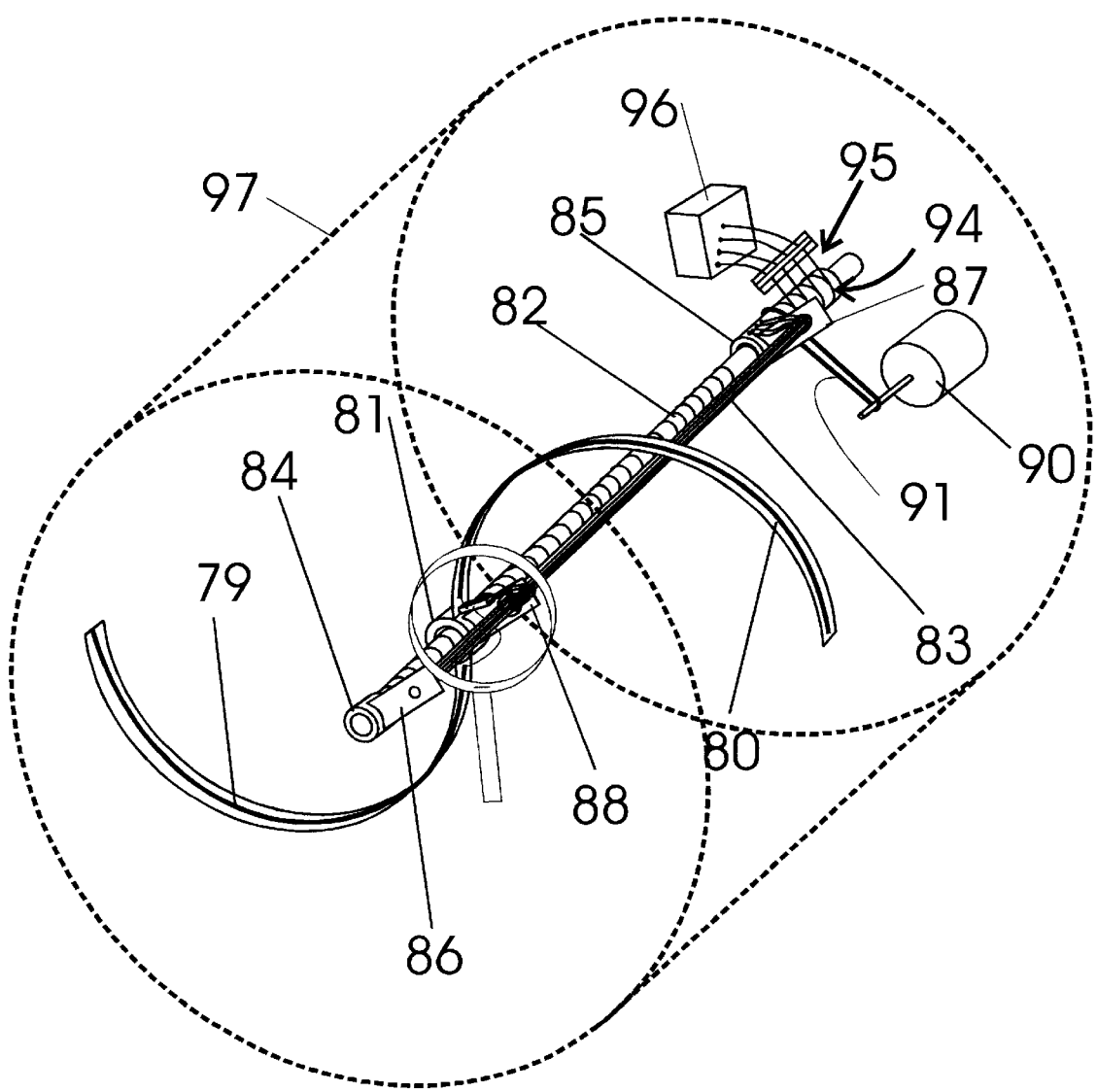
FIG. 27 shows an alternate embodiment in which a light string moves forward and backward along an axis, while simultaneously rotating around this axis.
Figure 28:
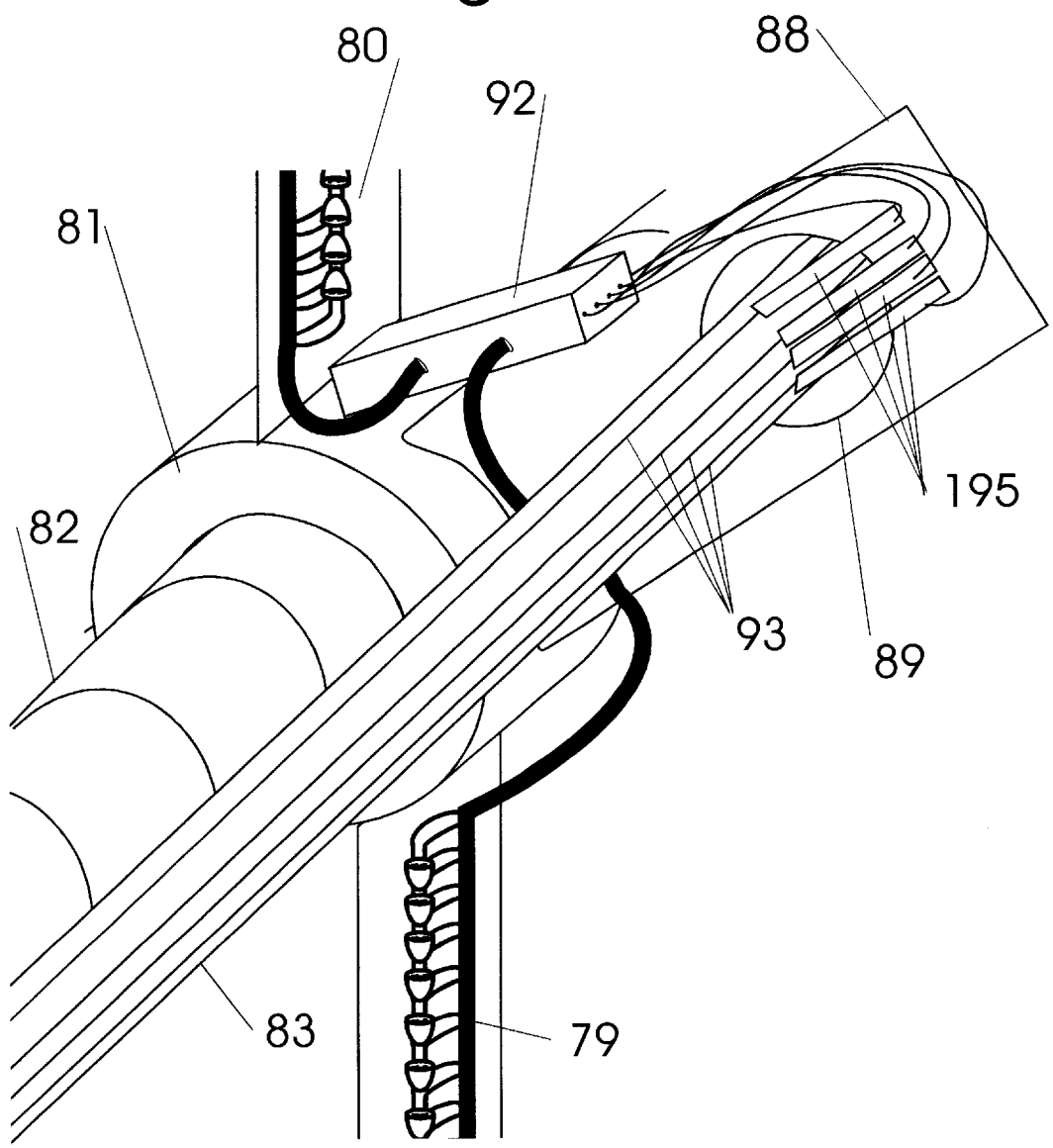
FIG. 28 shows a close-up view of the area indicated in FIG. 27 by the picture of a magnifying glass.

In this embodiment (shown in FIG. 27), two hard (very rigid) strings of lights (79 and 80) are connected to opposite sides of a small nut-like (in that it is complementary to a threaded rod) device 81—which will be referred to as the "nut" for simplicity purposes. This nut 81, and thus the strings of lights (79 and 80), rotate rapidly around something that is essentially a threaded rod 82. Thus, as the string (79 and 80) is rapidly rotated around the rod 82, the string (79 and 80) also moves along the length of the rod 82—since the string (79 and 80) is attached to the nut 81 that complements the threaded rod 82. The exact shape of the whole light string (composed of 79 and 80) need not be composed of the two curves, as shown in FIG. 27. The strings (79 and 80) may alternately be completely straight, or virtually any, preferably flat (that is, that it lies in a plane), shape. The strings (79 and 80) have to make a complete motion from the front of the rod 82 to the back within the time that it takes for the human eye to refresh. Obviously, the nut 81 that complements the threaded rod 82 is rotated very rapidly. This is done as follows: A second non-threaded rod 83 is connected to the outside of two rotational bearings (84 and 85) that rotate around the threaded rod 82 (each bearing (84 and 85) connects to one end of the non-threaded rod 83). The non-threaded rod 83 is not directly connected to the bearings (84 and 85), though; instead it connects through two extensions (86 and 87), thus keeping the non-threaded rod 83 a small distance away from the actual bearings (84 and 85). The result, from what has been explained so far, is that this non-threaded rod 83 is able to rotate around the threaded rod 82 freely and easily. Also (the following is shown close up in FIG. 28), attached to the nut 81 is a small extension 88—similar to the ones (86 and 87) used to connect the non-threaded rod 83 to the bearings (84 and 85)—except that in the middle of it 88, there is a bearing 89 (shown in FIG. 28) that is both linear and radial. What is meant by that is that anything in that bearing 89 can freely and easily move back and fourth or rotate. Next, the non-threaded rod 83 runs through the aforementioned bearing 89. The result of this is that if one of the radial bearings (84 or 85) to which the non-threaded rod 83 is indirectly attached is rotated, which in turn rotates the non-threaded rod 83, which rotates the nut 81, the light strings (79 and 80) rotate as well. One of those rotational bearings 85 is connected to a motor 90 by means of a belt 91. Thus, when the motor 90 rotates, the first rotational bearing 85 rotates as well. By this happening, the non-threaded rod 83 rotates around the threaded rod 82, which causes the nut 81 to rotate as well around the threaded rod 82 while, since the rod 82 is threaded, causing the nut 81 to move along the length of both of the rods (82 and 83) as it rotates. Since the light string (composed of 79 and 80) is attached to the nut 81, the light string (composed of 79 and 80) follows the pattern of motion that the nut 81 does. Thus, in one complete motion from the front of the threaded-rod 82 to the back of the threaded-rod 82, the light string (composed of 79 and 80) makes many, many rotations about the threaded rod 82. The number of rotations per motion from front to back of the threaded rod 82 may be, for example, 800. The number is required to be high, so a minimal amount of space is not be passed through by at least one light in a complete motion by the light string (composed of 79 and 80) from the front of the threaded rod 82 to the back of the threaded rod 82. The number must not be too high, though, as the light strings (composed of 79 and 80) need to be able to make a complete motion from the front to the back of the threaded rod 82 within the refresh time of the human eye, which is no longer than about $\frac{1}{10}$ seconds. To send information and electricity to the light string (composed of 79 and 80), by way of the decoding electronics 92 (shown in FIG. 28) that are attached, one option is to use two commutators. One commutator (shown in FIG. 28) is a bit unusual, in that it is intended to compensate for linear motion as opposed to rotational. It functions by there being long metal strips 93 on the non-threaded rod 83, which are in contact with an array of brushes 195 that connect to the decoding electronics 92. Thus, as the nut 81 and decoding electronics 92 and brushes 195 along with it, move along the non-threaded rod 83, the decoding electronics 92 are in constant electrical contact with the metal strips 93 on the non-threaded rod 83. Now, a method must be used to actually transfer the information and electricity to the metal strips 93 on the non-threaded rod 83. This is done by a more conventional commutator (94 and 95: a set of contact rings and a set of brushes, respectively). Wires from the metal strips 93 on the non-threaded rod 83 go to the conventional commutator (composed of 94 and 95) on the rotational bearing 85 that is being turned by the motor 90. This commutator (composed of 94 and 95) is then able to transfer the information and power from the stationary information sending and electricity sending devices—driver electronics—96 to the non-threaded rod 83—which in turn sends the information and electricity to the decoding electronics 92, which sends electricity to the correct lights on the light strings 79 and 80). The format of information that the decoder 92 in this embodiment uses is the same that was used in the previous embodiment—thus only 4 connections are needed to send the needed information and electricity. Instead of the conventional commutator (composed of 94 and 95), an infrared data transmission system and induction-based power transfer system may instead be used. The explanation of the implementation of this infrared and induction system is sufficiently similar to earlier embodiments so that it does not need to be repeated.

The end result of this is that the light string (composed of 79 and 80) is moved through nearly every space in a cylindrical volume 97 within the refresh time of the human eye, and thus is able to make virtually any collection of points in that space appear to glow simultaneously—thus allowing for the production of three-dimensional images.

Embodiment 4: In this embodiment, there is a vertical string of lights that rotates about some vertical (Z) axis while simultaneously moving to and from that axis. One of the two motions is performed much faster than the other.

In the following embodiment, there is, again, one string of lights. This string is simply vertical, and very stiff. This light string also is monochromatic, and consists of about 500 lights. The lights need to be supported by something, and in this case, it can just be a hard Plexiglas rod (or something similar), as in previous embodiments. The display volume is again cylindrical.

Figure 30:
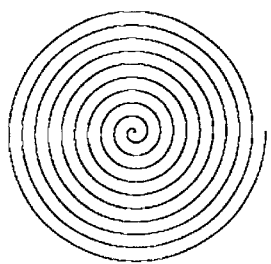
FIGS. 30–33 show an approximation of the pattern of space that is passed through by the light string from the embodiment shown in FIG. 29 after 25%, 50%, 75% and 100% of completion of a motion cycle, respectively.
Figure 31:
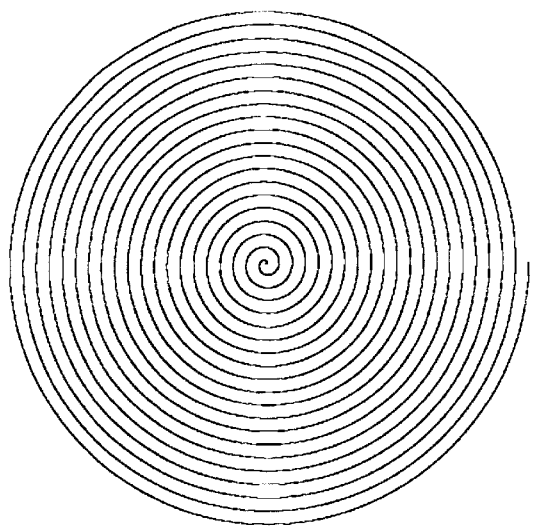
Figure 32:
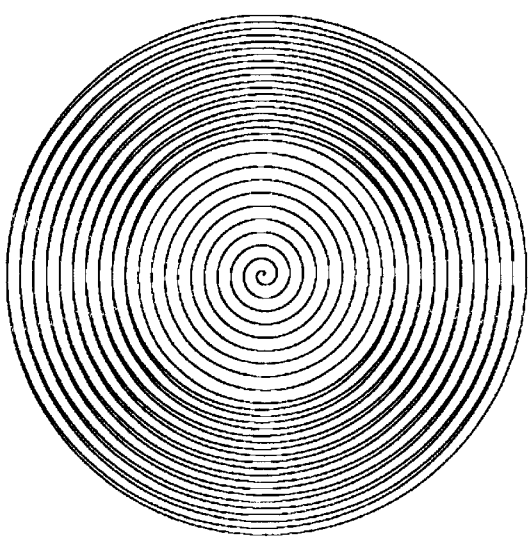
Figure 33:
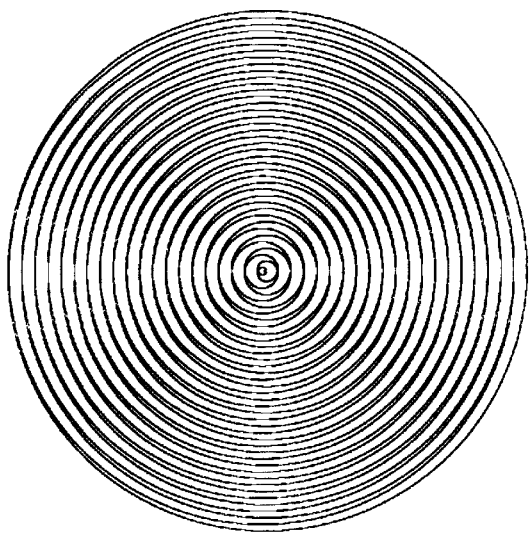

In this embodiment, a hard, vertical string of lights 98 moves in a spiral pattern from the outside of a circular area to the center of that circular area. The string 98 then continues, in a spiral pattern, back to the outside of the circular area. This is done by having the vertical string 98 be rapidly rotated around an axis parallel to the string 98; while simultaneously bringing the string 98 closer to and further from the vertical axis that runs parallel to it. In one motion to or from the axis, the string 98 makes many (the number is realistically be about 100 or 200, but in the following example, assume that it is 20) rotations around that axis. Put another way, the rotating speed is much greater than the linear motion speed (however, the reverse could be done instead). To better understand this, imagine the following hypothetical situation: A small pencil is attached to the top of the light string 98, so that its writing point is facing upwards, and is clear of any equipment. Assuming that a piece of paper is directly above, and touching the pencil a pattern is drawn as the light string 98 moves. As the string 98 rotates around the vertical axis that runs parallel to it, and moves nearer to and farther from that axis, the pattern shown in FIG. 30 is made as the string 98 moves from the axis, to half-way to its final distance from the axis (and thus makes 10 rotations around the axis). FIG. 31 shows the pattern produced as the string 98 has moved from the axis all the way to its final distance from the axis, while making a total of (in this example) 20 rotations about the axis. FIG. 32 shows the pattern produced by the light string 98 after starting at the axis, going to the final distance from the axis, then going back half way to the axis—and thus rotating 30 times around the axis. FIG. 33 shows an approximation of the pattern produced by the light string 98 going from the axis, to the maximum distance away from the axis, then back to the axis again—making a total of 40 rotations about the axis. As one can see, the pattern produced is virtually a filled circle. Since this pattern is analogous to the amount space passed through by a light, and since there are 500 lights: one above the other; 500 closely spaced, filled circles of space—which is essentially a solid cylinder—is passed through by the lights. Thus, the lights are able to make any point or points in that area appear to glow. That cylindrical area 135 is the display volume.

To be able to perform this motion, the following mechanical setup is needed—the result of which has a motor 108 rotating a belt 109 which rotates a threaded rod 105 which moves the nut 104 which is attached to, and thus moves, the light string 98. The details of this process are as follows: First, the string of lights 98 has a linear bearing 99 at its bottom; thus allowing the string 98 of lights to slide from one end to the other end of a rod 100, if a rod 100 is placed through the linear bearing 99. In this case, the rod 100 is a non-threaded rod that is held in place above a platform 101 by two support arms (102 and 103). Also at the bottom of the string 98 of lights, but a little bit higher up than the linear bearing 99, is a nut 104. What is meant by nut, in essentially the same way it was meant when used earlier, is a device that is complementary to a threaded rod 105 such that as the threaded rod 105 is rotated inside the nut 104, (if the nut's 104 orientation is kept the same) the nut 104 moves along the length of the threaded rod 105. The threaded rod 105 that goes though this nut 104 is also held in place by the support arms (102 and 103), except that it 105 is a bit higher up on the support arms (102 and 103) than the non-threaded rod 100, and it 105 is held in place by rotational bearings (106 and 107), so it 105 is able to rotate. As the threaded rod 105 is rotated, the nut 104 is pulled or pushed (depending on the direction of rotation) and thus the light string 98 is pushed or pulled along with it 104. What the light string 98 is pushed or pulled along, is the threaded and non-threaded rods (100 and 105). To rotate the threaded rod 105, a motor 108 situated on the platform 101 to which the support arms (102 and 103) are connected, uses a belt 109 to rotate the threaded rod 105. Using this technique, the light string 98 is able to be moved to different distances from the axis that was mentioned in the previous paragraph, which in this case is the vertical axis running through the center of the support platform 101. The support platform 101 must be rotated as well, this is done by a second motor 110 which can use a belt 111 as well—although with respect to this motor 110 and the previously mentioned one 108, gears may optionally be substituted for, and may in fact be preferable to, belts (109 and 111).

Instead of having the light string 98 rotate about the vertical axis a certain number of times for each motion to and from the axis, the reverse may alternately done; that is, the light string 98 would then be made to make a certain number of motions to and from the axis for each rotation around the axis. If this is done, the patterns produced in FIGS. 30 through 33 would change. Whichever process is being done more slowly, though, it must be fast enough to appear as a blur to the human eye, thus requiring a speed of no less than about 10 cycles per second.

Figure 34:
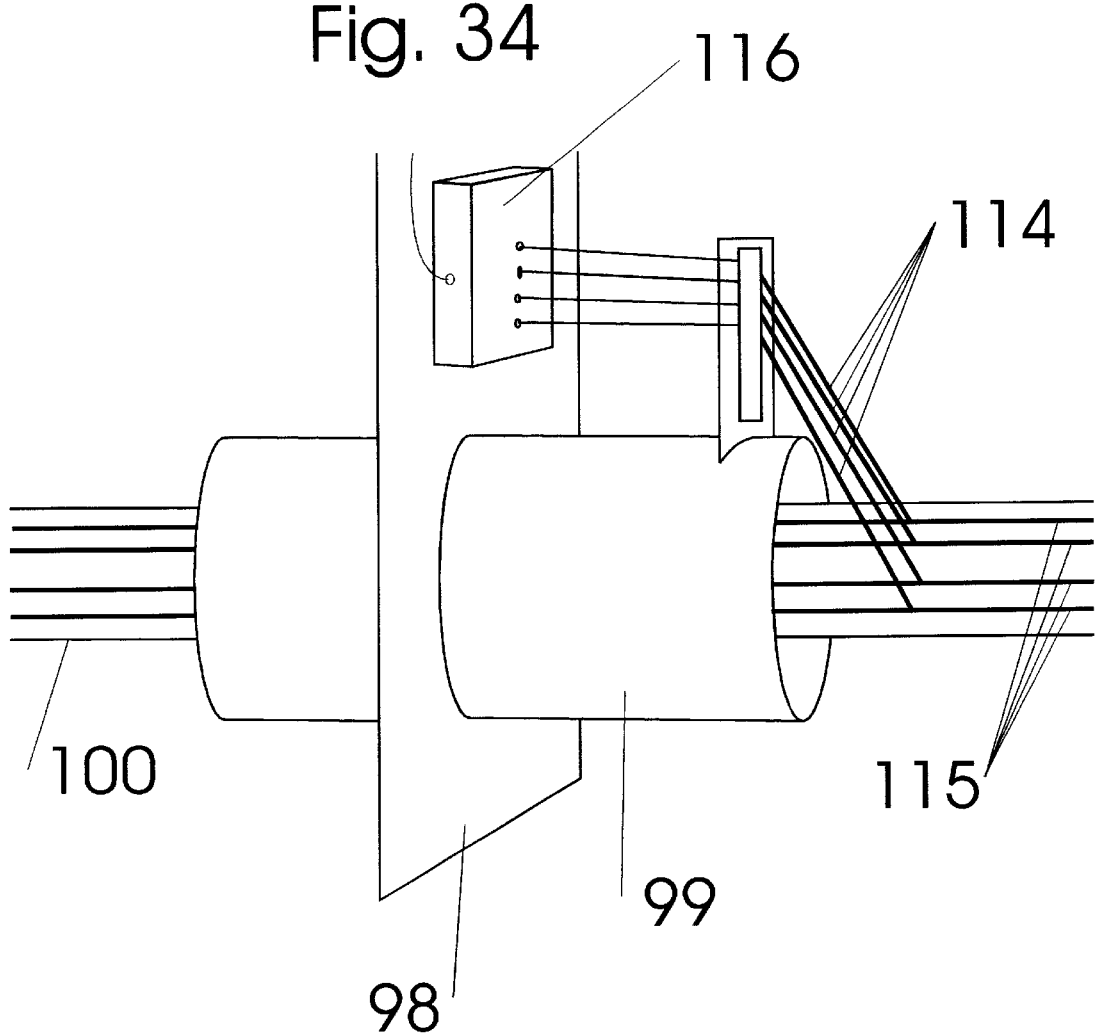
FIG. 34 shows close up, the area indicated by the picture of the magnifying glass in FIG. 29.

Information and electricity may be sent to the lights that compose the light string 98 by means of two commutators (composed of 112 and 113; and 114 and 115 respectively, the latter two of which are shown in FIG. 34). One commutator (composed of 112 and 113: being an array of brushes and an array of contact rings, respectively) is an ordinary (that is, rotational) commutator, like most that have been discussed so far. The other commutator (composed of 114 and 115) is a "linear" commutator, which was discussed once before. The apparatus involving this linear commutator (composed of 114 and 115) functions as follows, and is shown close up in FIG. 34: Metal strips 115 run along the non-threaded rod 100. The light string 98 has a set of brushes 114 that are attached to the light string's 98 bottom. As the light string 98 moves along the non-threaded rod 100, the brushes 114 are constantly pressing against the metal strips 115. The brushes are connected to the decoding electronics 116 (which are physically attached to the light string 98), which send appropriate signals to the lights that compose the light string 98. Thus, any electrical signals in the metal strips 115 are immediately transferred to the decoding electronics 116 that send the appropriate decoded signals to the lights that compose the light string 98.

So far, electrical signals on the metal strips 115 (as shown in FIG. 34) can easily get to the decoding electronics to supply information, but there still needs to be a way to get the signals to the metal strips 115. This is done by having wires 117 (shown in FIG. 29) lead from the metal strips 115 to the rotating platform 101; and connected to that rotating platform 101, is another commutator (composed of 112 and 113). There also is a single wire leading from the motor 108 that is on the platform 101 into the platform 101 (This assumes that only one positive connection and one negative connection are needed to run the motor 108. A stepper motor on the other hand, which may be used instead of the one shown 108, may need more wires.). That wire is the positive connection for the motor 108, the ground from the motor connects with the common ground, and shares that connection on this second commutator (composed of 112 and 113). All of these wires 117 that lead to the platform 101 connect with the metal rings 113 that run around the outside of the platform. Stationary brushes 112 are in contact with these rings 113. There are 5 rings 113 and brushes 112: 3 for the light string 98, 1 for the motor 108 on the platform 101, and 1 for the common ground. The data and electricity for this system are supplied by the data and electricity driver electronics 118, which is explained much later.

Figure 35:
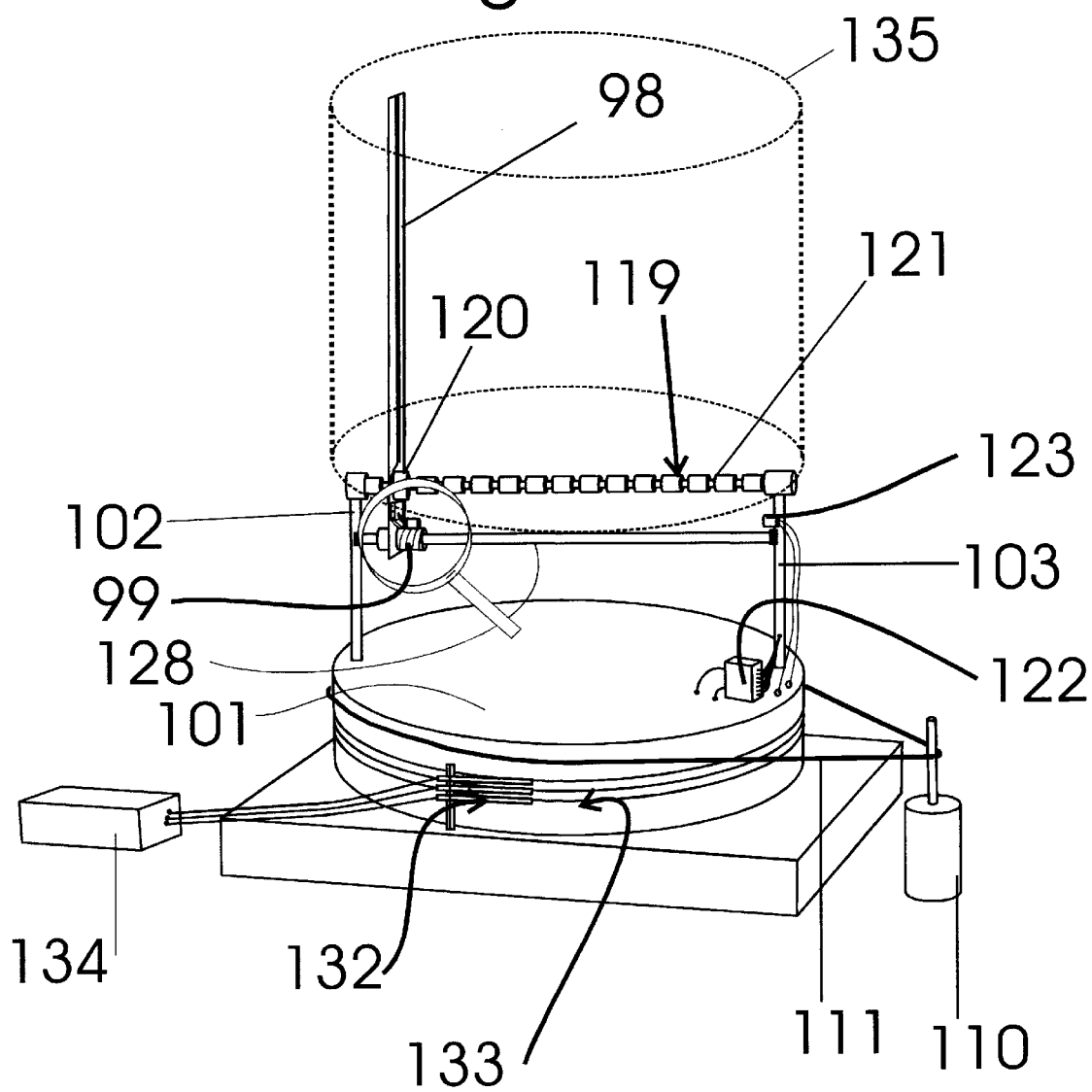
FIG. 35 shows an alternate embodiment, that is like the embodiment shown in FIG. 19, except that this one moves the light string to and from the axis with electromagnets; replaces the linear commutator with an infrared transmitter/receiver to send information; and replaces the linear commutator with a magnetic induction system to transfer electricity in one part of the device.

If the previously described system involving a threaded rod 105 and nut 104 does not move the light string 98 fast enough from side to side, due to the particular implementation of the embodiment used, then a different embodiment, shown in FIG. 35, may be used instead: In place of the threaded rod 105, a series of electro-magnets 119 are used; and instead of the nut 104, a strong permanent magnet 120 is used. Thus, the electromagnets 119 are able to pull the light string 98 back and fourth very rapidly. The electromagnets 119 lie on a rod 121 (horizontal, in this case) that is later be referred to as an "electromagnet rod." The permanent magnet assembly 120 is referred to later as a "permanent magnet sleeve." To control the electromagnets 119, an electronic controller 122 is on the rotating platform 101. It connects to the electromagnets 119 and activates and deactivates them in the proper sequence to move the light string 98 back and fourth very rapidly. The controller 119 is supplied power though the connections that would have been used to power the motor 108 that would have been on the platform 101 if the previous embodiment was used. The previous embodiment being shown in FIG. 29.

Figure 36:
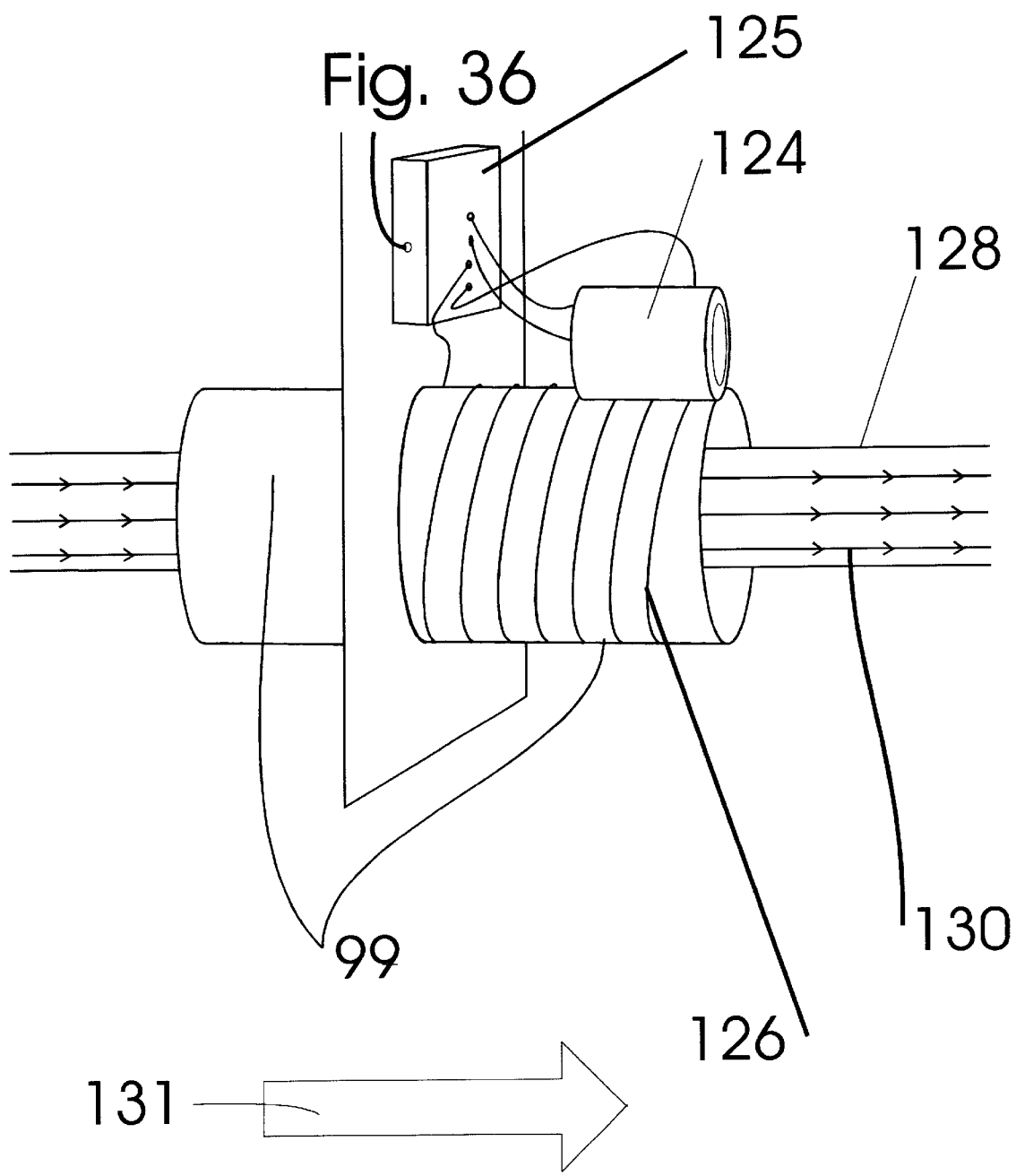
FIG. 36 shows a close up view of the area indicated by the picture of a magnifying glass in FIG. 35.

Also in this embodiment (shown in FIG. 35), an infrared data transmission system may optionally be used in place of the linear commutator (composed of 114 and 115, used in the embodiment shown in FIG. 29) for information transfer, and a magnetic induction system may be used to transfer electricity. The infrared system (composed of 123 and 124, the latter of which being shown in FIG. 36) functions by having an infrared detector 124 on the bottom of the light string 98 as shown in FIG. 36. There is a corresponding transmitter 123 on the support arm 103 as shown in FIG. 35. The receiver 124 receives the information sent from the transmitter 123 in the same format as the previous embodiment that used infrared communication, that being the embodiment shown in FIG. 23. Thus, the clock pulse is supplied by timing circuits already inside the decoding electronics 125. The data is then supplied by the infrared system (composed of 123 and 124). Electricity is supplied by simple electromagnetic induction, as shown in FIG. 36. Specifically, the induction system functions by having a wire coiled many times around the bearing 99, and by having the non-threaded rod 128 be magnetic, with field lines (one of which is 130) as shown. The motion of the wire coil 126 back and fourth induces a current in that coil 126. This current alternates with the direction that the light string 98 is moving and thus, the decoding electronics 125 need to have circuits to compensate for this.

Although the light string 98 is shown straight, it may be curved instead. This is important since it allows for certain viewing angles to not result in an apparent degradation of image quality, that otherwise would do so.

If the infrared communication (composed of 123 and 124) and electric current induction (composed of 126, 127 and 128) systems are not used, the encoding format used in this embodiment is the same one that was used in the previous embodiment, so 4 connections are needed to send the needed electricity and information to the decoding electronics to control the lights: one connection contains the state of the light that is being addressed, one is used to advance to the next light, one is general positive current, and one is ground. If the infrared system discussed earlier (composed of 123 and 124) is used, the clock pulse connection is not needed, since the decoding electronics 125 generate the appropriate clock pulses itself. Thus, the only commutator in this embodiment (composed of 132 and 133: an array of brushes and an array of contact rings, respectively) has 3 connections: 1 to control the infrared transmitter 123, 1 to power the electromagnet rod controller 122, and 1 for common ground. The driver electronics 134 connect to the brushes 132 from the commutator (composed of 132 and 133) and send the proper signals to make the display produce images.

In an alternate version of this embodiment, a motor is connected to the light string 98, so that as it 98 rotates to compensate for the platform's 101 rotation, this new motor rotates the light string around the vertical axis running though its 98 middle in the opposite direction—so as to just compensate for the motion of the platform 101. The result is that the light string moves along with the platform 101, but its orientation does not change as it rotates. The result of this is that a cable can be directly connected to the light string 98, thus allowing for the elimination of one commutator (composed of 114 and 115), or infrared system (123 and 124) and induction system (composed of 126 and 127). This may also be desirable to use with the opacity system since the lights do not change orientation and this at least may simplify the opacity calculations done in a computer, which are be explained much later.

Embodiment 5: In this embodiment, a vertical string of lights moves along the width (X) axis, while simultaneously moving along the depth (Y) axis. One of the two motions is done much faster than the other.

In the following embodiment, only one light string is used. It is vertical and very stiff. A separate support structure is not really needed so, as in the previous embodiment, the lights (of which there are about 500) can be simply built into a Plexiglas rod or something similar. While all of the previous embodiments involved a light string rotating about at least one axis, this embodiment uses no rotation—only simple "back and fourth" and "side to side" motions. Also, this embodiment produces a monochromatic image. The display volume is cubic.

Figure 37:
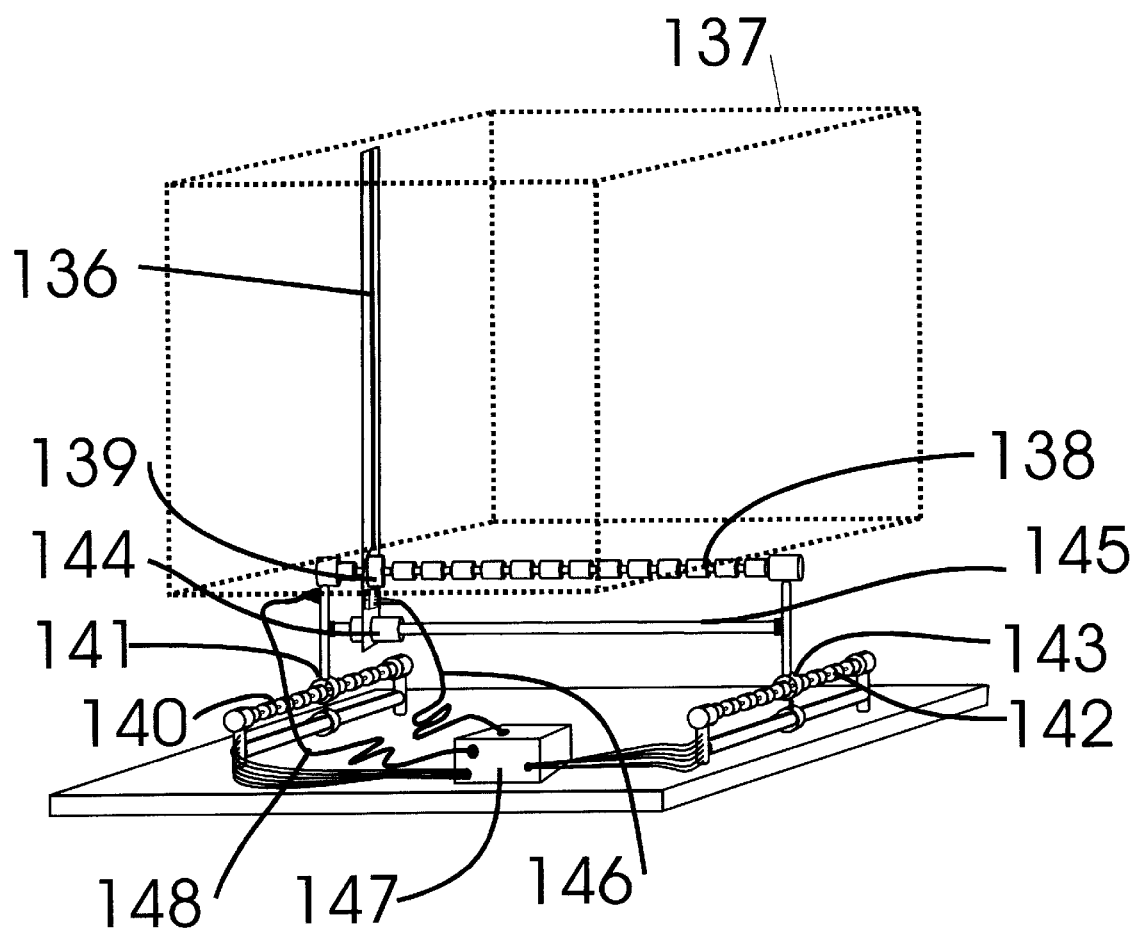
FIG. 37 shows an alternate embodiment in which a vertical light string moves back and forth while simultaneously moving to the left and right.
Figure 38:
FIGS. 38–41 show—from a top view—the path that that light string used in FIG. 37 follows after 25%, 50%, 75%, and 100% completion of a motion cycle, respectively (assuming a faster side to side motion than front to back).
Figure 39:
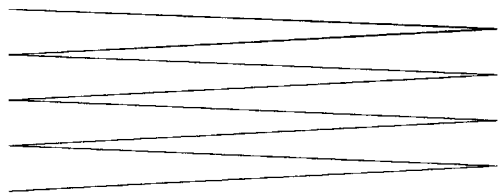
Figure 40:
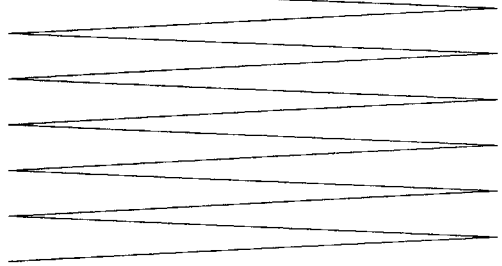
Figure 41:
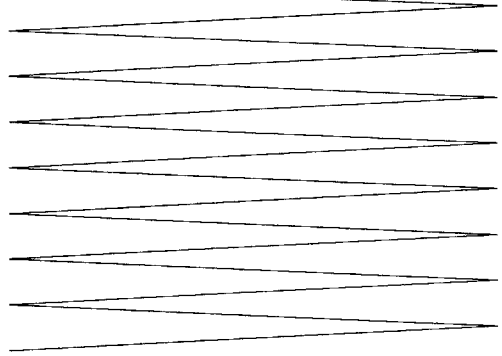

In an alternate embodiment shown in FIG. 37, a single hard vertical light string 136 moves back and fourth while simultaneously moving to the left and then to the right; with one of the two motions being done faster than the other. For example, moving front to back rapidly, while moving side to side less rapidly. To better understand this, suppose the same situation discussed in prior embodiments: a writing implement were placed upside down on the top of the light string 136. Then suppose the light string 136 went though one motion cycle: that is, going from the front to the back, and moving side to side many times. It also may alternately be the reverse: moving from one side to the other, and moving back and fourth many times—depending on the implementation chosen. The pattern that would be produced on a piece of paper immediately above the writing implement would appear as shown in FIGS. 38 through 41 for the side motion being faster. Those being the pattern after 25%, 50%, 75%, and 100% completion, respectively. In this hypothetical situation, the faster motion is being done only 16 times faster than the slower one. In reality, the faster motion is done over 100 times faster than the slower motion. The point of this is that in a complete motion, nearly a complete square of space is passed through by a light; and since there are 500 lights forming a vertical string, there are nearly 500 closely packed squares, one on top of the other—essentially forming a cube—of space that is passed through by lights. Thus the lights 136 can make nearly any point in this display volume 137 appear to glow by activating the correct light when that light is in the space that is supposed to appear to glow.

In the following description, it is assumed that the back and fourth motion of the light string 136 is done faster than the side to side motion.

This embodiment may optionally be implemented in a manner very similar to that of the previous embodiment. The following assumes such an implementation. Specifically, as in the previous embodiment, an electromagnetic attraction based system (composed of 138 and 139: the electromagnet rod and permanent magnet sleeve, respectively) is used to move the string of lights 136 side to side, while a second (composed of 140 and 141) and third (composed of 142 and 143), similar electromagnetic attraction based systems move the entire light string 136 and first electromagnetic attraction system (composed of 138 and 139) back and fourth. To prevent the light string 136 from falling over, there is a linear bearing 144 below the permanent magnet sleeve on the light string 136. This linear bearing 144 runs along a non-threaded rod 145. Since there is no rotation in this embodiment, to transfer information and electricity to this moving light string 136, a simple cable 146 is used. Since the cable 146 is durable enough to withstand the movement, it is connected directly from the driver electronics 147 to the light string 136. The cable 146 is longer than needed, so that the stress of being bent has an opportunity to be distributed over a larger distance. A second cable 148 is used to transfer electricity to the moving magnetic attraction based motion system (composed of 138 and 139). The speed at which the light string 136 is moved by the magnetic attraction systems (138 and 139; 140 and 141 and; 142 and 143) is such that the string of lights 136 moves from the right to the left and right again rapidly enough for it to make a complete motion from one side to the other within the refresh time of the human eye; while simultaneously moving back and fourth many (such as 100) times within one side to side motion. The electromagnet rods (138, 140 and 142) are controlled by the driver electronics directly.

Since it is not preferable to have too thick a cable 146, an encoding format is still being used. For simplicity, the encoding format may be the same one that was used in the previous embodiment, so only 4 wires are needed in the light string's cable 146. Different encoding formats with different numbers of needed wires may be used instead.

In an alternate version of this embodiment, the back to front motion speed of the light string 136 and the side to side motion speeds are swapped for one-another. Also, if the previously discussed method for sending information to the light string 136 is not used, two sets of linear commutators (similar to those used in previous embodiments) may be used instead. If this is done one linear commutator sends information and electricity from the source 147 to the moving second linear commutator; and the second linear commutator sends information to the light string 136. That first commutator also has to transfer power for the moving electromagnetic attraction based motion system (composed of 138 and 139). Instead of magnetic attraction based systems (138 and 139; 140 and 141 and; 142 and 143) to move the light string, it may instead be moved by threaded-rod based systems like that used in FIG. 29. Also, the light string 136 may be curved instead of straight.

Embodiment 6: In this embodiment, a string of lights that extends into the width (X) axis rotates about a vertical (Z) axis that runs through the string's center. This is done while simultaneously, the string is move up and own along that vertical (Z) axis. One of the two motions is done much faster than the other.

In the following embodiment, one rigid light string is used, and again, it is used in a monochromatic way. In this embodiment, the light string is horizontal, and the support structure is the same as in the previous embodiment. The light string is composed of two pieces. Those pieces are, attached or built, into a horizontal support structure. The display volume is cylindrical.

Figure 42:
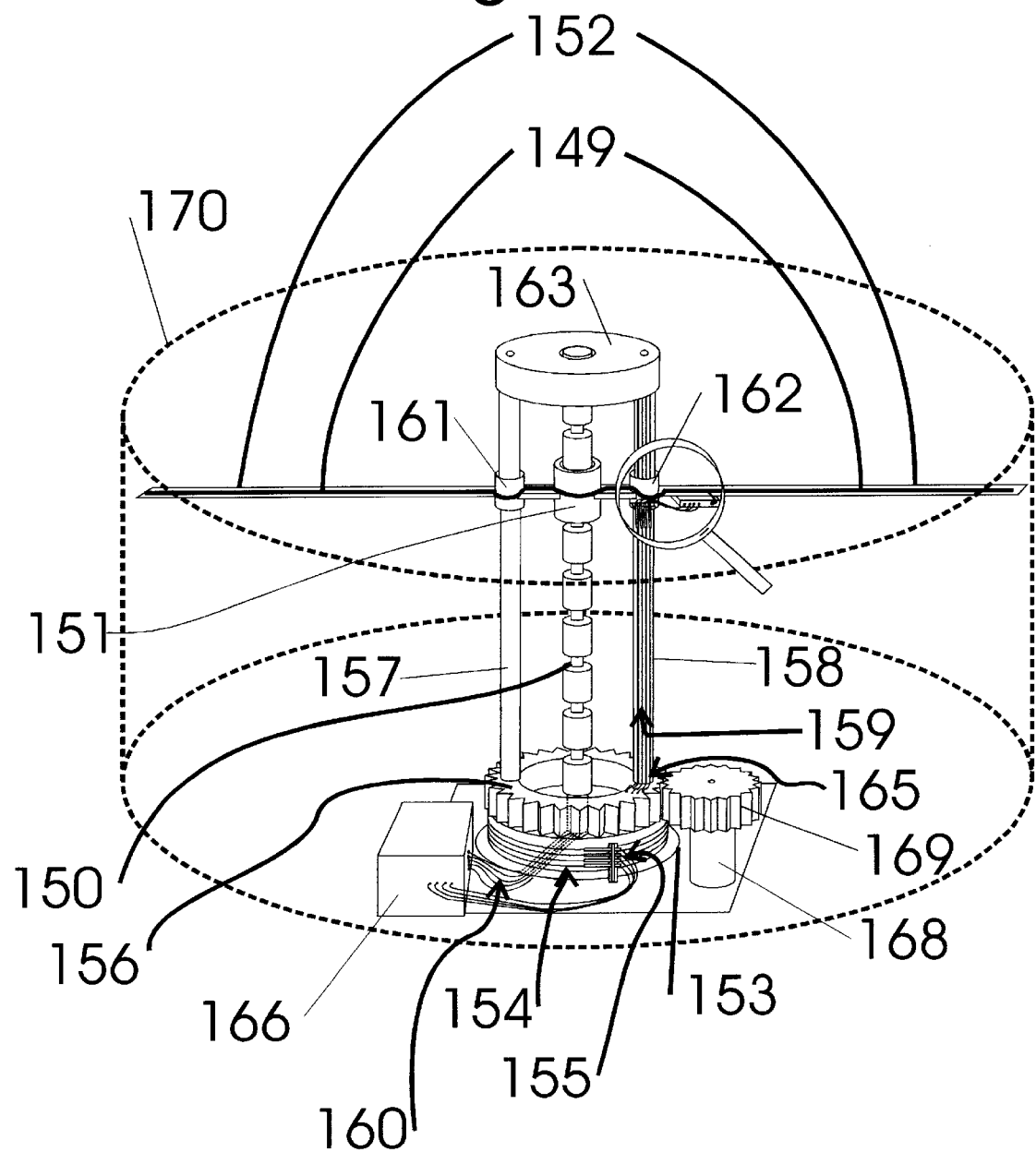
FIG. 42 shows an alternate embodiment in which a horizontal light string moves up and down, while rotating rapidly about the axis along which, it is moving up and down.

In this embodiment, shown in FIG. 42, a horizontal string of lights 149 rotates about the vertical axis that runs through its center; while simultaneously moving up and down. The light string 149 is propelled up and down by means of an electromagnetic attraction based system (composed of 150 and 151: the electromagnet rod and permanent magnet sleeve, respectively). The light string 149 is very rigid and is part of a rigid support structure 152 (possibly made of Plexiglas). For each rotation of the light string 149, the light string 149 is moved up and down many (such as 100) times. One rotation of the light string 149 is completed within the refresh time of the human eye (not longer than ¹⁄₁₀ seconds). The result of this motion is that nearly the entire volume of a cylindrical space 170 is passed through by lights. Thus, the lights are able to make nearly any point or points in that space 170 appear to glow—and as a result, images are able to be produced.

Figure 43:
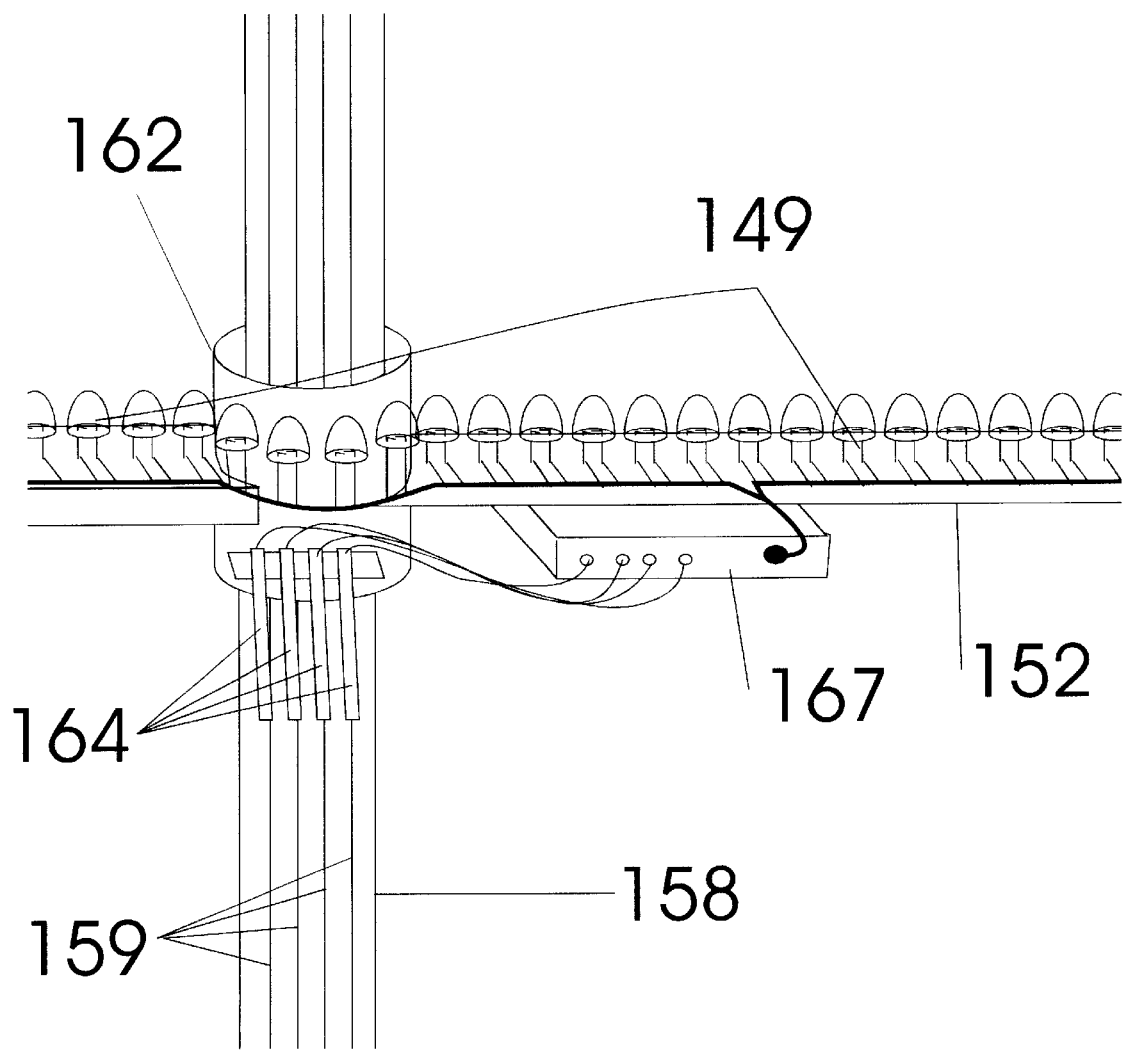
FIG. 43 shows, close up, the area indicated by the picture of the magnifying glass in FIG. 42.

To perform this function, there is a rotating platform 153, on top of which is a commutator system (composed of 154 and 155: an array of contact rings and the rotating cylinder to which they are attached; and an array of brushes, respectively) and a horizontal gear 156, which are connected to each other. Attached to the gear 156, are two vertical (non-threaded) rods (157 and 158). The two rods (157 and 158) are offset along the gear 156 by 180 degrees. Along one of these two rods 158 are metal strips 159 that are used in the linear commutator (composed of 159 and 164). This gear 156 has a large hole running through its center, as does the cylinder that the rotational commutator (composed of 154 and 155) system's contact rings are connected to, as does the rotating platform. An electromagnet rod 150 for the electromagnetic attraction based motion system (composed of 150 and 151) is connected to the floor and comes up through these previously mentioned holes. The wiring 160 for these electromagnets on the electromagnet rod 150 runs through the floor under the rotating platform 153 before exiting the floor. The light string 149 assembly has two linear bearings (161 and 162) on it. The two linear bearings (161 and 162) are equidistant from the center of the light string 149. At the center of the light string 149 assembly is the permanent magnet sleeve 151 component of the electromagnetic attraction based motion system (composed of 151 and 150). This permanent magnet sleeve component 151 goes around the electromagnet rod 150 and the two linear bearings (161 and 162) go around the two rods (157 and 158). Thus, the light string 149 assembly can freely rotate, and can be rapidly moved up and down by the electromagnet rod 150. The electromagnet rod 150 and the two other rods (157 and 158) extend to the same height—at which location they are connected to a panel 163—for added stability and to keep the light string 149 assembly from inadvertently flying off. As shown close up in FIG. 43, the light string 149 assembly has brushes 164 contacting the metal strips 159 on the proper rod 158. The metal strips 159 on the rod 158 have wires 165 running from the metal strips 159 to the commutator system (composed of 154 and 155) below the gear 156. Brushes 155 composing the outside of the commutator system contact the metal rings 154 of that commutator, and those brushes 155 connect to the electronics 166 that supply power and information to the decoding electronics 167 on the light string 149 assembly. The other set of brushes 164—attached to the light string 149—connects to the decoding electronics 167, which sends electricity to the proper lights at the proper times. Thus, the lights that compose the light string 149 are able to be controlled from the stationary information and power supply electronics 166. The gear 156 is rotated by a motor 168 with a complimentary gear 169.

The decoding electronics 167 in this embodiment use the same information encoding format that has been used in the past few embodiments—so 4 connections are needed: 1 for the state of the light being addressed, 1 to advance to the next light, 1 for general positive current, and 1 for ground.

Figure 29:
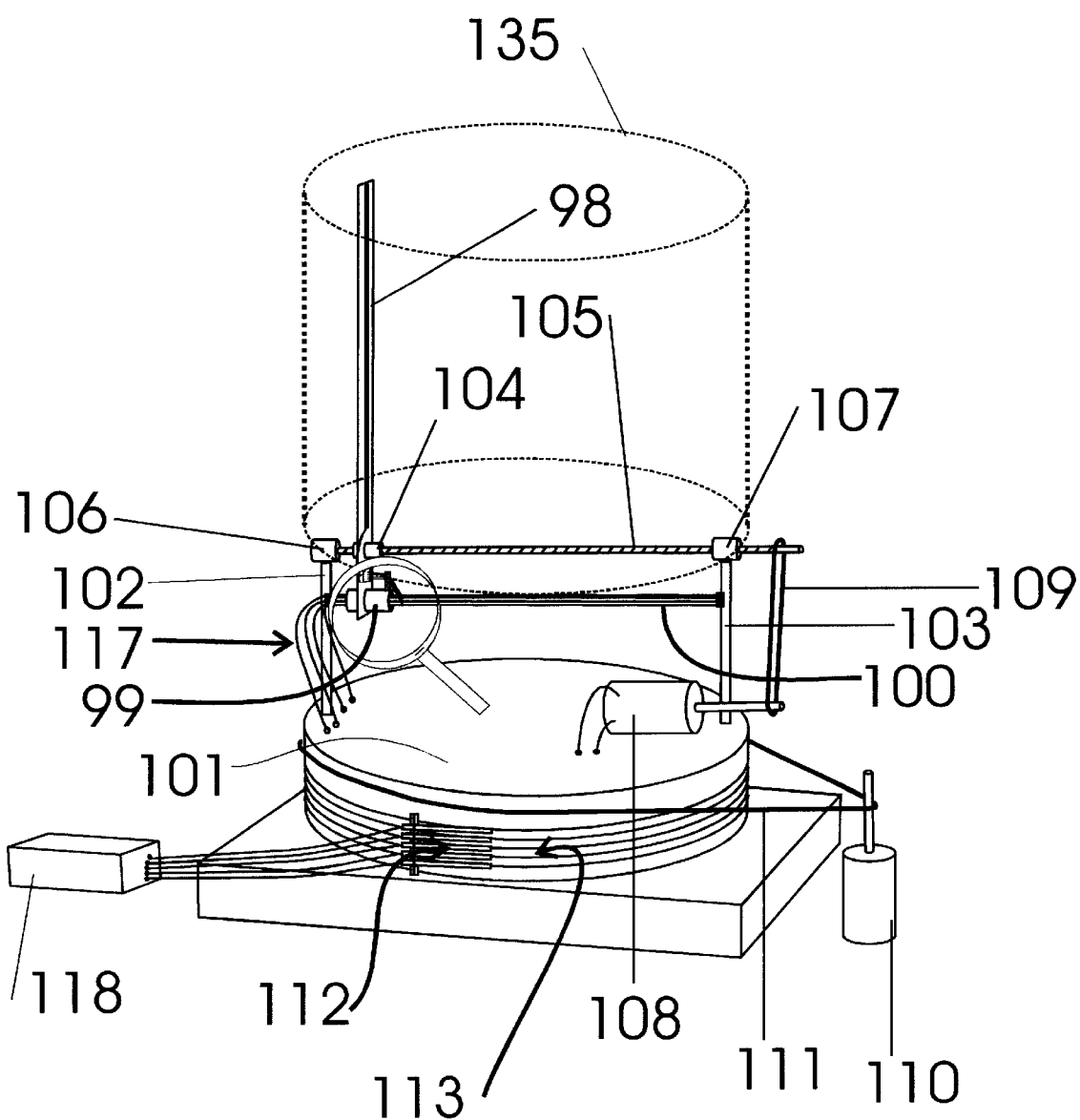
FIG. 29 shows an alternate embodiment in which a vertical light string rotates around a vertical axis, while simultaneously moving to and from that axis.

In an alternate version of this embodiment, the light string 149 rotates many (such as 100) times about the vertical axis that runs through its center for each time that it goes up or down. Also, instead of the magnetic attraction based system (composed of 150 and 151), the light string 149 is moved up and down by means of a threaded rod system similar to that shown in FIG. 29. Also, instead of using the rotational commutator (composed of 154 and 155), infrared systems are used to send the information, which similar to what is done in the embodiment shown in FIG. 23. Instead of using the linear commutator (composed of 164 and 159) to send information, a different type of infrared communication system is used, similar to what is shown in FIG. 35. Magnetic induction is used to transfer electricity in the same way it is used in the embodiment shown in FIG. 35, to take the place of the linear commutator (composed of 164 and 165). To take the place of the rotational commutator (composed of 154 and 155) to send electricity, a magnetic induction system similar to the one shown in FIG. 29 is used.

Figure 44:
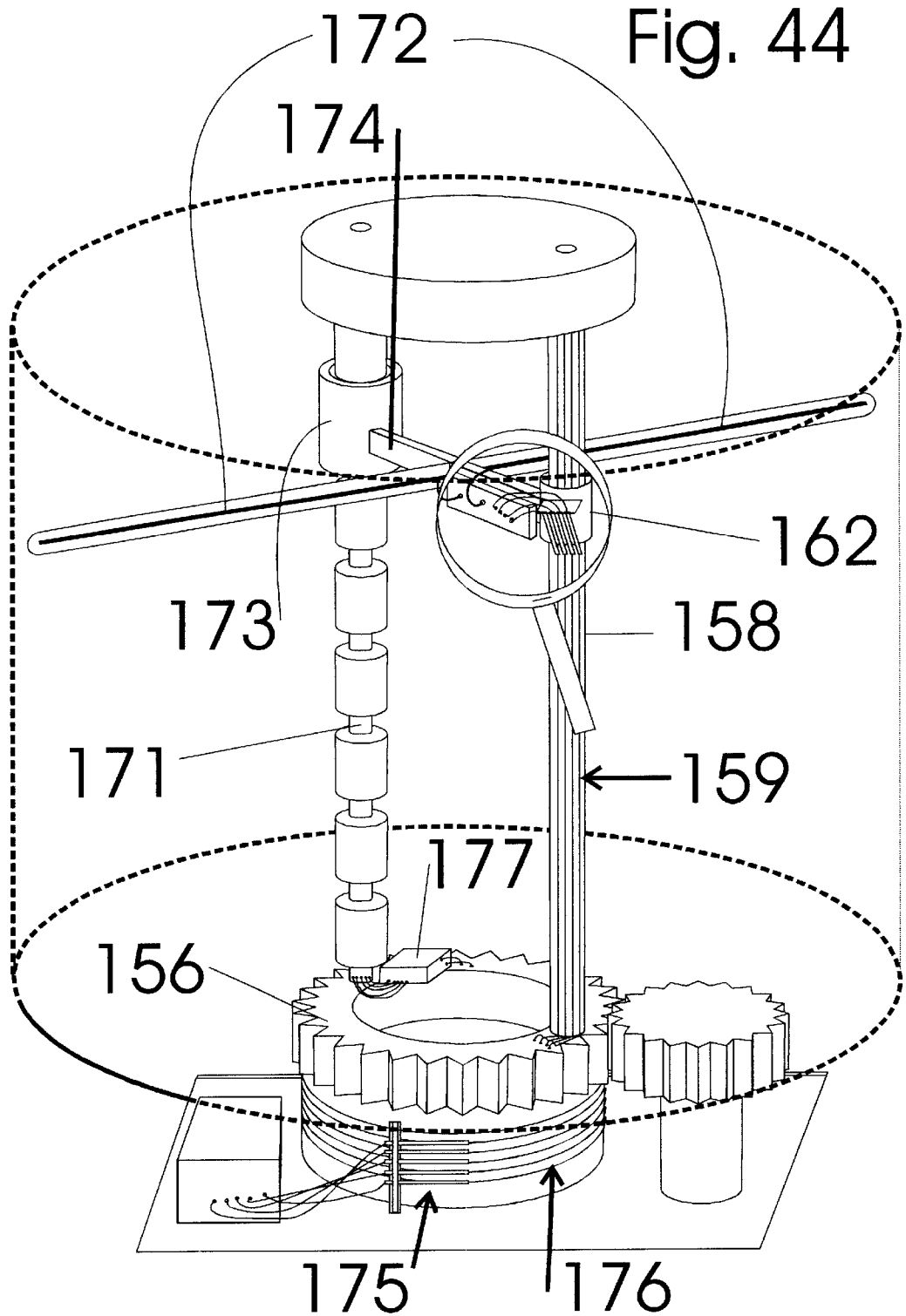
FIG. 44 shows an alternate embodiment similar to the embodiment shown in FIG. 42, except that this embodiment, among other things, has the electromagnets that move the light string up and down, rotate along with the light string.
Figure 45:
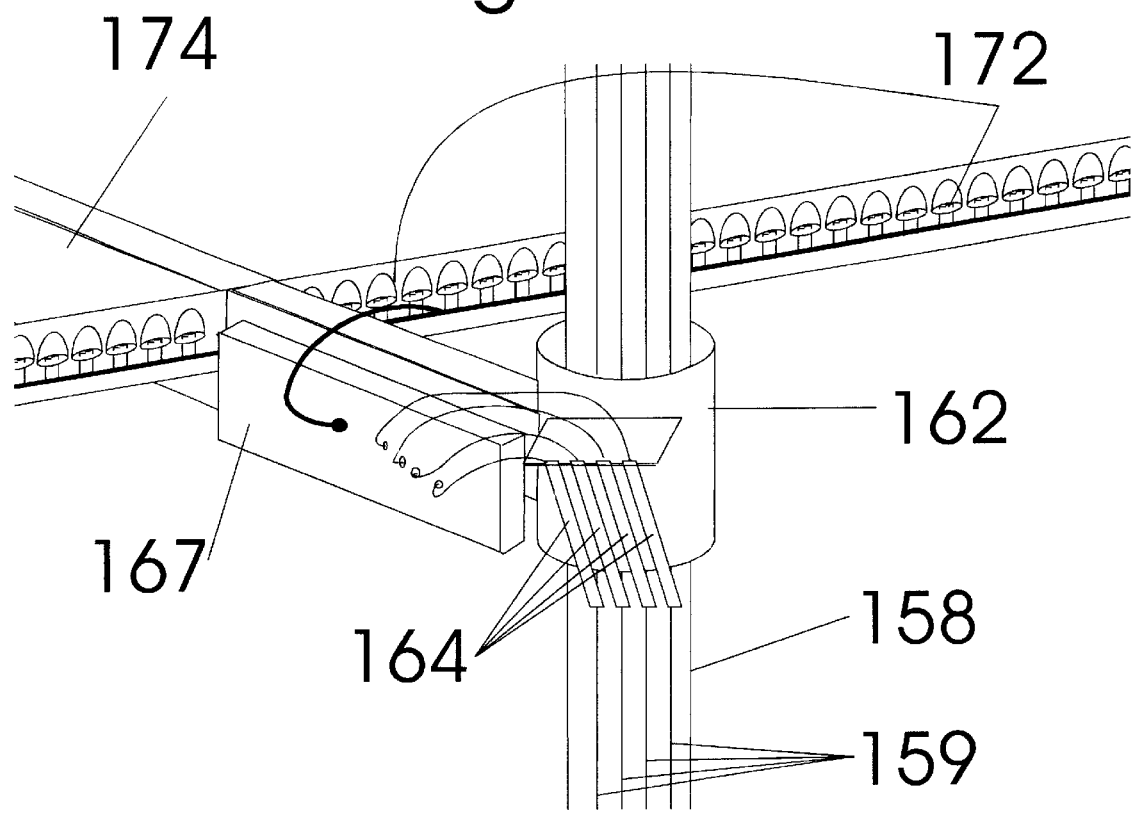
FIG. 45 shows a close up view of the area indicated in FIG. 44 with the picture of the magnifying glass.

In a different, but similar, embodiment, shown in FIG. 44, there is an electromagnet rod 171 on the gear 156, as well as one non-threaded rod 158 with metal contact strips 159 on it. To accommodate this change from the previous embodiment, the light string 172 assembly is changed so that there is a short bar 174 perpendicular and attached to the light string. On the ends of this bar 174 is one linear bearing 162 on one end, and a permanent magnet sleeve 173 on the other end. Now that the electromagnet rod 171 (since it is attached to the gear 156) is moving—unlike in the previous embodiment, power has to be supplied to it through the commutator system (composed of 175 and 176: an array of brushes and an array of contact rings, respectively) below the gear 156. The controller 177 for the electromagnet rod (The controller activates the electromagnets in the proper sequence and at the proper times to cause the light string to move up and down at the correct speed.) has to be located on the gear 156 so that it moves along with the gear 156. Thus, power only has to be supplied to the controller 177, and not to the electromagnets individually—thus, only one extra contact on the commutator system (composed of 175 and 176) is needed, compared to how many were needed in the previous embodiment. As shown close up in FIG. 45, the light string 172 still has contact brushes 164 that contact the metal strips 159 on the rod 158. Also, the light string 172 may be made curved instead of straight.

In the following paragraph, general modifications that may be made to some or all of the embodiments that have been discussed so far, are discussed. This is not intended to represent every possible change that can be made to the applicable embodiments, but just some of the potentially less obvious ones.

In the previous embodiments, the specific mechanics for motion are just one possible method, there are many others. For example, in many of the previous embodiments, multiple motors were used. In place of that, a variation is to have a single motor used in conjunction with gear systems to transfer torque to multiple locations at the same time. This is actually done in the one of the two embodiments that use two cylindrical support structures. One of those embodiments, shown in FIG. 13, uses two separate motors (45 and 46) to rotate the cylinders (3 and 4) around their respective central axes (5 and 7) in the needed way, whereas the other embodiment, shown in FIG. 7, uses a planetary gear system to take power from the first motor 17 and use that power to rotate the cylinders (3 and 4) around their respective central axes (5 and 7).

Also, concepts used in some embodiments (such as infrared data transfer or magnetic induction power transfer) may be used in other embodiments even if those concepts are not mentioned as options for that specific embodiment if those concepts are acceptably transferable.

In embodiments in which data must be transferred in 1-bit streams, specifically when infrared communication is being used: instead of encoding the data as usual and sending it while presuming that the decoding electronics' internal clock pulse keeps synchrony, a variation is to have the data be run-length encoded, as is done in digital magnetic and optical data storage media for computers. That allows for a better chance of keeping an accurate extraction of the information from the infrared signal. Another variation is to have two sets of infrared transmitters and receivers: one which transmits a clock pulse, and one which sends data. The two being distinguished from each other by operating on different frequencies, or by using laser or focusing techniques.

All of the previous embodiments used decoding electronics that received information describing the states of the lights on the light string or strings of that particular embodiment. In all the embodiments, though, it was not mentioned as to where that information comes from (except to say that it came from driver electronics)—and how exactly it is generated. This section answers those questions. This section is located after the main embodiments because it applies to all of them—with only minor differences from embodiment to embodiment. Those differences are noted. Again, the following process describes what is needed to produce the information needed for a monochrome display.

For all of the previous embodiments, the three-dimensional image that is to be generated originates in a computer (personal or embedded) in the form of a three dimensional grid of points. The details of going from a standard three-dimensional computer-based image to a data stream that can be decoded by the decoding electronics vary from embodiment to embodiment, so a general explanation is given here. The details that change between embodiments are pointed out in the following explanation.

Figure 46:
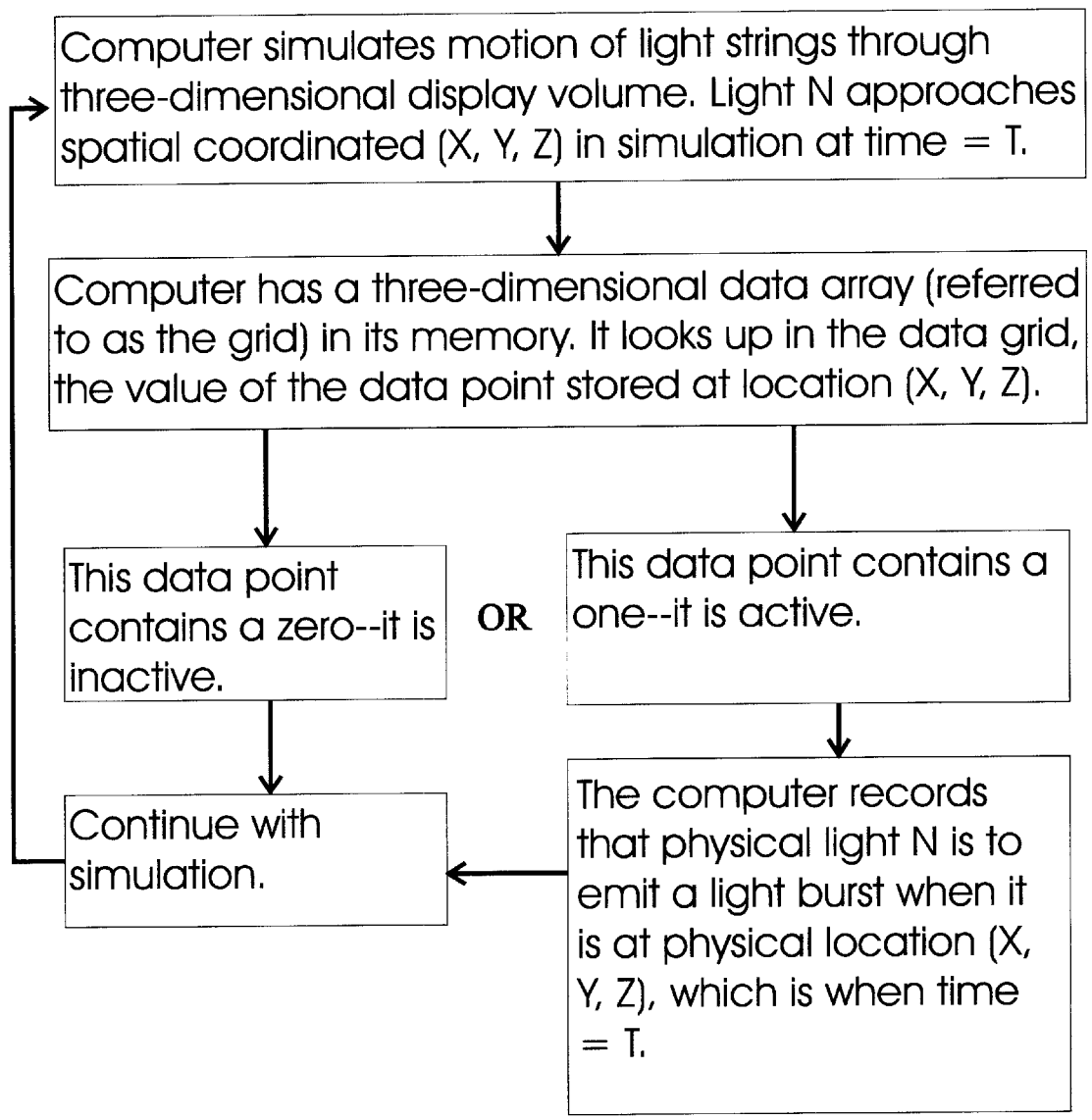
FIG. 46 shows a block diagram of one way the computer may determine in the simulation whether or not a light has intersected with an active point.

The type of image that resides in the computer and is the so called starting point of the conversion is a three dimensional grid, with some points active, and some inactive. The goal is to display this image, formed from the active points in the grid, in the three dimensional display volume. To do this, the grid of active and inactive points is converted to the following: A sequence of activations and deactivations for each light in the light string or strings employed in the embodiment that is being used. That is, the computer is able to produce a sequence of activation and deactivation times for each light that is addressed. To actually produce these sequences, first of all, the computer has access to mathematical algorithms that can be used to determine the location of any light at any point in time. The exact algorithm used varies from embodiment to embodiment, and can be produced by one skilled in mathematics and computer programming. The computer then takes the three-dimensional grid of active and inactive points and simulates it being scaled to the proper dimensions to fit inside the volume that the embodiment in question can display an image inside of. The computer then simulates the motion of the lights that form the light string(s) of the embodiment in question as they move through the display volume using the earlier discussed algorithm, while also simulating the earlier mentioned three-dimensional grid of points being inside the same volume. While this is happening, the computer determines if a simulated light is occupying the same space as an active grid point and, if it is, the computer records that. This process is shown in detail in FIG. 46. Since the computer knows the rate of motion of the light string for whichever embodiment is being used, the computer does not just record the position a light is in when it is supposed to activate, but it is able to record the time when the light is supposed to be active. Once the computer knows the activation and deactivation time sequences for each light, the computer is almost ready to set the states of the lights. The final step is to encode the information. Whatever format the decoding electronics expect the information to be encoded in, is the format in which the computer encodes the information. In many of the embodiments discussed, the format has been 2-wire information transfer: again, that is, 1 wire to set the state of the light being addressed, and 1 wire to advance to the next light. To encode the light activation sequences in this format, the computer does the following: The computer determines if the first light on the light string (if there is more than one light string, the computer starts with the first light string) is supposed be active when the time equals zero seconds, and it records this value (as a simple 0 or 1). If there is more than one light string, the computer next records the desired state of the first light on the second light string, and so on until it reaches the last light string. Next, the computer determines if the second light should be active when time equals zero seconds, which is recorded next. If there is more than one light string, the computer next records the desired state of the second light on the second light string and so on until it reaches the last light string. The computer does this for all the lights on all of the light strings with the assumption that time equals zero seconds. Immediately following those records, the computer records the states that each of the lights should be in (in the same manner as before) assuming that time equals some small time step, such as 0.0001 seconds. Following that, the computer does the same thing, but assuming that the time is 2 time steps (such as, 0.0002 seconds), then for three time steps, etc. This continues until the current time step is the length of time it takes for the light string(s) to make a complete motion cycle (which is about the refresh time of the human eye, and may vary from embodiment to embodiment). At that point the computer does not need to record any more information for this image to be displayed.

When the computer is actually ready to have the display produce the image, the computer sends this recorded information to the display as follows: The computer sends the first bit of information in the pre-recorded data stream to the decoding electronics by means of the connection that is intended to transfer the state of the current light. Next, the computer sends a clock pulse to the decoding electronics along the contact that is used to signal the decoding electronics to advance to the next light (unless the clock pulse is supplied by a timing circuit in the decoding electronics, as in some embodiments). This is done for each bit in the pre-recorded data stream. Once the computer sends the last bit and (unless the embodiment has the clock pulse supplied internally) the accompanying clock pulse, the display has displayed the entire image. What happens now depends on the way in which the motion of the light string(s) is controlled: If it is controlled by the computer directly (that is, the computer sends signals to the motors or magnetic attraction based systems to control their rate of motion precisely), then the computer can just begin resending the pre-recorded data stream. If, however, the magnetic attraction based systems and motors are pre-programmed with internal speed controllers (which is how many of the embodiments shown are shown as functioning), then the computer may need to have some way to determine the exact position of the light string—in case the preprogrammed controllers become slightly out of sync with the computer over time. This may be done by having a set of optical or physical position sensors at certain points that the light string passes through only once in a motion cycle. The sensors can send the time that the light string gets to the sensors' locations to the computer—which can modify the way in which the data stream is sent, so as to compensate for the synchronization difference. Specifically, the computer can alter the rate of information transmission.

The previously outlined method for converting a three-dimensional grid of points into a data stream that can be sent to the lights is just one possible way that this can be done. A potentially simpler method to determine when to activate each light (rather than simulating the actual motion of the lights) is to have predefined mathematical formulae in which a point's coordinates is entered into the formula, in addition to other pertinent information, and the formula yields the proper light and activation times for that light that is needed to produce the desired point. Whatever method is used to produce the end product—that is, the data stream—it must be fast; that, since the display may be used to display dynamic information (if it were used as a three-dimensional computer monitor, for example) and the system that generates the needed data stream must be able to encode three-dimensional scenes many times per second.

In all of the embodiments described so far, besides being monochromatic, all of the images that can be produced are translucent. Because all of these images are produced by flashing lights in a volume, a viewer on any side of the volume sees the individual bursts of light no matter what their location is. This results in all images being translucent. While this can be compensated for by having the display track the position of the head of the viewer, it would then prohibit multiple viewers at different locations. Also, the display could just have part of it covered—that could be considered the back, and only object faces opposite that side would be shown. That, though, would prohibit viewing from many viewpoints. It is, however, possible to allow viewers at various locations to see the image in the volume as if it were opaque—that is, they are only able to see the face of the image that is unobstructed from their point of view, which produces the illusion of opacity. What follows is a means by which this can be done, which is essentially a detailed explanation of the shorter explanation given in the brief description.

Figure 50:
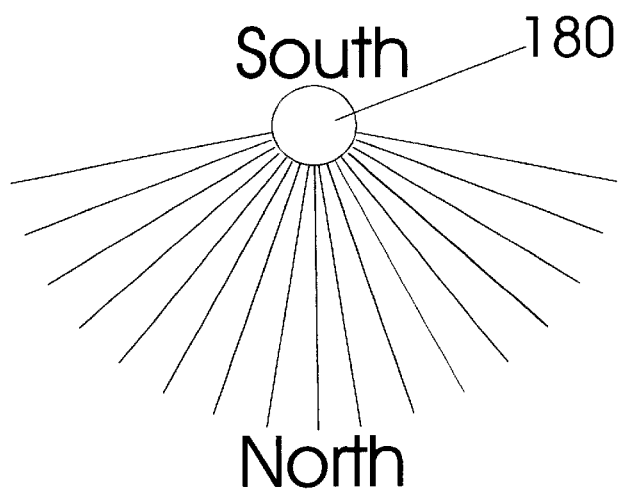
FIG. 50 shows a light that has the ability to shine light in only selected directions, that in this case is shining light only north.

Up to now, the light producing devices that compose the light strings have been intended to shine light in all directions—or at least, as many as possible—at the same time. Now, a different type of light producing device is used: one that can control the direction(s) that it sends light. Each light has to be able to be dynamically controlled as to which direction(s) that it should send light when activated. The purpose for this can be illustrated by the following situation, which references FIGS. 47-A through 51: Suppose that the three-dimensional display (for the sake of the discussion, suppose an embodiment in which the display volume 179 is cylindrical) is being used to show an image of two photographs that are back to back. Thus, the intent is that a rectangular object 178 is to be shown that appears to have one image on one face, and a different image on the other face. If this object 178 is not shown as opaque, the two images are both visible from either side—so the object 178 must appear to be opaque. Let us suppose that on one side (suppose, the North side) of the object 178, a circle appears to be printed, as shown in FIG. 47-A. On the opposite side (the South side) a triangle appears to be printed, as shown in FIG. 47-B. Let us also suppose that this object 178 (the two back-to-back photographs) is shown so that it is vertical; that is, so that it is resting on its edge, and both of its faces (specifically, the front and the back) are perpendicular to the ground. FIG. 48-A shows a view of this object 178 from the point of view of one who is standing taller than the display volume 179, North of the display volume 179, and slightly left of the display volume 179. FIG. 48-B shows a view of this object 178 from the point of view of one who is standing taller than the display volume 179, South of the display volume 179, and also slightly left of the display volume 179. The cylinder 179 shown in both FIGS. 48-A and 48-B represents the boundary of the display volume. FIG. 50 shows a close up image of a single light 180 from a light string that would be used to produce this image. This particular light 180 is being used, at the particular moment shown, to display a point that is part of the image of the circle. Thus, only one who is standing North of the display volume 179 should be able to see the light that this light 180 produces. As shown in FIG. 50, the light is only sending light in the North direction. Since every time a light produces a point that is composing the picture of the circle, it only sends the light it produces in the North direction, only viewers on the North side are able to see the circle. If this is also done for the triangle, except that the light for it is sent South only, there is the appearance of opacity. The edge of the object 178 (the two photographs) that is being shown is visible from any point of view, so when the points that compose it are being produced, the lights that are producing them send light in all directions. The result of this is that the three-dimensional object 178 produced appears to have one drawing on one side of it, and another drawing on the other side.

Figure 49:
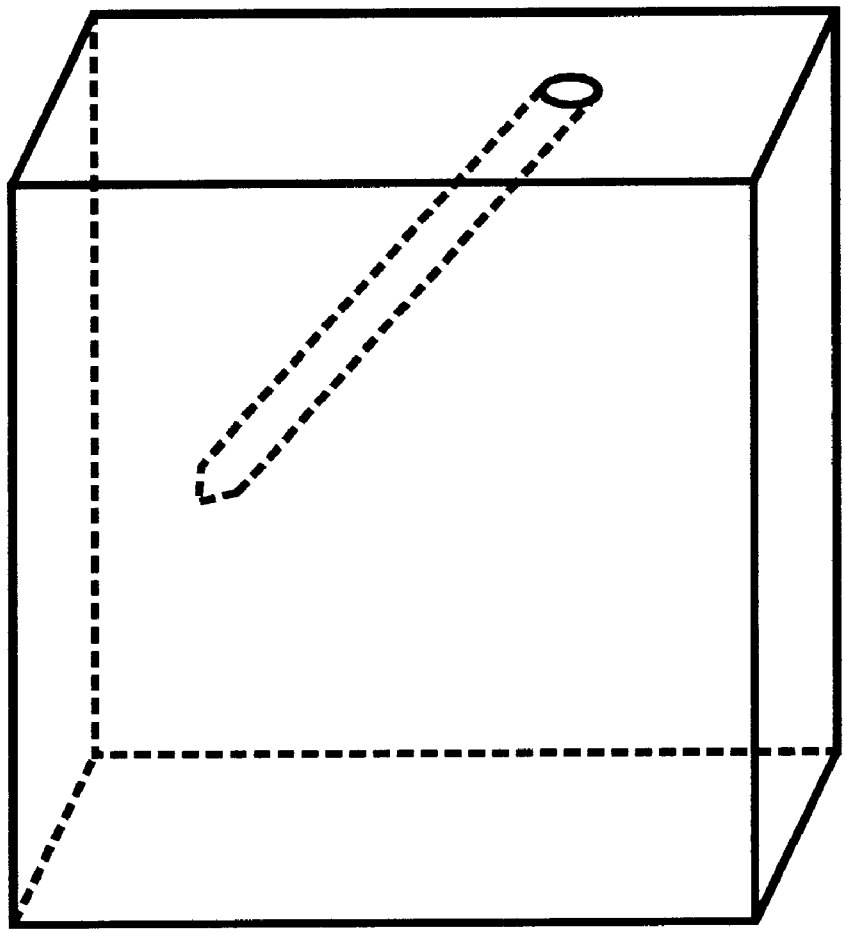
FIG. 49 shows a three-dimensional image of a cube with a hole drilled in it.

From the preceding example, it may seem as if the direction-controlling lights need only be able to select from possibly 6 directions (for the three dimensions) as to which directions they shine light. This, however, is not the case. Suppose an example in which an image (opaque, of course) of a solid cube with a hole drilled in it is being shown. Suppose this hole is drilled at a 45 degree angle into the cube. This object is shown in FIG. 49. When the display is made to show the points of light that compose the bottom of the hole, one can imagine that for opacity to be done correctly, there is only a very narrow set of viewing angles from which one should be able to see those points of light. Thus, sending light simply up or left or right, etc. will not allow those points of light to be visible from only the correct viewpoints (the only correct viewpoint is that of one looking down into the hole at the proper angle to see the bottom). If the light is not visible from only the correct viewpoints, the quality of the opacity will diminish. Thus, it is desirable to have a fine a control as possible over the directions in which light is sent—just the six basic directions are not necessarily enough.

Figure 51:
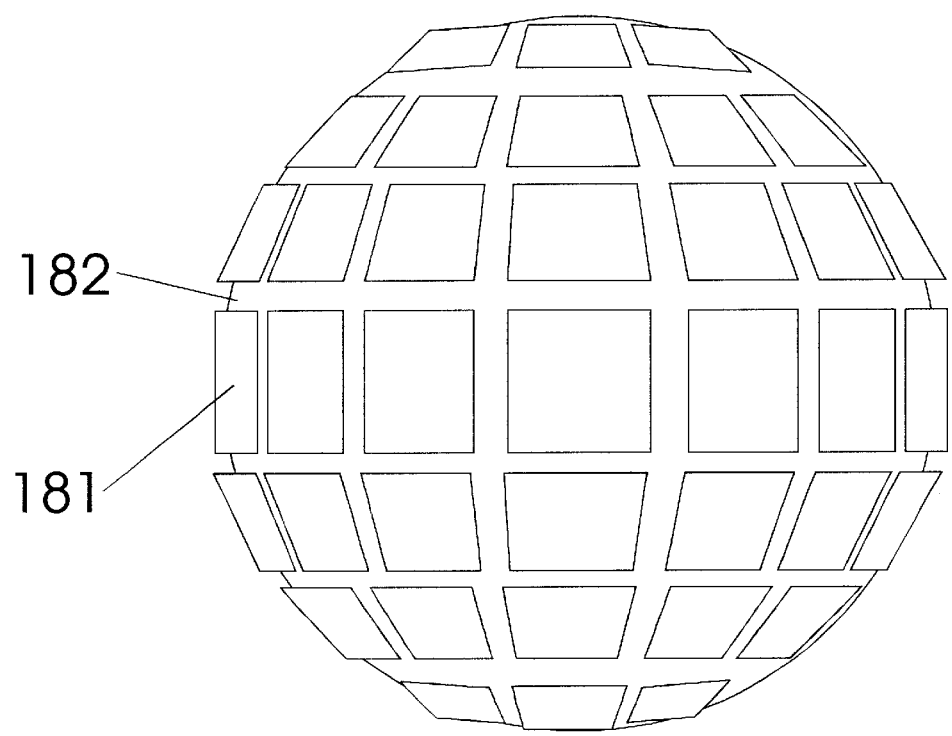
FIG. 51 shows a close up view of a light that can control the direction that it shines light, by nature of its being composed of many smaller lights aimed in different directions.

What follows is a means by which to actually produce a light emitting device that can control the directions to which it sends light. Before describing the details, though, it must be understood that the critical step that is done, to make one of the earlier-mentioned embodiments able to display opaque images, is simply to replace all of the ordinary lights in that embodiment with the lights that can control the direction(s) to which they send light. There is an alternate way to do this, described in the next paragraph, also. One method to actually make these light emitting devices that control the direction in which they send light, is to have them composed of several smaller light emitting devices, as shown in FIG. 51. If light emitting diodes are used, tiny LED chips (one of which is 181) are placed on the outside of a tiny sphere 182. Each LED chip (one of which is 181) has a narrow viewing angle and is on a different part of the tiny sphere 182, with the plane of the LED chip perpendicular the normal of the part of the sphere on which it is placed: thus causing each LED chip to be aimed in a different direction. Each LED chip (one of which is 181) also has a separate positive terminal and a common ground. Thus, one can cause this tiny assembly of lights (one light of which is 181) to shine light in different directions—by only activating the correct LED chip(s) (one of which is 181). The size of this whole device seen in FIG. 51 is as close as practical to the size of one ordinary light producing device. This arrangement allows for the production of opaque images, as outlined earlier. Obviously, though, the realism of the opacity depends on the number of LED chips (one of which is 181) that are put on the outside of the tiny sphere 182—the more, the better.

As an alternative to having to produce a complex device, like that which was just outlined, for each light producing device; there is a potentially easier way to be able to select the direction(s) in which light is sent. Instead of having lights that allow the direction of light transmission to be controllable, multiple light strings are just used, each of which shines light exclusively in one direction with respect to the light string. This is more practical for some embodiments than others. The first embodiment (shown in FIG. 7) is a good candidate for this method, because more light strings can be put on each of the cylinders (3 and 4). If this is done, each light string on the cylinders (3 and 4) would shine light in just one general direction with respect to the cylinder on which it lies (3 or 4). However, the embodiment shown in FIG. 35 provides more of a challenge—as whole additional structures may be needed so that one can add more light strings that are separated from each other and do not interfere with the needed motion of the light strings.

Again, if the multiple light string method is used, each light string consists of lights, each of which shines light in just one narrow directional range. One light string might consist exclusively of lights that shine light up; another light string might then consist of lights that only shine light down, another front, another back, another left, and the last light string, right. This provides for 6 directions of control of light transmission. That means that objects may have some transparency where they are supposed to be opaque, with this method. This method still, though, allows for the acceptable reproduction of some objects—and so might prove valuable as a lower cost substitute to the previous method—which involved lights made of smaller lights.

There now must be a way by which all of these extra lighting elements can be addressed. What is done is that all of the lights are just considered "more lights" and are just addressed in sequence in the same way that fewer lights are addressed. Considering how many lights there are, it is a good idea (in the embodiments in which it is possible and practical) to send more information at once—by using an encoding format and communication strategy that sets the state of several lights at the same time, instead of just one.

There is also the issue of how exactly the computer knows how to control all of these lights so as to produce the opacity effect. This process could theoretically be performed in numerous ways. Here, one such way is presented. As this process is quite complicated, this explanation may appear at times to be redundant, however this is done in an attempt to make this integral concept more understandable.

As with non-opaque embodiments, the computer initially has a grid in its memory. This grid is a three-dimensional grid of data. This grid also represents the display volume of the embodiment of the three-dimensional display being used (no matter the shape of the display volume, the grid is always a cube, adjusted in size to fit in the display volume). As a result, each location in the grid represents a location in space in the display volume. Each location in this grid (known as a "point") contains several things. One thing each point contains is an activity flag. If the flag is set to one (or "on"), the point is active. If the flag set to zero (or "off"), the point is inactive. A second thing each point contains is an opacity flag. Both of these flags start out in the "off" position for every point in the grid. Color-capable embodiments that are discussed later contain more information in each point—however, that does not matter now. Now that there is this data grid, three-dimensional images may be drawn into this grid. Images are drawn by turning on the activity flags of the points in which the drawing is being done. For an example image, suppose the image that is being drawn is that of the filing cabinet in FIG. 0-D. For the moment, ignoring the fact that it is to be opaque, let us just be concerned with drawing the image of the filing cabinet. This image may be drawn by an artist manually activating points or by some sort of more "computer-aided" approach—such as some sort of 3-D CAD program. Please note that this file-cabinet image is wireframe. That is, each face of the file cabinet is not filled in. Just the borders of each face are drawn. If actually reproduced by the three-dimensional display at this point, a viewer would see an image like that shown in FIG. 0-D, which is obviously not opaque. The next step in getting to opacity, though, is for the artist to perform another step. The artist must decide what areas in the three-dimensional volume should not appear to have any light pass through them. This is very important since, in the real world, opaque objects are composed of areas that light does not pass through. These areas that light should not pass through are expressed as two-dimensional polygonal areas in the data grid. These areas are drawn into the data grid by activating opacity flags in the points in which the drawing is being done (please recall that drawing images is done by turning on activity flags, but drawing areas that light should not pass through is one by turning on opacity flags). As a result of this, the artist will decide which two-dimensional polygonal areas in the three-dimensional data grid (to be sure, points in the data grid represent points in the display volume) should appear to have no light pass through them. Let us suppose that the artist decides that the far-right face of the file-cabinet is to have no light pass through it (thus making that face of the file-cabinet appear opaque). The artist will specify to the computer the points that compose the border of that polygonal area. The computer then fills in that polygonal area in the three-dimensional data grid by turning on the opacity flags of those points. Thus, what has been done is that the points in the data grid that compose the border and inside of the two-dimensional, square face that represents the far-right face of the file-cabinet had their opacity flags turned on. Next, the artist may decide to make the rest of the faces of the file-cabinet opaque as well, or not. Let us suppose that the artist is satisfied with just this one opaque face.

Let us review the current situation: There is a three-dimensional data grid. Some of the points in this data grid have their activity flags turned on. These points by themselves form an image of a wire-frame file-cabinet, shown by the squares in FIG. 52-A. There are other points that have their opacity flags turned on. These points by themselves form a filled-in square that is in the same place as the far-right face of the file-cabinet, shown by the brick pattern in FIG. 52-A. Assuming that the artist is satisfied with this—a file cabinet with one opaque face, and the rest transparent—the computer is ready to perform the next step. This next step is to perform a simulation (similar to, but substantially different from the simulation performed in the non-opaque embodiments). The computer simulates the three-dimensional data grid being inside the display volume; and then simulates the direction-controlling lights moving through this display volume and the data grid. The computer continually checks to see if a direction-controlling light intersects with a grid-point with its activity flag turned on, in this simulation. When the computer finds that a direction-controlling light intersected with a point with its activity flag on in the data grid in this simulation—it now must determine which directions to send light and which directions not to send light. More specifically, the computer must determine which tiny direction-specific elements on the direction-controlling light to activate and which to leave inactive, so that light is sent in only the correct directions (that is, so that no light is sent towards an area that is supposed to appear opaque). To make this determination, the computer does what is shown in the flowchart in FIG. 52-B. In this flowchart, it is assumed that direction-controlling light number N intersected with a point with its activity flag on. It is also assumed that this intersection occurred at location (X, Y, Z). As shown in the chart, what the computer does now is to do a test for each tiny direction-specific lighting element that composes the direction-controlling light that intersected. The test it does is: first, determine the normal vector to that direction-specific element (for example, suppose the computer is presently doing the test for the $3^{rd}$ direction-specific element), and then follow that normal though the three-dimensional data grid, starting from the lighting element, and going point by point, by point through the grid, following the vector. As the computer does this it checks to see if any of the points it is going through have their opacity flag turned on. If one of these points does have its opacity flag turned on, then that implies that light produced by this direction-specific lighting element (in this example, the third one) would hit an area that is to be opaque. Thus the computer will record that when direction-controlling light N is reproducing a burst of light at location (X, Y, Z), the (in this example) third direction-specific lighting element is not to be activated. Besides the third element, the computer will check all of the elements on the direction-controlling light that intersected. If, on the other hand, the computer can follow the vector all the way to the edge of the data grid without passing through a point with an opacity flag that is on, then the computer can activate that direction-specific element. As a result, it will have determined which individual direction-specific lighting elements to activate when a particular point is being reproduced. After completing the entire simulation, the computer knows, when reproducing each point of the image of the file-cabinet, which directions to send light so that no light is sent through the areas that are supposed to appear opaque. Thus, since no light is sent through the areas that are to appear opaque, it is as if they are really opaque.

The end result is that this produces the illusion of opacity for viewers, irrespective of the viewpoint of the viewer. Since the light producing devices can only be controlled with limited (as opposed to infinite) precision as to which directions that they will send light, the opacity effect is not perfect. However, the use of this effect is still able to produce a substantially more realistic and as a result, pleasing and useful, image than otherwise.

What follows is a technique that is used to allow the three-dimensional display embodiments that have been previously described to produce color images. Please recall that up to now, all prior embodiments have been able to produce only monochromatic images. This section describes both how to produce non-opaque and opaque, color three-dimensional images.

The central principle on which this color image production works is the same principle used in color cathode ray tube devices, and color LCD panels. This principle is as follows: produce several (usually three) bursts of primary colored light over a very small distance at the same (or nearly same) time, each burst being at a specific independent intensity. If this is done, the human eye will perceive a composite color made up of the several color bursts. This is generally done by having a very small red sub-picture element (or sub-pixel), a green sub-pixel, and a blue sub-pixel, all very close to one-another. Then the three sub-pixels are activated at the same (or almost the same) time, each at an independent intensity. The result is that a person seeing this perceives a composite of the three colors. By properly controlling the intensities, a tremendous range of apparent colors can be produced.

Light Arrangement

Figure 53:
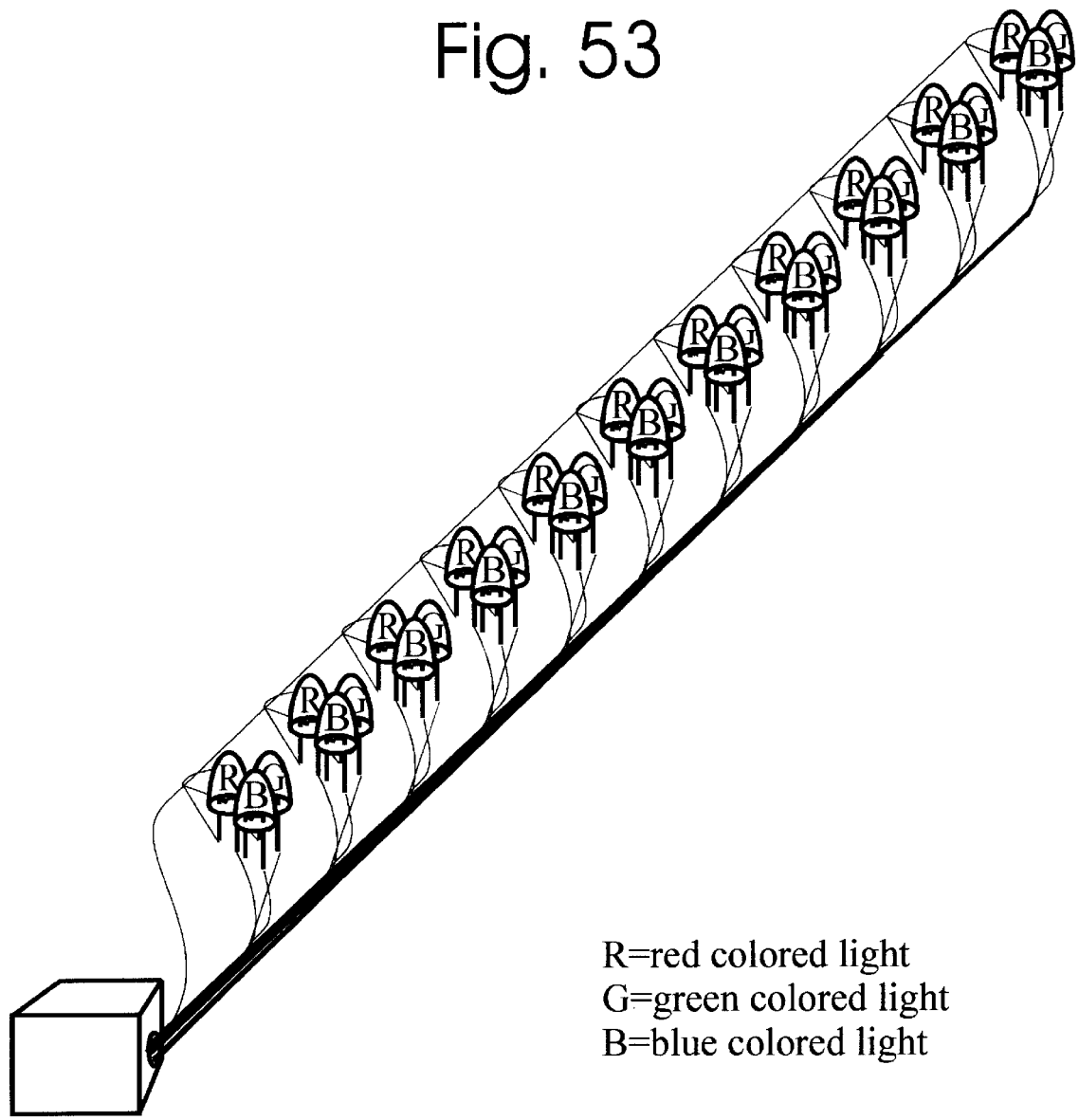
FIGS. 53 through 56 show different examples of ways in which red, green and blue lights may be arranged on light strings for color embodiments.
Figure 54:
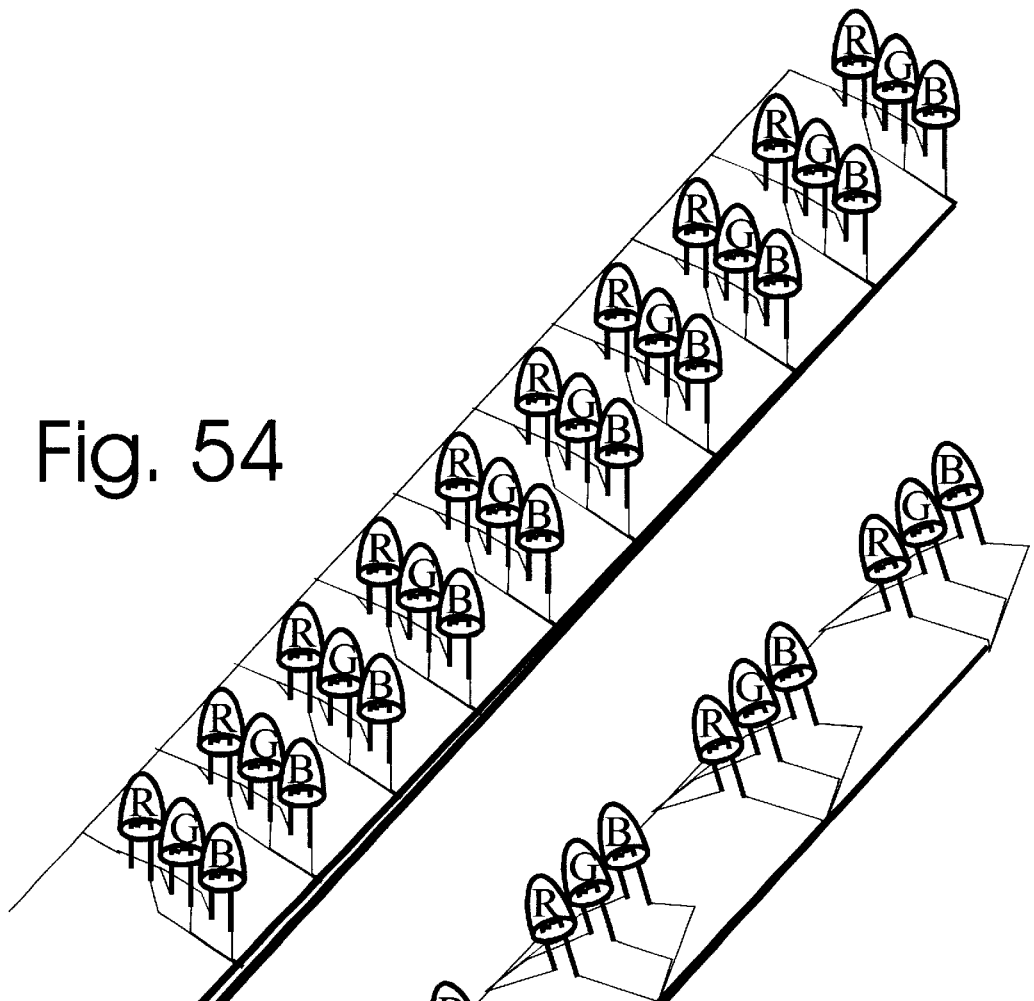
Figure 55:
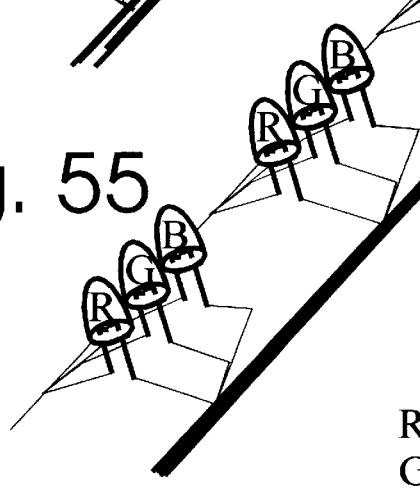
Figure 56:
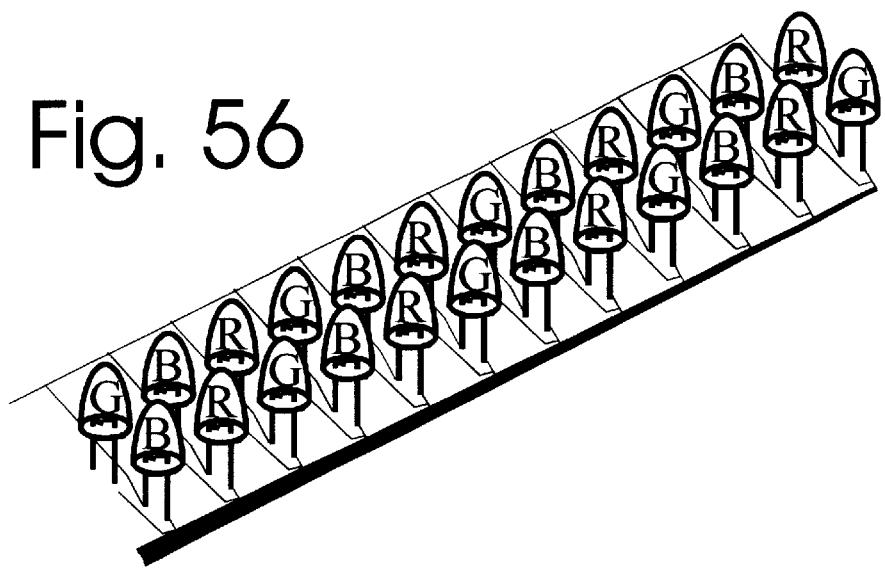

In the three-dimensional display, this is achieved as follows: In the monochromatic embodiments, each light burst is produced by one light. All the lights are the same color, and are activated to the same intensity. When built to allow for color, what was a single light in the monochromatic embodiments, is replaced by three lights, one red, one green and one blue. An example of this is shown in FIG. 53. Please compare FIG. 53 with FIG. 1. The light string in FIG. 1 is used in monochromatic embodiments, but the light string shown in FIG. 53 is for color embodiments. As one can see, the lights in FIG. 53 are arranged in clusters of threes. Each cluster is composed of one red, one blue and one green light. Each of these lights for each cluster can be controlled independently. The image in FIG. 53 (as well as all the images of these color light strings) is exaggerated in size and shows only a small length of light string, the actual size of the lights is substantially smaller than what is shown. When the lights are the actual smaller size, they are small enough for the light bursts of the three lights that compose the cluster (henceforth a cluster will be referred to as a "triplet" for convenience) to combine to the human eye and appear as a mixture of the three individual bursts from the three lights of the triplet. The way in which the lights are arranged in FIG. 53 to form a triplet is only one of many possibilities. The lights could be arranged as shown in FIG. 54, FIG. 55, or FIG. 56, as well as various other possible arrangements. Whatever the arrangement of the lights, it must be one in which the three lights that form a cluster are near to one-another.

Figure 57:
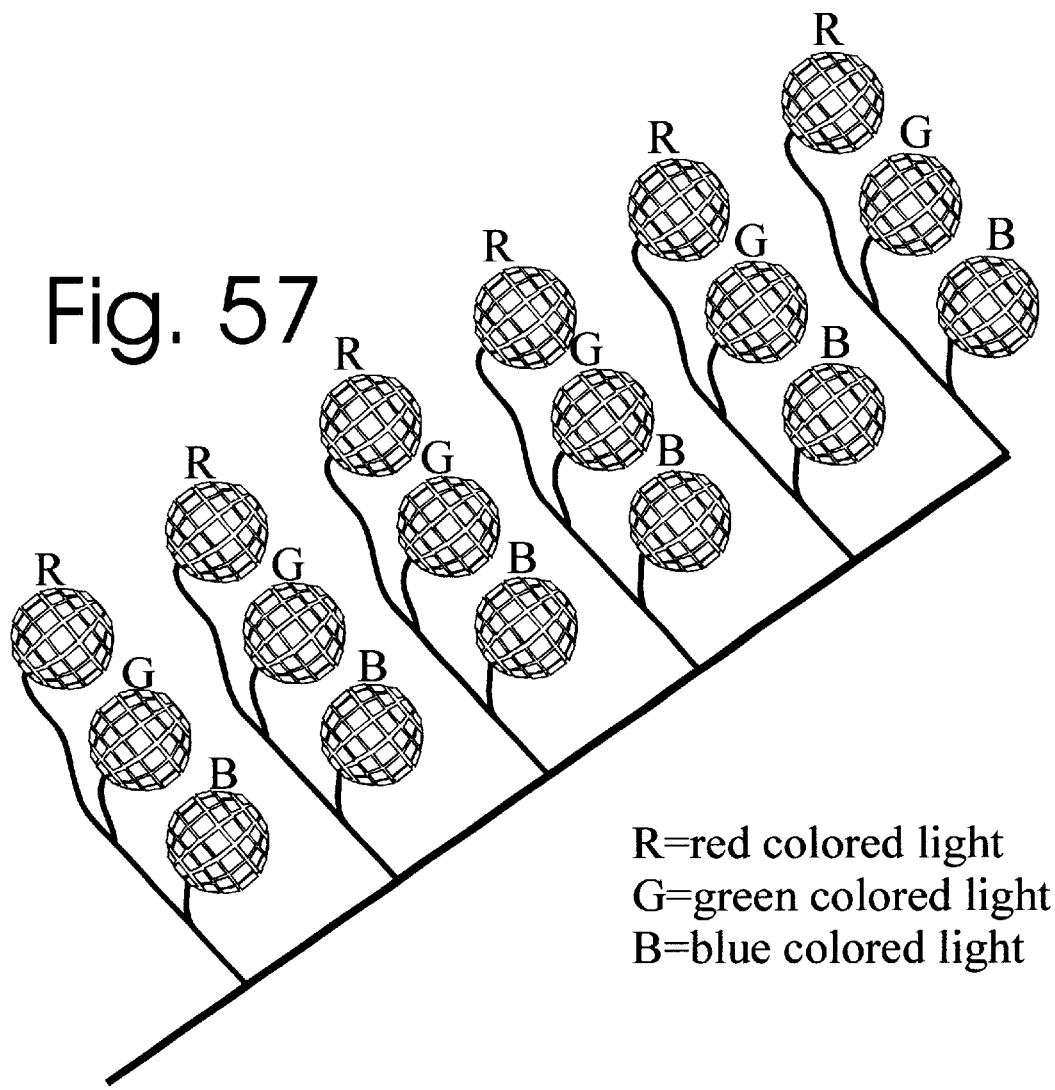
FIG. 57 shows an example of one way in which colored, direction-controlling lights may be arranged for color, opaque embodiments.
Figure 58:
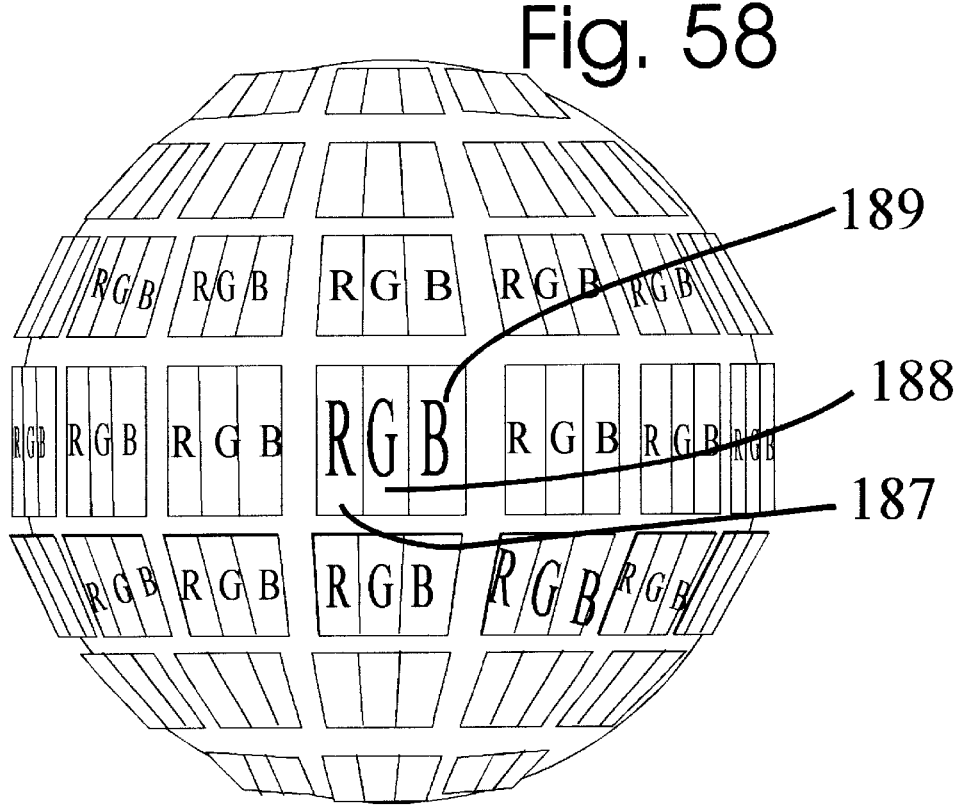
FIG. 58 shows a light that is a direction-controlling, in which there are tiny lighting elements of red, green and blue—thus producing a direction-controlling, color light.
Figure 59:
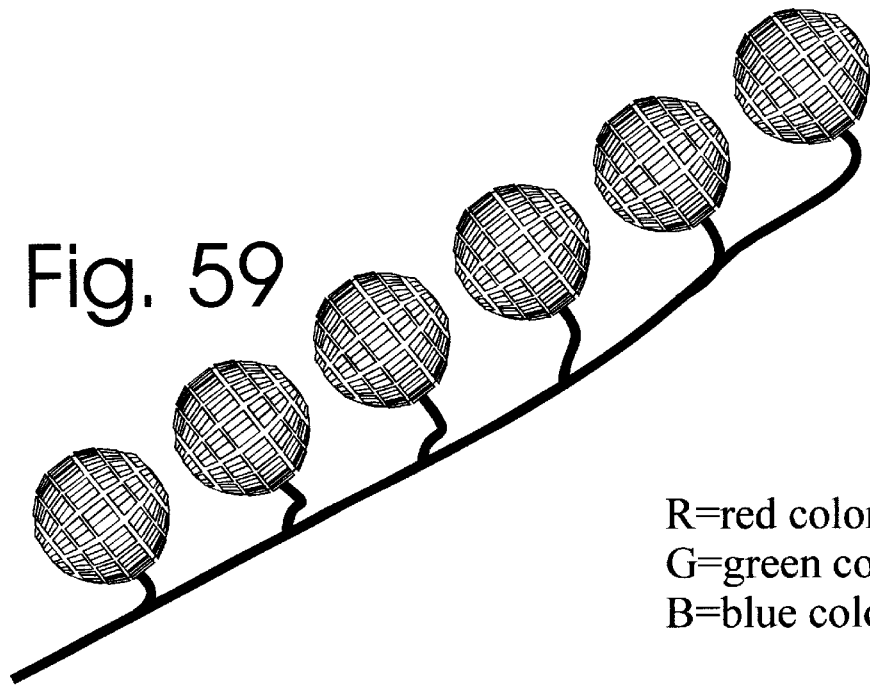
FIG. 59 shows one way in which many of the direction-controlling, color light shown in FIG. 58 may be arranged to form a light string.

If the display is being made so as to produce color, opaque images, then more than just what was shown is needed. Each individual light must be able to have its direction controlled. That means that each red, green and blue light must be replaced by a direction-controlling red light, direction-controlling green light, and a direction-controlling blue light. The same arrangements used with the non-direction-controlling, colored lights may be used with the direction-controlling colored lights. For example, FIG. 57 shows the same arrangement of lights used in FIG. 54, except the lights in FIG. 57 can have the direction in which they emit light controlled. Each of the direction-controlling lights shown in FIG. 57 are the same object seen in FIG. 51, to be sure. Alternatively to the way shown in FIG. 57, instead of having three direction-controlling lights for each triplet, each a different primary color; each triplet may be composed of one direction-controlling light, shown in FIG. 58. However as seen in FIG. 58, each direction-specific lighting element (such as 181 in FIG. 51) in that direction controlling light is replaced by three smaller elements (for example, 187, 188, and 189), one red, one green and one blue. Thus, the light string is composed of many of the object shown in FIG. 58. The resulting type of light string is shown in FIG. 59. This method of arranging the lights to produce color, opaque images is preferable to the previous method since the colored elements in FIG. 59 do not obscure each-other from some viewpoints, as is not the case with FIG. 57. However the previous method may be used instead, due to cost concerns.

Electronic Addressing of the Lights

These lights in a color-capable embodiment are controlled in a different way from monochrome-only embodiments. That is because there is more than just additional lights to address, but the brightness of each light producing element must be controllable—so as to allow for many hues to be produced by the triplets. The addressing (as opposed to controlling) of the colored lights is simple. Instead of having the serial to parallel converter address the first light, then the second, and so on; it first addresses the red lighting element for the first triplet, then the green lighting element for the first triplet, then the blue lighting element for the first triplet, then the red lighting element for the second triplet and so on. If direction-controlling lights are used, one can imagine a suitable addressing sequence. To allow for varying of the intensity of the lighting elements, an analog intensity control system is used. This functions as follows, and is shown in the diagram in FIG. 62 (FIG. 62 deals with non-direction-controlling lights, the analogous way to deal with direction-controlling lights is imaginable): Each lighting element (red, green and blue) is connected to a capacitor. The serial to parallel converter is used to address different capacitor-lighting element pairs. When one pair is being addressed, the voltage passed to the capacitor-lighting element pair through the serial to parallel converter is modulated to equal the voltage equivalent to the desired intensity of the lighting element. The lighting element is thus able to stay at the set intensity because the capacitor holds a charge long enough to keep the light at approximately that intensity until it is refreshed (that is, until the serial to parallel converter again addresses the line, to which that light and capacitor are connected). The contact that was used in the monochromatic embodiments to set the state of the light being addressed still does the same thing, except that the voltages are not a simple on or off, but a varying voltage describing just how bright the light should be. If an infrared communication system is used, the brightness of the lighting element is set by the infrared transmitter's intensity. Again, this concept is basically the same for direction-controlling lights; that since direction-controlling controlling colored lights are essentially just many tiny lights, the intensity of which must be able to be controlled.

Computer Control of the Lights

The question now presents itself of how the computer manages to control all of these lights so as to form color (and opaque color) images. When the computer controls lights, it starts out with a three-dimensional image in its memory, which it then translates into sequences of (for monochromatic embodiments) "turn on s" and "turn off s" for each light on the light string(s). This process was explained in detail earlier. Now, the situation is a bit different, the computer does not just turn lights on or off. Rather, for each item that was formerly a light, the computer must now set the intensity value for a red light, a blue light and a green light. To do this, the computer does a modified version of the same basic process done in the monochromatic embodiments: It starts out with a three-dimensional grid, the active points of which form the image that is to be shown. Now, however, the active points store values (as opposed to just being "active" or "inactive"). The values they store are primary color intensity values, one for red, one for green and one for blue. Continuing, the computer next simulates the motion of the triplets (in monochrome embodiments, it simulates the motion of lights, but for color embodiments, it simulates triplets) through the grid, and looks to see if a simulated triplet happens to be in the same place as an active grid point. If the computer finds that a triplet intersects with an active grid point, the computer records that it should activate that actual triplet when it is in that location, but the computer still needs to know how intensely to activate the individual red, green and blue components that make up the triplet, since just "activating" a triplet does not mean very much. Thus, the computer checks the grid point that the triplet coincided with. Whatever the values are for the red, green and blue values stored in the grid point, those are the values to which the intensities of the red green and blue lights that form the triplet are eventually activated: the red light to the red value stored in the grid point, the green to the green value, etc. Thus, the color represented in the grid point is reproduced when the three-dimensional image is generated.

If the computer is working with a display that produces color, opaque images, the process is very similar to the way monochrome opaque images are produced. The goal, to be sure, is to control the individual tiny direction-specific lighting elements (basically 181 from FIG. 51 or 187 to 189 from FIG. 58, and they will be referred to as "tiny elements" henceforth) that make up direction-controlling lights that make up triplets that make up light strings, so as to produce images. Now, however, those tiny elements are different colors: specifically one set is red, one set green and one set blue. The tiny elements may be arranged to form triplets as shown in FIGS. 58 and 59, in which each direction-controlling light has three sets of tiny elements on it (one set red, one green and one blue) and thus the direction-controlling light is considered a triplet; or they may be set up as in FIG. 57, in which one direction-controlling light is composed of only red tiny elements, one of only green, and one of only blue, and those three direction-controlling lights are considered a triplet. Whichever arrangement is chosen, the process to determine how to control the tiny elements is basically the same. The process, similar to the process used for monochrome opaque embodiments, is as follows: The computer starts out with a three-dimensional grid, the active points of which form the image that is to be displayed. The grid also contains polygonal areas that are to appear opaque, and thus the direction-controlling lights do not shine light toward them. Now for color, every active point of this grid contains three primary color values, one for red, one for green and one for blue. The combination of these colors represents the color that that space represented by the grid square should appear when reproduced by the lights. Continuing, the computer simulates the motion of the direction-controlling triplets that make up the light strings through the grid and checks if any of the triplets intersect with an active point in the grid. If a triplet does intersect with an active point, the computer first determines what directions the triplet should send light; that is, the tiny elements facing which direction(s) should be activated—irrespective of their color. To determine the direction(s) to send light, the computer performs the same process described earlier in the opacity section. Now, the compute knows that when this point is reproduced, light should be only sent in a certain set of directions, let us suppose for example, the direction is only left. Now the computer knows that whatever intensity they may be activated to, only tiny elements facing left may be activated. To determine the intensity to activate the red, green and blue tiny elements of the triplet, the computer checks the grid point that the triplet intersected with, for the point's red, green and blue value (recall that each grid point stores a red, green and blue value). The computer then knows that when the area in space represented by this grid point is being illuminated, only tiny elements facing left should be activated. It also knows the red tiny elements facing left should be activated to the intensity of the red value of that grid point, the green tiny elements facing left activated to the intensity represented by the green value of the grid point, and the blue facing left to the blue value of the grid point. Thus, the computer illuminates each area in the display volume that is part of the image in only the correct color and in only the correct direction—thus producing the opacity effect and the color effect at the same time.

While the previous section described a way to produce color and opaque color images for any embodiment, there is another option for producing color and opaque color images for just the embodiments that use cylindrical support structures. This alternate method works on a somewhat different principle than in the previous embodiment, and may be desirable because it may be cheaper to implement than the previous method. Again, while there are numerous sets of primary colors, the set of red, green and blue will be used here for simplicity. Alternately, other colors could be used.

The fundamental principle of this method is explained as follows: Suppose there is a small area of space that one wants to appear to glow a certain color. One could put three tiny lights of red, green and blue in that space and activate each of the three lights to the proper intensity and the three colors will mix to the human eye and seem to be the composite color—this is what was done in the previous method of producing color. However, one could alternately put just a red light in that space and have it emit a burst of light at the proper intensity; then move the red light away, put a green light in that same space, and have it emit a light burst of the proper intensity, then move it away; then do the same for a blue light. If this process is completed within the refresh time of the human eye, the three separate color bursts appear to converge into one color burst, the color of which is the mixture of the individual bursts.

Arrangement of the Lights

Figure 63:
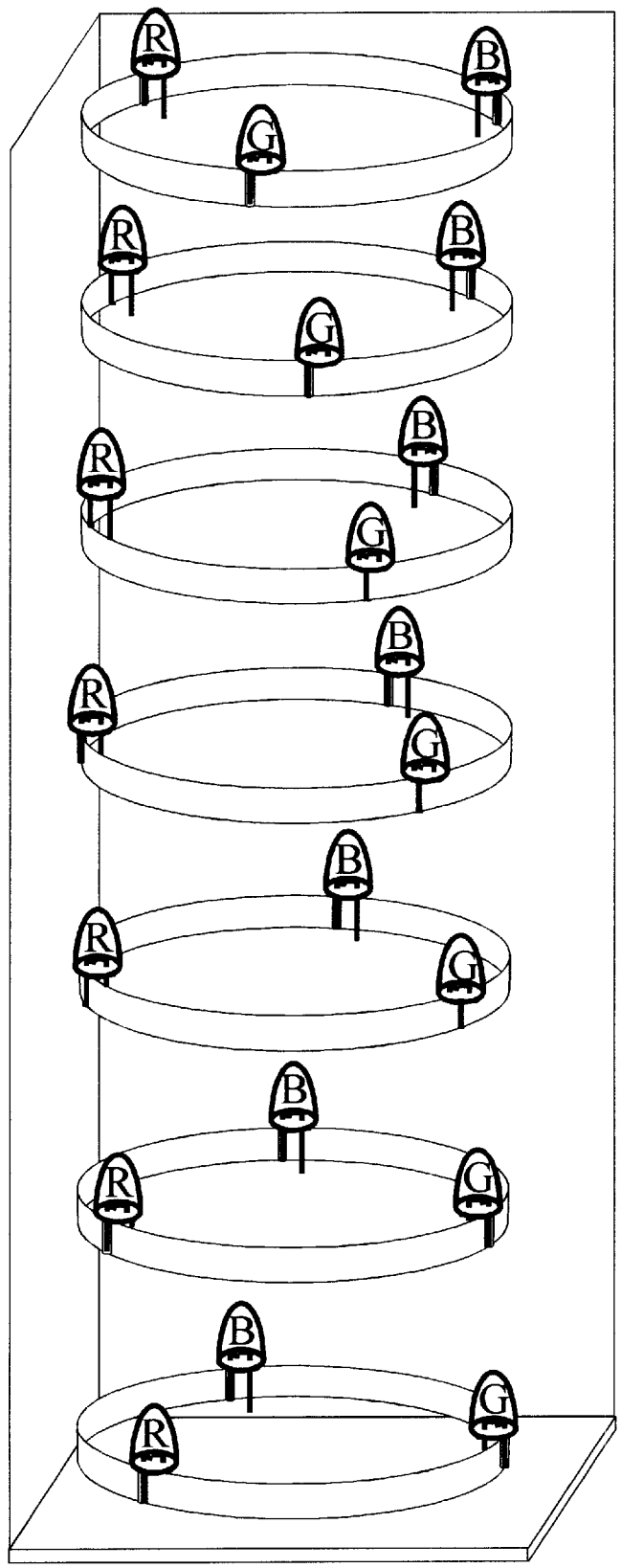
FIG. 63 shows a way in which three light strings may be put on a cylindrical support structure: one string being red, one green and one blue.

As was stated earlier, this method of producing color is really only intended for embodiments that use cylinders, such as the embodiment shown in FIG. 7. The reason for this is that the lights are arranged such that each height on each cylinder, instead of having one light (please recall that the cylinders in FIG. 7 have basically one light per height level on each cylinder) has three. The three lights are evenly spaced around the cylinder; that is, they are offset by 120 degrees. A simplified view of this is shown in FIG. 63. In FIG. 63, a section of a cylinder is broken—height-wise—into slices. Each slice has three lights on it: a red, a green and a blue. As one can see, the lights form three spirals going up the cylinder: one spiral of red lights, one of green and one of blue. If an opaque-capable embodiment is being made, each colored light is replaced by a direction-controlling colored light; that is, what is shown as a red light in FIG. 63 is replaced by a direction-controlling light that only shines red, the same is then done for green and blue. Thus, with a complete cylinder, three spirals are present, one of red lights, one of green lights and one of blue lights. Each of these lights is direction-controlling—but still color specific—if an opaque-capable embodiment is being made. What actually happens as a result of this lighting arrangement is that a particular point in space has a light (suppose red) pass though it, and possibly emit a burst of light. Then as the cylinders spin about their respective central axes, the red light is moved out of that space and a green light is moved very close to (but since the cylinders also rotate about the common middle axis, not exactly in) the place where the red just was; where the green may emit a burst of light. This continues by the green leaving the space, and shortly thereafter, the blue going into that point in space and doing the same thing. Each light produces a separate burst at whatever intensity needed, so as to cause the mixture of the colors in the human eye to appear as the desired result color. The completion of this process within the refresh time of the human eye is not a problem, as the cylinders are rotating about their respective axes at (very likely) tens of thousands of rotations per minute.

How the Computer Addresses These Lights

Although arranged differently and not referred to as "triplets", the addressing for these lights is identical to that for the previous method of producing color images.

How the Computer Controls These Lights

Figure 64:
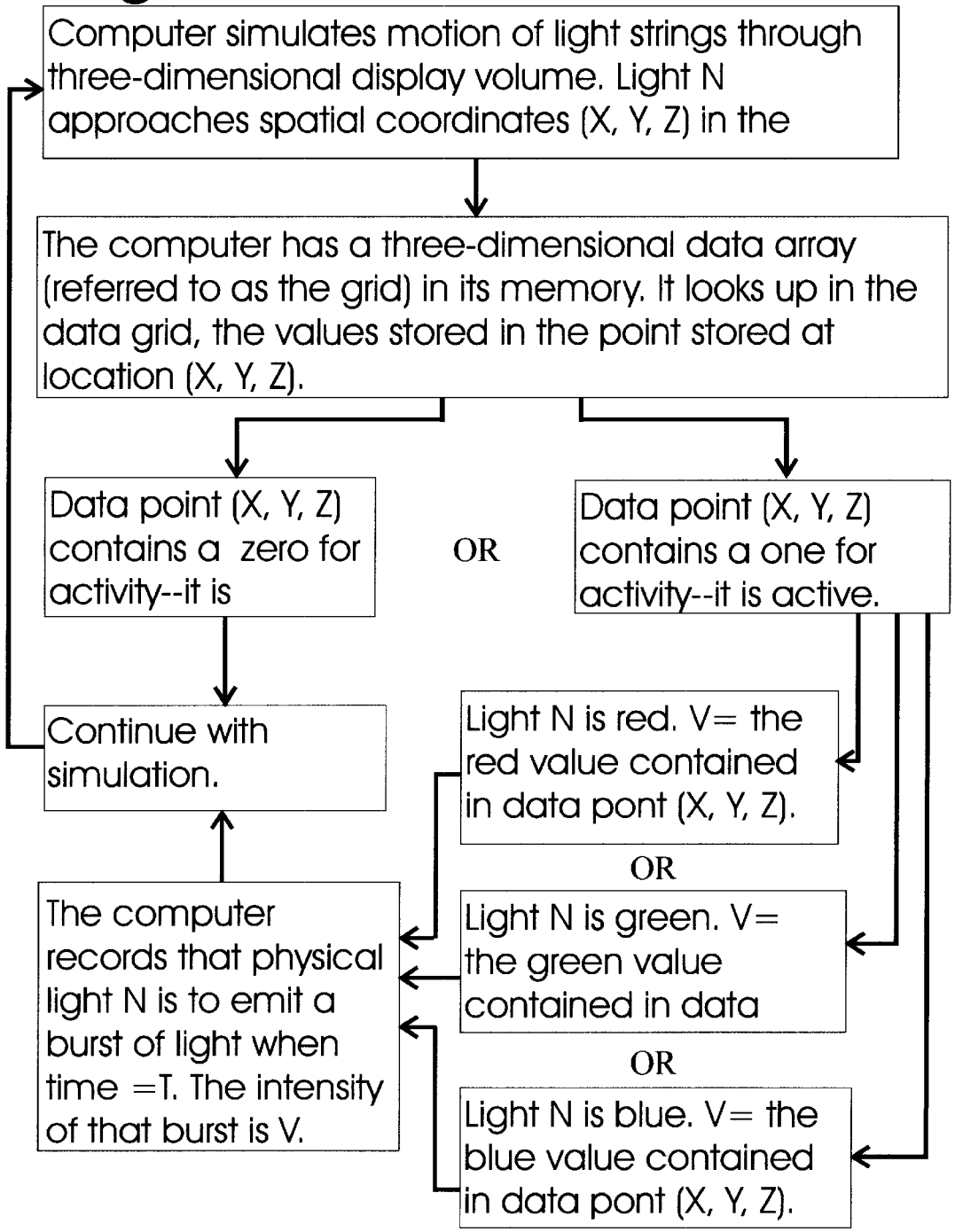
FIG. 64 shows a way through which the computer can determine if a color light is to be active, and how bright it should be, if the color system shown in FIG. 63 is being employed.

As with all of the simulations, the computer again begins with a three-dimensional data grid, the active points of which form the desired result image. As with the previous method of producing color, the data that the each grid point contains is, whether or not that point is active, a red value, a blue value, and a green value, and (for opaque-capable embodiments) a flag to specify if the point in space represented by this grid point is to appear as opaque. Now, there is the simulation of the motion of the lights through the display volume and the data grid. This is where there is a major difference between this and the previous method of producing color. In this method, a red, green and blue light are not simulated as one object (the opposite was the case in the previous color production method, which simulated a set of one red, green and blue light as a triplet). Here, each light (be it red, green or blue) is simulated individually as a single, separate entity. The steps of the simulation process are shown in the flowchart in FIG. 64, unless the embodiment being controlled is opaque capable. If it is, then there is the added step of opacity testing; that is, determining which tiny elements to activate on the direction-controlling light if it coincided with an active point. Also, what is eventually recorded is that light N is to activate at time=T, at intensity V, and must activate only a certain set of tiny elements—that set having been determined from the opacity testing. As a result of this, when the lights are actually controlled, a color, (and if opacity is being implemented) opaque image is produced.

Discussion of Prior Color Art . . .

This technique of producing color images by successive bursts from moving lights is also employed in U.S. Pat. No. 4,689,604 by Sokol. In that patent, a technology is described that can (among other things) be used for producing scrolling messages using moving lights. Starting in line 58 of column 2 of the patent by Sokol, there is a discussion of how a point in space on the circumference of a cylindrical shell can be made can be made to appear to glow in different colors. This is done through the successive emission of light bursts of three different colors for the purpose of producing an apparent mixing of the three. That is, a light burst of one basic color is produced at a certain point in space; then, as the lights move, when the light of another basic color is in the place where the first was, it emits a burst of light of a different color. This is then done for a third light of a third basic color (the colors given in Sokol's example were red, green and amber). In Sokol's patent, this process is completed with three (one for each color) vertical columns of lights with a small separation between them. The three columns rotate around a center point, along with maybe more lights. Now that the similarities between the instant method of producing color images and the prior art have been discussed, a discussion of the differences are in order. For one thing, the prior art uses this "successive light burst" technique to produce color images for two-dimensional images, whereas the instant invention uses this method of producing color images to produce three-dimensional images. Secondly, the prior art has the three sets of colored lights relatively close to one-another; the instant invention has the three sets of colored lights separated by 120 degrees around the cylinder to which they are attached. Thirdly, the lights in the instant invention rotate at numerous times the rotation rate of the lights of the prior art—recall that the cylinders in embodiments of the instant invention that use cylinders rotate at likely tens of thousands of rotations per minute. The prior art suggests a rotation rate of 3600 rotations per minute which, although is a considerable rate of rotation, is far less than what is used in the cylinders in the instant invention.

I claim:

1. A 3-dimensional volumetric stage-type display for displaying an image of the contents of a 3-dimensional volume said display utilizing the persistence of vision of a mammal, said display comprising
   a) one or more one-dimensional strings of individually-controllable lights, each said string comprising a plurality of said controllable lights;
   b) at least one string axis controller, each controlling at least one of said strings, each said controller having a first string axis;
      said controller causing each said string to move the string through a cycle of each said string's first string axis movement; wherein each string dynamically visits substantially all the physical points in a dynamic volume as it moves through a complete string axis cycle;
   c) a volume display controller having a second volume axis;
      said strings also cooperatively moving with respect to said second volume axis, said axis having a volume display cycle;
      said movement of said strings of each string axis controller through all said string controller's' cycles during a complete volume display cycle causing said lights of said strings to visit substantially all points of the volume of the display, and
   d) a controllable light processor,
      wherein said processor controls each and every controllable light as a function of time and space such that said each light is activated during the time it visits each point in said volume which is to appear lighted,
thereby creating said 3-dimensional image of said contents of said-volume.

2. The apparatus of claim 1 wherein said
   first string axis movement is one of linear or rotary;
   said string axis movement cycle is one of a circle or a line; and
   said volume display cycle movement is one of linear or rotary.

3. The apparatus of claim 1 wherein said first string axis movement is rotary; said second volume display axis is parallel to said first string axis; and said second volume display cycle movement is rotary, thus resulting in said displayed three-dimensional volume being cylindrical.

4. The apparatus of claim 1 wherein said first string axis movement is linear, said second volume display axis is perpendicular to said first string axis; and said volume display cycle movement is linear, thus resulting in said displayed three-dimensional volume being a rectangular parallelepiped.

5. The apparatus of claim 1 wherein said first string axis movement is linear, and said second volume display cycle movement is rotary.

6. The apparatus of claim 1 wherein said first string axis movement is rotary, and said second volume display cycle movement is linear.

7. The processor of claim 1 further comprising communication means, said means communicating control instructions to each said controllable light.

8. The processor of claim 7, wherein said communications means operates in a serial manner.

9. The processor of claim 7, wherein said communications means operates in a parallel manner.

10. The communication means of claim 7 further comprising commutation means.

11. The communication means of claim 7 further comprising electromagnetic communication means using non-visible frequencies.

12. The communication means of claim 7 further comprising electromagnetic communication means using visible frequencies.

13. The communication means of claim 7 further comprising electromagnetic communication means using radio frequencies.

14. The apparatus of claim 1 for displaying said image in color, wherein each light is comprised of a plurality of a set of sublights, said set of sublights comprising a set of the primary colors; and wherein said controllable light processor activates each sublight of each light to an intensity such that the combined lumen output of said set of sublights results in the desired color being perceived to appear at each point in said volume.

15. The apparatus of claim 1 for displaying said image in color, each said string having lights along the length of each string, wherein at the various positions on the length of the respective strings there are at least one set of lights of the components of a set of primary colors; and wherein said controllable light processor activates each light of each said set to an intensity such that their combined lumen output considering the persistence of vision of a living being results in the perception of a desired color appearing at each point in said volume.

16. A method for simulating and cyclically displaying a three-dimensional image of a solid object which may be viewed from different angles external to and with respect to said object in which said views will appear visually correct, thus simulating hidden-line determination and removal,
   said method comprising:
      a) determining a substantial quantity of points of said solid object, said quantity of the magnitude of resolution desired, each said point having at least one directional-sublight visiting said point during said cycle;
      b) determining all points of opacity which prevent viewing of points further away from the viewer of said object forming opacity polygons of any contiguous collections of said opacity-points;
      c) for each said point of step a, determine whether a vector normal to each directional sublight when at each said point of step a intersects with any of said opacity polygons;
         if said directional sublight does intersect such a polygon, then said directional sublight when at said point of step a should not be turned on in said cycle, or
         if said directional sublight does not intersect such a polygon, then said directional sublight when at said point of step a should be turned on in said cycle.

17. An apparatus utilizing the method of claim 16.

* * * * *